US005559707A

United States Patent [19]
DeLorme et al.

[11] Patent Number: 5,559,707
[45] Date of Patent: Sep. 24, 1996

[54] COMPUTER AIDED ROUTING SYSTEM

[75] Inventors: David M. DeLorme, Cumberland; Keith A. Gray, Dresden, both of Me.

[73] Assignee: DeLorme Publishing Company, Freeport, Me.

[21] Appl. No.: 381,214

[22] Filed: Jan. 31, 1995

Related U.S. Application Data

[63] Continuation-in-part of Ser. No. 265,327, Jun. 24, 1994.

[51] Int. Cl.⁶ .......................... G01C 21/00; G08G 1/123
[52] U.S. Cl. .................... 364/443; 364/424.02; 364/444; 364/449; 340/990; 340/995
[58] Field of Search ................ 364/443,444,448,424.02, 364/449, 407; 342/357; 340/990, 995

[56] References Cited

U.S. PATENT DOCUMENTS

| | | | |
|---|---|---|---|
| 4,926,336 | 5/1990 | Yamada | 364/444 |
| 4,939,662 | 7/1990 | Nimura et al. | 364/449 |
| 5,231,584 | 7/1993 | Nimura et al. | 364/444 |
| 5,270,937 | 12/1993 | Link et al. | 364/449 |
| 5,353,034 | 10/1994 | Sato et al. | 342/457 |
| 5,377,113 | 12/1994 | Shibazaki et al. | 364/449 |

OTHER PUBLICATIONS

Sciso, "Five Desktop Travel Guides Help You Plan Your Vaction", PC Magazine, Nov. 1993.
Software Product Specification, "Automap Road Atlas for Window (V. 3.0.)", Automap, Inc, 1993.
User Manual of Randy Mc.Nally Trip Maker for Window.

*Primary Examiner*—Kevin J. Teska
*Assistant Examiner*—Tan Nguyen
*Attorney, Agent, or Firm*—Daniel H. Kane, Jr.; Chris A. Caseiro; Thomas L. Bohan

[57] ABSTRACT

A computer aided routing system (CARS) determines a travel route between a user selected travel origin and travel destination following user selected waypoints along the way. A CARS database incorporates travel information selected from a range of multimedia sources about the transportation routes, waypoints, and geographically locatable points of interest (POIs) selected by the user along the travel route. The CARS software permits user selection of specified POI types within a user defined region of interest and user selection of particular POIs from the selected types within the region of interest. The transportation routes, waypoints, POIs and region of interest are identified in the computer by coordinate locations of a selected geographical coordinate system. The CARS software is constructed to present a user customized travelog for preview on the computer display of the user defined travel route. The travel planner can preview on the computer display a multimedia travelog particularly customized for the user defined travel route including multimedia information on the transportation routes, waypoints, and POIs selected by the user. The user can engage in an iterative trip planning process of revising the route and previewing travelogs of revised travel routes until a satisfactory travel route is determined.

59 Claims, 28 Drawing Sheets

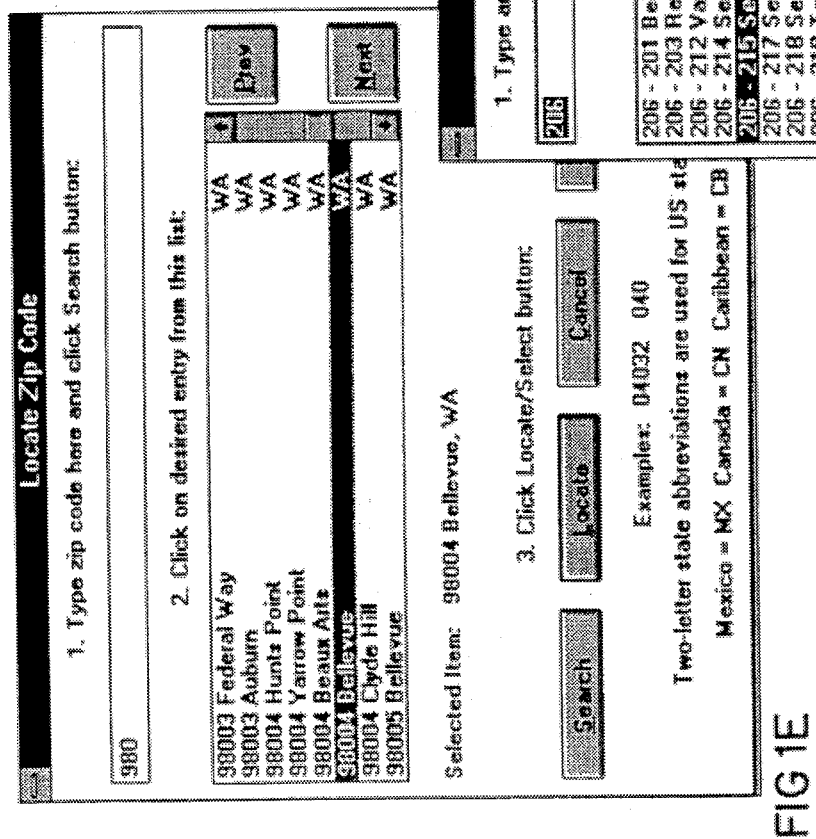
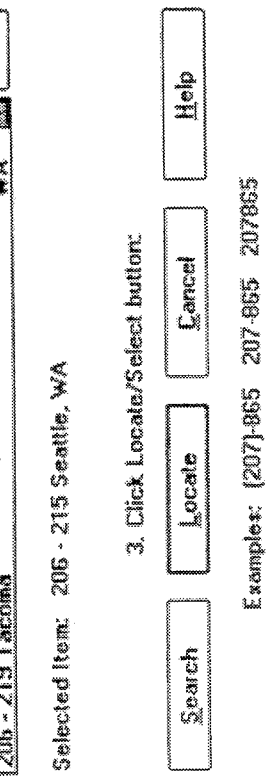
FIG 1E
FIG 1F

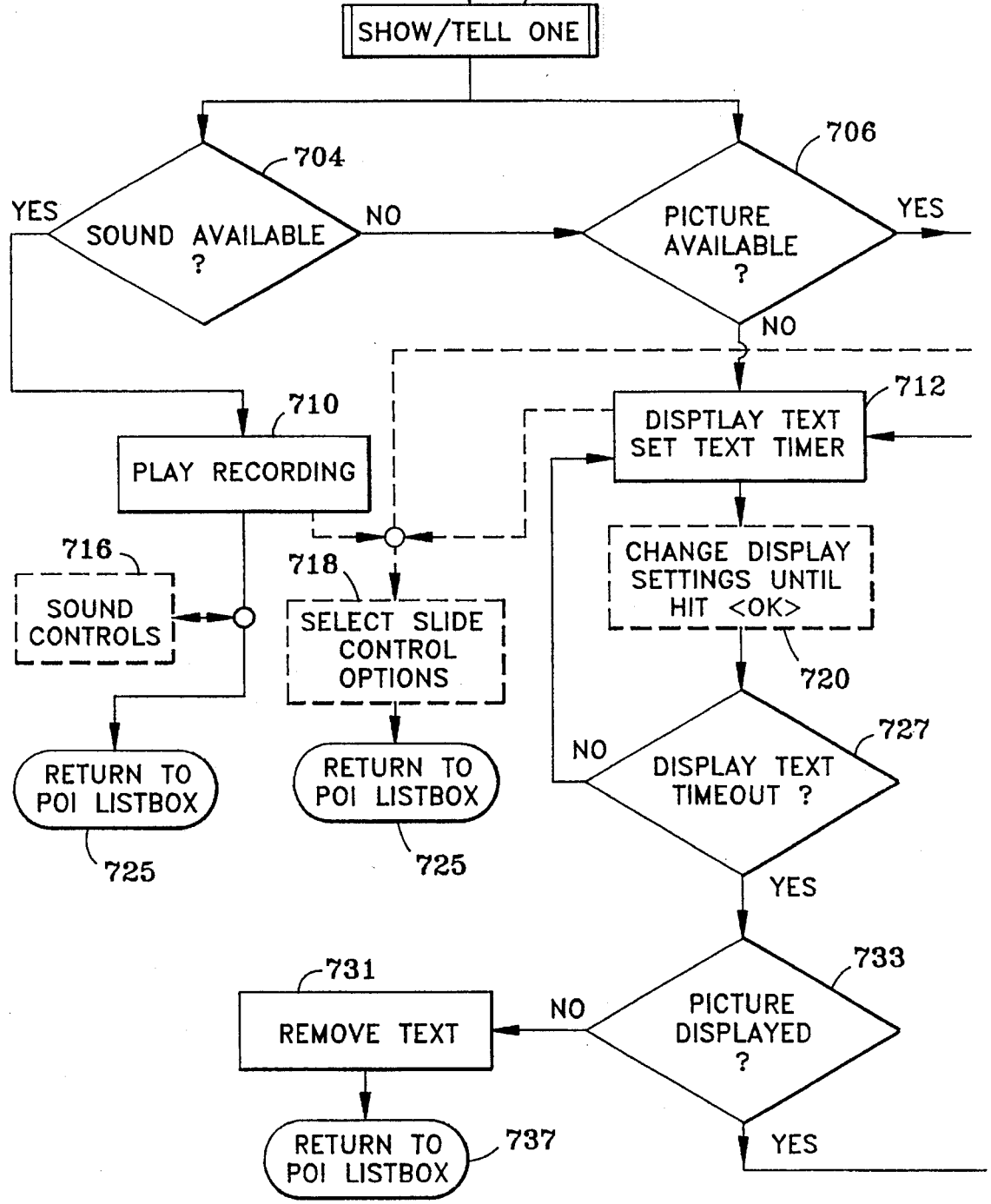

COMPUTER AIDED ROUTING SYSTEM

CROSS REFERENCE TO RELATED PATENT APPLICATION

This patent application is a continuation-in-part (CIP) of the David M. DeLorme et al U.S. patent application Ser. No. 08/265,327 filed Jun. 24, 1994 for COMPUTER AIDED MAP LOCATION SYSTEM and the contents of this related patent application are incorporated herein by reference.

TECHNICAL FIELD

This invention relates to a new computer aided routing system (CARS) for business and recreational travel planning. The invention provides an interactive computer travel planning guide for determining a route between a user selected travel origin and travel destination following user selected intermediate waypoints along the way. CARS software determines the preferred travel route within user selected constraints. The user can also select among a plurality of types of geographically locatable points of interest (POIs) within a user defined region of interest along the travel route. A CARS database incorporates travel information such as graphics, photos, videos, animations, audio and text information about the user selectable POIs along the way as well as about transportation routes and waypoints. From the user selected and user defined transportation routes, waypoints, and POIs along the travel route, the CARS software constructs a user customized multimedia travelog for preview on a computer display of the user defined travel route. Based on the user customized previews, the travel route including transportation routes, waypoints, and points of interest can be updated or changed according to the user preferences and choices. Modified travel routes can be previewed with further multimedia travelogs until a satisfactory travel route is achieved.

BACKGROUND ART

A variety of computer hardware and software travel planning aids are currently available on the market primarily for vacation and recreational travel planning. A number of the travel guide software packages focus on National Parks of the United States or recreational tours and activities with prepared travelogs or prepared assemblages of multimedia travel information on the different recreational geographical locations or recreational activities. Such travel software programs are exemplified for example by the America NavigaTour ™ MediAlive ™ multimedia travel guide produced by CD Technology, Inc.; the Great Vacations ™ Family Travel Guide by Positive Software Solutions; the Adventures ™ CDROM Program for worldwide adventure travel by Deep River Publishing, Inc.; and National Parks of America, a CDROM product of Multicom Publishing, Inc. which contains a directory of all National Parks in the United States.

Rand McNally produces a software travel planning product under the trademark TRIPMAKER ™ for planning a trip by car in the United States, Canada, and Mexico. The Rand McNally Tripmaker ™ software also calculates quickest, shortest, and preferred scenic routes for the trip planner. While the Rand McNally product incorporates a database of many points of interest, the multimedia travelog information appears limited to preplanned scenic tours.

Similarly the American Automobile Association in cooperation with Compton's NewMedia also provides travel planning from starting point to destination point with stopping points in between. The CDROM product contains a database of travel information. However the multimedia information available from the database appears limited to "suggested routes of travel" again limiting user choice.

In each case it appears that travel information from multimedia sources is preassembled by editors so that the user or trip planner is limited to "canned" or prepared multimedia travelogs of prescribed, suggested, or preplanned tours. Or the user is limited to information fragments about this or that particular object of interest or this or that particular place. There is no opportunity or user capability and selectivity in constructing a user customized travelog of assembled multimedia information for previewing a particular user determined route of travel. The user is relegated to travelogs and multimedia assemblages prepared for routes and tours proposed by other editors.

OBJECTS OF THE INVENTION

It is therefore an object of the present invention to provide a new computer aided routing system (CARS) capable of determining a travel route between a user selected travel origin and travel destination following user selected waypoints of interest along the way. A feature of the invention is that the user can construct a highly selective travel route incorporating waypoints selected by the user.

Another object of the invention is to provide a database of geographically locatable objects or points of interest (POIs) organized into a plurality of types for selection by the user. The database also incorporates travel information selected from a range of multimedia sources about the transportation routes, waypoints, and geographically locatable objects of interest along the travel route. A feature of the invention is that the objects of interest are encompassed within a user defined region of interest of user specified dimensions along the travel route.

A further object of the invention is to provide CARS software capable of presenting a user customized travelog or sequential assemblage of multimedia information for preview on the computer display about the user defined travel route. The travelog includes multimedia information about the transportation route, waypoints, and selected POIs in the user defined region of interest along the travel route.

A feature of the invention is that the trip planner is no longer relegated to the prescribed or suggested routes and tours of other editors for previewing travel routes. Nor is the trip planner limited to adhoc or fragmented multimedia information about this or that object of interest. Rather, the user constructs a user defined travel route including transportation routes, waypoints, and POIs within a region of interest along the travel route. The CARS software responds by assembling a user customized travelog or sequential assemblage of multimedia information for previewing the entire trip. The travel route including transportation routes, waypoints, and objects or points of interest can then be changed if necessary to suit the user preferences and choices.

An advantage of the invention is that travel planning can be optimized in an iterative process. The user constructs a travel route and at the same time the user constructs a customized travelog for previewing the initial travel route. On the basis of the multimedia preview of the initial travel route the trip planner undertakes revision of the travel route, e.g. by changes in the selected transportation routes, waypoints, and selected POIs. The travel route is recalculated by the CARS software and the user customized travelog is also reconstructed for further preview. Further refinements can follow in subsequent iterations until a satisfactory travel route is achieved.

DISCLOSURE OF THE INVENTION

In order to accomplish these results the present invention provides a computer aided routing system (CARS) for use with a digital computer and digital computer display. A variety of other peripheral equipment is also provided as hereafter described. A set of electronic maps is provided for presentation on the computer display. The electronic maps depict transportation routes having route intersections and identified waypoints at geographical locations along the transportation routes. The route intersections and identified waypoints depicted on the electronic maps are identified in the computer by coordinate locations of a selected geographical coordinate system.

A CARS database contains geographically locatable objects (loc/objects) also referred to as points of interest (POIs) identified by coordinate locations in the geographical coordinate system. The POIs are organized into a plurality of types for user selection of loc/objects or POIs individually and by type. The loc/object or POI types constitute electronic overlays of the database for display over the electronic maps on the computer display. As used in this specification and claims, the phrase points of interest or POI's is generally used to refer to loc/objects for which multimedia information is available for describing the POI's and presenting the points of interest in a multimedia travelog as hereafter described.

Typically, the CARS database is a geographical information system or GIS. Such a GIS manages data in the GIS database in relation to the geographical coordinate locations of the selected geographical coordinate system. Thus, the CARS database manager relates points of interest and any other loc/objects of the database with particular locations on or near the surface of the earth in terms of coordinate locations such as latitude and longitude. The multimedia information hereafter described is similarly identified with the coordinate location of the subject POIs.

The computer aided routing system incorporates CARS software constructed for user travel planning using the electronic maps presented on the computer display. The CARS software permits user selection of a travel origin, travel destination, and desired waypoints between the travel origin and travel destination. The CARS software calculates, delineates and displays a travel route between the travel origin and the travel destination via the selected waypoints. The travel route is calculated according to user choice of the shortest travel route, quickest travel route, or user determined preferred travel route. As used in the specification and claims, waypoints refers to the origin and destination of a possible route and intermediate points or places along the way including major road and highway intersections, joints or turning points at connected short line segments of major roads and highways, place names situated on major roads and highways, and as hereafter described, POIs near the major roads and highways.

The CARS software permits user selection of an area or region of interest along the user defined travel route. The area or region of interest is defined by user specified dimensions and may be for example a corridor of specified width along the travel route, circles of specified diameter at locations along the travel route, or regular and irregular polygons, etc. The CARS software permits user selection of specified POI types within the user defined region of interest and user selection of particular POIs from the selected types within the region of interest. The region of interest is identified in the computer by coordinate locations of the geographical coordinate system.

The CARS database also incorporates travel information about the POIs identified in the database and about selected transportation routes and waypoints of the electronic maps. The travel information may be from a variety of multimedia sources and is for example selected from the group consisting of graphics, photos, videos, animations, audio and text information, etc. As hereafter described the multimedia travel information is subject to a high degree of user selectivity in composing customized multimedia travel information packages.

The CARS software is also constructed to present a user customized travelog for preview on the computer display of the user defined travel route. Thus multimedia travel information is assembled from the CARS database on the transportation routes and waypoints of the electronic maps and the selected POIs of the database in the user defined region of interest along the travel route.

A feature and advantage of the computer aided routing system is that the travel planner can preview on the computer display a travelog particularly customized for the user defined travel route including multimedia information on the transportation routes, waypoints, and POIs selected by the user. The trip planner is not constrained to viewing "canned" or preselected multimedia assemblages and travelogs for suggested routes planned by other editors. Rather the CARS system delivers a user customized travelog or multimedia information assemblage directed specifically to the user defined travel route including the user selected transportation routes, waypoints and POIs.

As a result of this preview, the trip planner can revise the travel route including transportation routes, waypoints, and POIs. The CARS software then recalculates the travel route affording further opportunity for selecting new or different POIs in the newly defined region of interest along the new travel route. A new multimedia travelog preview is assembled corresponding to the new travel route and the process is repeated until the user achieves a satisfactory travel route based on the iterative trip planning process and multimedia previews made available by the invention.

A feature of the invention is that one or more points of interest in the user defined region of interest along a travel route can be converted by the user to waypoints on a new travel route. The POI status therefore changes from a possible side excursion off the main travel route to an actual waypoint on the new or revised travel route. The user therefore has available a wide selection of possible sites for defining a travel route including route intersections, named places on the electronic map, and the array of geographically locatable objects about which there is multimedia information and therefore referred to as points of interest of the CARS database.

In the preferred example the CARS software is constructed to display a user customized strip map of the user defined travel route. The user customized strip map is typically displayed along the center of the computer display. User selected POIs in the user defined region of interest are listed along one side of the strip map with pointers to respective POI locations in the region of interest. Travel directions for the travel route are listed along the other side of the strip map with pointers to respective intersections corresponding to directions along the travel route.

Preferably the strip map is vertically oriented with the travel origin at the bottom of the strip map and travel destination toward the top of the strip map. An advantage of this arrangement is that the strip map and travel route are always oriented in the direction of travel and the right and left directions coincide with actual right and left directions.

In the preferred example the digital computer also incorporates a printer and the CARS software is constructed for printing hardcopy maps of the user customized strip maps. The hardcopy maps of the user customized strip maps show the travel route, list of POIs and pointers along one side of the strip map, and list of directions and pointers along the other side of the strip map. The printed hardcopy map is preferably vertically oriented also with the travel origin at the bottom of the strip map and travel destination toward the top of the strip map.

The electronic maps, CARS database, and CARS software are typically stored on a CDROM and the digital computer incorporates a CDROM drive. The CARS software may include a replace function for updating the electronic maps and CARS database on the CDROM with replacement or supplemental information from another memory device.

The CARS system works with a geographic information system or GIS managing data in relation to specific geographic coordinates. The GIS enables display of electronic maps which function as a user interface as well as a system for display of geographic data. The GIS and the mapping interface coordinate two broad types of data: (1) transportation routes or networks and nodes or waypoints subject to routing computations; and (2) POIs or loc/objects related to information about travel and locations in various media.

Transportation routes depicted on the electronic maps may include all forms of transportation routes for example selected from the group consisting of vehicle routes, ferry routes, air travel routes, bicycle routes, and hiking trails. Such routes are typically represented as line segments, vectors or networks appropriate to the modes of transportation involved. The GIS and the user manage and manipulate such routing data in terms of geographic points including intersections, terminals, junctions and connections, generally labelled "nodes". Particular travel plans or itineraries along available transportation routes entail specific selections and arrangements of nodes called "waypoints". Users enter or list waypoints in the order of an intended journey including a point of departure, optionally intermediate stops or places to pass through on the journey, plus a final destination. In summary, nodes comprise the possible waypoints from which the user composes specific waypoint lists or input for routing.

Nodes and waypoints for routing, as well as POIs associated with multimedia information, are all related in the GIS database to geographical coordinates corresponding to particular locations on or adjacent to the earth's surface. The selected geographic coordinate system may be for example the latitude/longitude (lat/long) geographical coordinate system. Coordinate locations which correspond to specific nodes, waypoints or POIs are then stored in the digital computer as lat/long coordinates. In some cases, POIs and nodes coincide or share a particular location or set of geographic coordinates. POIs relate to multimedia information on locations, however, while nodes and waypoints relate to routing.

The CARS system permits the user to locate, click on or otherwise choose such nodes or possible waypoints and POIs in order to develop his or her individual travel plan.

The CARS software is also constructed for incorporating POIs selected by the user, while playing related multimedia in the region of interest, as new waypoints in the user defined travel route. The CARS software can then recalculate, delineate and display a new user defined travel route via the selected loc/objects or points of interest treated as added waypoints. The CARS database or GIS also stores information about the transportation routes entering and leaving the respective waypoints as well as the identity of immediately adjacent nodes.

According to the invention POI types of the CARS database may be selected for example from the group consisting of restaurants, hotels/motels, cities, municipalities, settlements, routes, transportation services such as airports, ferries, and railroads, parks, recreation areas, campgrounds, hospitals, zoos, museums, tourist and sightseeing attractions, other geographical landmarks, etc. In a simplified example, the POI types can be limited to hotels, campgrounds, restaurants, and selected tourist attractions.

Data items of the various types of POIs are stored, managed and manipulated within the CARS database or GIS in relation to one or more media from the group of alphanumeric text, still or moving graphics and audio including voice, natural and artificial sound. For an example, a typical hotel POI item includes information of interest to travelers about the accommodations, room prices, other facilities and nearby recreational and cultural attractions in a variety of selectable text, audio and pictorial media.

The invention also provides a set of printed maps substantially coinciding with the set of electronic maps for user cross reference, correlation and coordination between the computer display presented electronic maps and the printed maps. A grid system of grid lines overlays the electronic maps and the printed maps. The grid lines define uniquely named grid quadrangles. The uniquely named grid quadrangles of the electronic maps and printed maps substantially coincide in geographic areas depicted by the grid quadrangles to facilitate cross reference, correlation and coordination between the computer display map presentations and the corresponding printed maps, as set forth in further detail in the related patent application cross referenced above.

The electronic maps and printed maps are constructed to be substantially constant scale maps. The electronic maps may be at a plurality of scales, each scale level incorporating substantially constant scale maps. In that case the grid system also incorporates a plurality of sets of grid lines corresponding to the respective scales and defining uniquely named grid quadrangles at each scale. The CARS software is constructed to permit user scrolling across grid quadrangles at the same scale and to permit zooming between grid quadrangles at different scales. The scrolling and zooming steps are displayed on the computer display. Further details on the scrolling and zooming capabilities of the mapping database manager are set forth in the David M. DeLorme U.S. Pat. No. 4,927,319 issued Nov. 20, 1990 for ELECTRONIC GLOBAL MAP GENERATING SYSTEM and the David M. DeLorme U.S. Pat. No. 5,030,117 issued Jul. 9, 1991 for DIGITAL GLOBAL MAP GENERATING SYSTEM. The digital computer may be selected from a range of hardware either portable or stationary including PDA's, notebooks, portable computers, desktop computers, workstations, and mainframes.

Generally the CARS software of the invention is constructed so that the trip planner can easily change any of the user selected parameters such as user selected travel origin, travel destination, transportation routes, and waypoints. POI's can also be incorporated as waypoints along the route. The CARS software recalculates, delineates, and displays on the computer display the revised travel route. It also assembles and displays a revised user customized multimedia travelog for previewing the revised travel route. These steps can be repeated in an iterative trip planning process until the user arrives at a satisfactory user defined travel route.

In the preferred example, the CARS software is composed of a routing subsystem, a multimedia subsystem, and an interactive mode for interaction between the two subsystems. The routing subsystem performs the travel planning and routing functions, calculating and displaying a route according to user specified choices and constrains. The multimedia subsystem performs multimedia functions, retrieving and displaying multimedia information about selected PDI's. In the interactive mode, the multimedia subsystem constructs a travelog following the user defined route calculated by the routing subsystem.

The invention also provides a new computer aided routing method (CARM) using a digital computer with computer display and electronic maps. As noted above, the electronic maps include transportation routes, route intersections and identified waypoints along the transportation routes. The method also uses CARS software for user travel planning.

The method steps of the invention include presenting the electronic maps on the computer display; selecting waypoints by using the electronic maps, or by list-based sources for locating by place names, zip codes or telephone exchange data etc., or by responding to related multimedia about proximate points of interest. The waypoints include a user travel origin and travel destination, and intermediate waypoints of interest at geographical locations between the travel origin and travel destination. The method steps further include calculating, delineating, and displaying on the computer display a travel route between the user travel origin and travel destination via the user selected waypoints of interest according to user choice of the shortest travel route, quickest travel route, or user selected preferred travel route.

The method proceeds by selecting a region of interest to the user along the user defined travel route, and defining the region of interest by user defined dimensions limiting excursions on either side of the user defined travel route. The method uses a database of geographically locatable points of interest in the geographical areas of the electronic maps. The POIs are organized into a plurality of types for user selection of POIs by type. The POI types provide overlays of the CARS database for display over the electronic maps on the computer display. The database also includes the travel information selected from the group consisting of graphics, photos, videos, animations, audio information and text information about transportation routes and waypoints of the electronic maps and points of interest of the CARS database.

According to the method, further steps include identifying in the digital computer the transportation routes, route intersections, and waypoints of the electronic maps, corridor of interest selected by the user, and the POIs of the first database, by coordinate locations in a common geographical coordinate system; selecting specified POI types in the user defined corridor of interest along the user defined travel route and selecting particular points of interest from the selected types in the corridor; and assembling and displaying on the computer display a user customized travelog for preview of the user defined travel route, said travelog including travel information in the database on the transportation routes and waypoints of the electronic maps and selected POIs in the user defined corridor of interest along the user defined travel route.

The invention also contemplates steps of changing the user selected travel origin, travel destination, transportation routes, or intermediate waypoints; recalculating, delineating, and displaying on the computer display a revised travel route; and assembling and displaying on the computer display a revised user customized travelog for previewing the revised travel route.

According to another feature of the system and method, points of interest selected by the user within the user defined region of interest along a user determined travel route can be converted to waypoints. The travel route is then modified to incorporate the selected points of interest as actual waypoints in a new or revised travel route. The selected POIs then have a new status in the proposed travel plan. Rather than merely possible destinations reached by side excursions from the designated travel route, they actually become waypoints on the travel route. The routing algorithm or routing procedure of the CARS software therefore determines the shortest route, quickest route, or user defined preferred route through the selected POIs as waypoints on the travel route.

An advantage of the computer aided routing system is the availability of an array of multimedia information for points of interest and places in an area of interest. A user can therefore initially browse through the available information before even attempting an initial route. The array of multimedia information can then provide a basis for selecting an initial route with destination and waypoints. Once establishing an initial route the user can then follow the interactive and iterative procedures of the computer aided routing system.

Other features of the system and method are set forth in further detail in the following specification and accompanying drawings.

BRIEF DESCRIPTION OF THE DRAWINGS

FIGS. 1B–1M, 1O and 1P illustrate example screen displays and user interfaces for the computer aided routing system while

FIGS. 7A, 7B, and 7C are assembled to form the flow chart referred to in the specification as FIG. 7 showing the user controls and commands made available to the multimedia user of the CARS system.

DESCRIPTION OF PREFERRED EXAMPLE EMBODIMENTS AND BEST MODE OF THE INVENTION

Figure 1A:
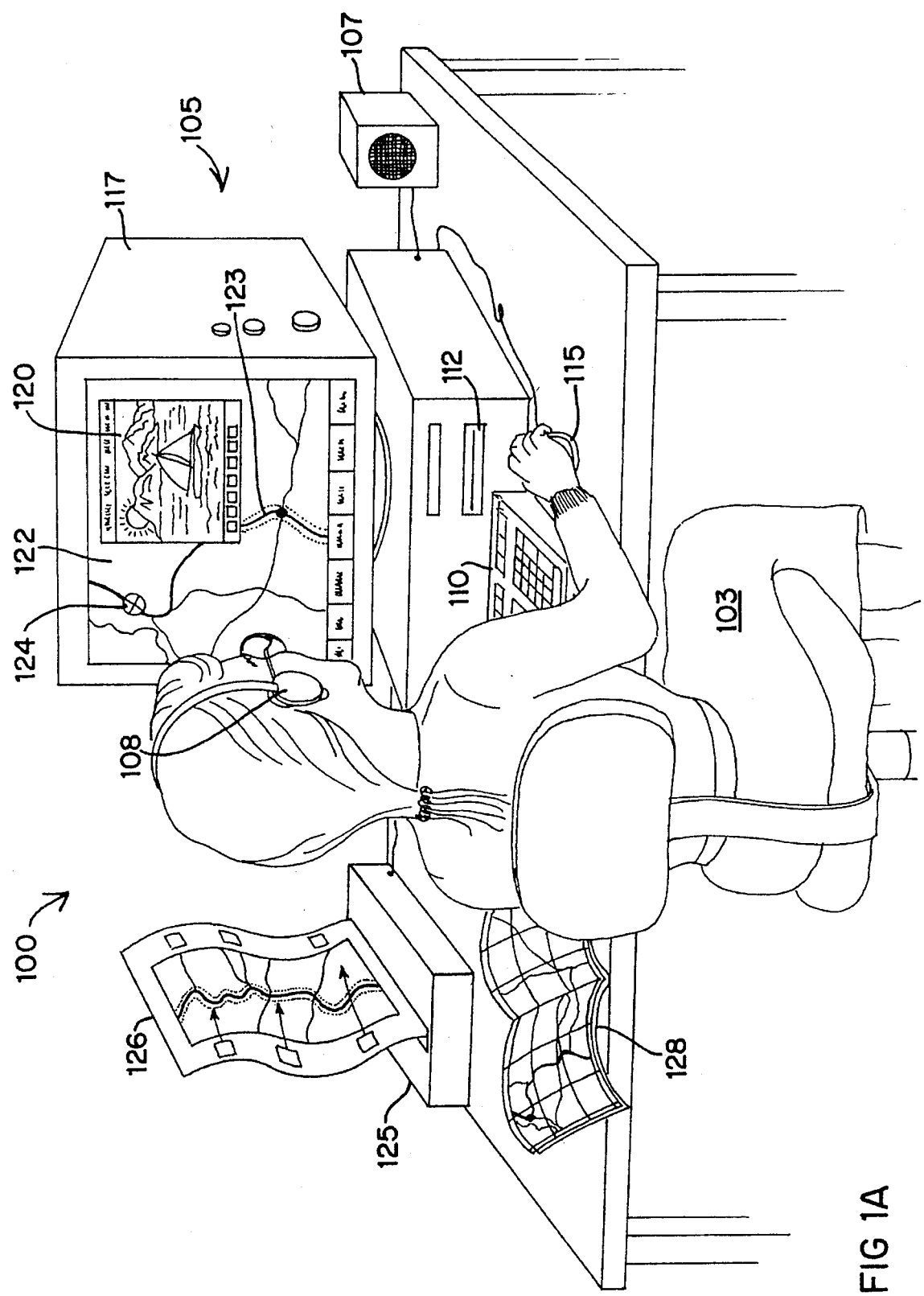
FIG. 1A is a diagrammatic perspective view of an operating system and system user showing the computer aided routing system according to the present invention.

A computer aided routing system (CARS) 100 according to the present invention is illustrated by way of example in FIG. 1A. A user 103 operates the software system 100, provided on CD-ROM, utilizing a desktop personal computer equipped for multimedia. In the preferred embodiment, illustrated in FIG. 1A, the personal computer system 105 comprises a 286, 386 or 486 Intel processor or equivalent, with typical memory devices, associated circuitry and peripheral devices including a monitor or CRT 117, a speaker or audio system 107, a printer 125, a CD-ROM player 112, a mouse 115 and keyboard 110. Alternatively, the software system 100 can be provided on diskette, run from a hard drive or central server.

Alternative embodiments could include other input devices e.g. voice recognition system, joystick, touchscreen, scanner for printed map input, simplified keypad, etc., not represented here. FIG. 1A discloses the CARS computer aided routing system 100 implemented on a single, stand-alone, desktop style, personal computer. The software technology, which facilitates interactivity between routing and multimedia, also works on a more portable laptop or notebook computer, a handheld personal digital assistant (PDA), embedded in a travel planning appliance or an in-vehicle navigation system, as well as on mainframes of various kinds, distributed work stations, or networked systems. Alternatively, users can also operate the CARS computer aided routing system 100 from a remote interface through wireless or hard-wire links connecting with a distant computer system or a central service bureau.

FIG. 1A shows a map book or set of printed maps typically on paper media 128 corresponding to the electronic or digital map 122 displayed on the screen or monitor 117. The printed maps 128 can be consulted as an aid in using the corresponding electronic or digital maps 122 displayed on screen, and the hardcopy travel plan printouts 126 derived from interactivity between the routing and multimedia elements of the invention. It is expected that users will printout such hardcopy travel plans 126 to guide and direct their journeys on foot, in vehicles, or by other means of travel.

The hardcopy travel plan 126 illustrated in FIG. 1A consists of a strip map noting points of interest, travel directions and critical turning points along the recommended route, described in more detail hereafter. Such hardcopy travel plans, typically printed on paper, comprise a portable and compact form of output from the system, useful and easily read in field situations, without the expense or burden of carrying even a small computer device. A variety of other forms of digital and printed media output can result from the combination of the software routing and multimedia processes, as described hereafter.

The user 103, in FIG. 1A, is operating both the routing and related multimedia elements of the invention. The monitor 117 screen is filled with an electronic or digital map display 122 on which departure points, destinations and other waypoints can be entered or deleted and the shortest, fastest or otherwise optimized routes calculated, as described in more detail below. At the same time, in a multimedia window 120 superimposed upon the map display, the user 103 is engaged in viewing, hearing, or responding to a selectable, multimedia presentation related to points of interest and locations displayed on the underlying map screen 122.

For purposes of the this specification the term multimedia embraces all manner of graphics, text, alphanumeric data, video, moving or animated images, as well as still images, photographs and other audio or visual information in digital or analog formats. Multimedia also includes audio output options, voice, music, natural and artificial sound, conveyed to users through a speaker system 107 or earphones 108. As detailed hereafter, the invention stores, manages and retrieves a database of multimedia information in relation to specific places on or near the surface of the earth, referred to herein as points of interest (POIs), or geographical sites or locations. These are geographically locatable objects (loc/objects) for which multimedia information is available in the CARS database. Generally, POI's can be represented in both digital and print media cartography and are situated or described by standard geographic coordinates such as latitude and longitude, UTM, State Plane, or equivalent map location systems.

From the digital map and routing function shown in FIG. 1A at 122, the user 103 can select one or more particular geographic locations, or points of interest (POIs), in order to view, hear or manipulate related information in the multimedia dimension of the invention. FIG. 1A shows the multimedia element of the invention as an episode in a multimedia presentation comprised of graphics or text, shown in an on screen window 120, or audio output conveyed to the user 103 via a speaker 107 or earphones 108. For example, in the multimedia window 120, the user 103 can view and selectively respond to color photographic or video images or related textual information about a specific location, or group of locations. Locations are chosen by the user working within the underlying digital map and routing dimension of invention, illustrated at 122. More specifically, FIG. 1A shows a scenario in which the user 103 has selected a particular lakeside location 124 on the underlying digital map, or in conjunction with a route or a waypoint along a route. The specific lakeside location 124 is shown as an X in a circle 124 on the simplified drawing of a typical digital map screen 122. The user 103 picked this point of interest located by a lake by means such as a mouse clicking operation at the location or placename as depicted on the digital map 122. The location can also be identified by words or symbols along a displayed route on the underlying digital map screen 122, by selection from a list of place names or from a list of types of locations, or by other routine or state of the art inputs.

The user's choice of a particular location prompts a multimedia presentation 120 of information related to the selected place e.g. stills or video pictures of the lake, local events, places to stay or eat, attractions and recreational opportunities, related text or audio narrative, local history, lore, even complex or extensive data on topographic, environmental, demographic, real estate or marketing information, etc. The multimedia presentation is illustrated by the graphic image of a view of the lake, sailboat and mountains on the far shore, in the window 120, accompanied by related audio output 107 or 108. The CARS system 100 enables a user to prompt a multimedia presentation 120 on a location 124, or group of locations, selected from within a digital or electronic mapping system 122, equipped to do routing functions and displays 123.

FIG. 1A additionally illustrates procedures whereby users can modify waypoints, and other route parameters, from within the multimedia element of the software invention. Typically, routes or waypoints are displayed as highlighted line segments or points 123 on the digital or electronic map 122. Routes and waypoints may also take the form of map symbols and annotations, or of ordered lists of place names, travel directions, geographic coordinates or various other location identifiers, as described hereinafter. The CARS system 100 combines routing and multimedia elements by enabling the user 103, to add, delete or insert one or more particular geographic locations or points of interest. This is achieved based upon the presentation of multimedia information about those locations, as new or modified input for additional processing of the route.

For example, in FIG. 1A, mouse manipulable buttons along the bottom of the multimedia window 120 enable the user 103 to command the CARS system 100 to include the lakeside location 124, based on the multimedia presentation 120, as new input for routing. The CARS system 100 facilitates entry or deletion of locations, reviewed in multimedia subject matter, as new starting places, destinations, intermediate waypoints, or points of interest along the way as part of the user selected route. FIG. 1A represents how user interactions with multimedia about locations can be used to change the route.

FIG. 1A further illustrates output from the CARS system 100, a hardcopy printout 126, typically a customized or individualized travel plan in the shape of a strip map annotated with travel directions and related information. Output from the CARS system 100 is produced by combined interaction between the routing functions and user responses to the multimedia information about particular geographic locations. Thus, for one example, the hardcopy travel plan 126 exhibits attached points of interest, typically in the form of annotations connected with graphic arrows or pointers to particular geographic locations which fall within a predetermined distance from a displayed route. The user attaches such points of interest to a digital map route display from a multimedia presentation on those locations. Alternative forms of digital, audio, text, graphical, hardcopy or multimedia output from the CARS system 100 are detailed later in this disclosure.

Output from the invention can result from a single, simple interaction between routing and multimedia elements. FIG. 1A illustrates a scenario whereby the user selected only one point of interest, a place by a lake 124, close to a route 123 highlighted upon an electronic or digital map display 122. Next the user prompted the presentation of multimedia information in a window 120 concerning the lakeside point of interest. Intrigued by the multimedia presentation, the user then pushed the "Attach" button in the command bar across the window bottom, or otherwise prompted the CARS system to include the lakeside location as an annotated point of interest within a specified distance from the highlighted route displayed upon the map screen or printed on a hardcopy travel plan.

In FIG. 1A, the hardcopy travel plan 126 output actually contains arrows or pointers from three annotation boxes to three corresponding points of interest attached to the strip route map output. Moreover, the highlighted route running up the center of the strip map format may reflect waypoints added or deleted over the course of a sequence of interactions between the multimedia and routing elements of the invention. Users can utilize the invention to attach multiple points of interest, or make many modifications of actual waypoints and highlighted routes, working interactively between the multimedia database and the routing function. The system, as described hereafter, is flexible, selective and capable of series of multiple interactions and repeated iterations in order for the user to develop, alter and refine an individualized or customized travel plan through varied operational cycles, combining routing and utilization of the multimedia database on locations.

Figure 1B:
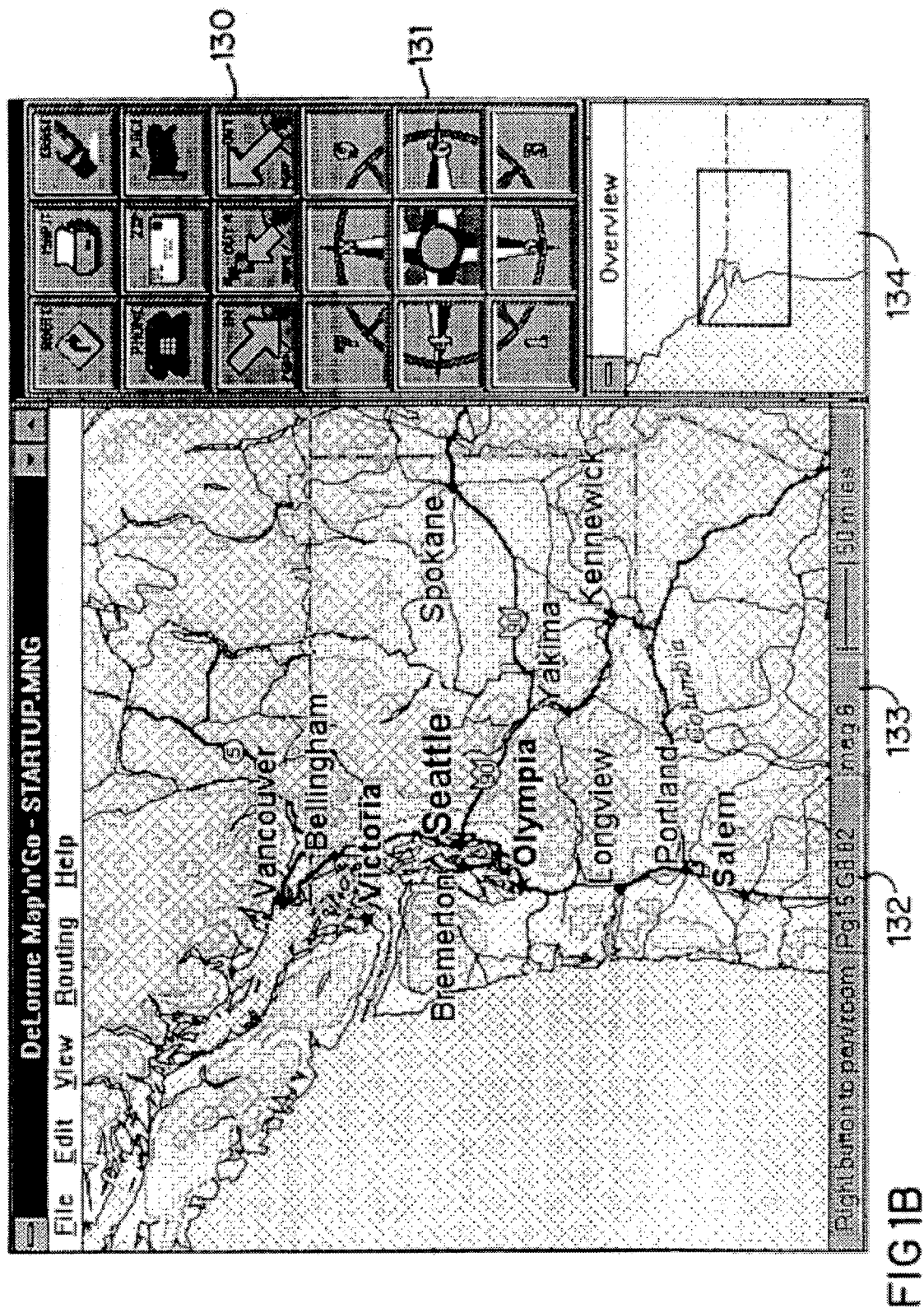
Figure 1C:
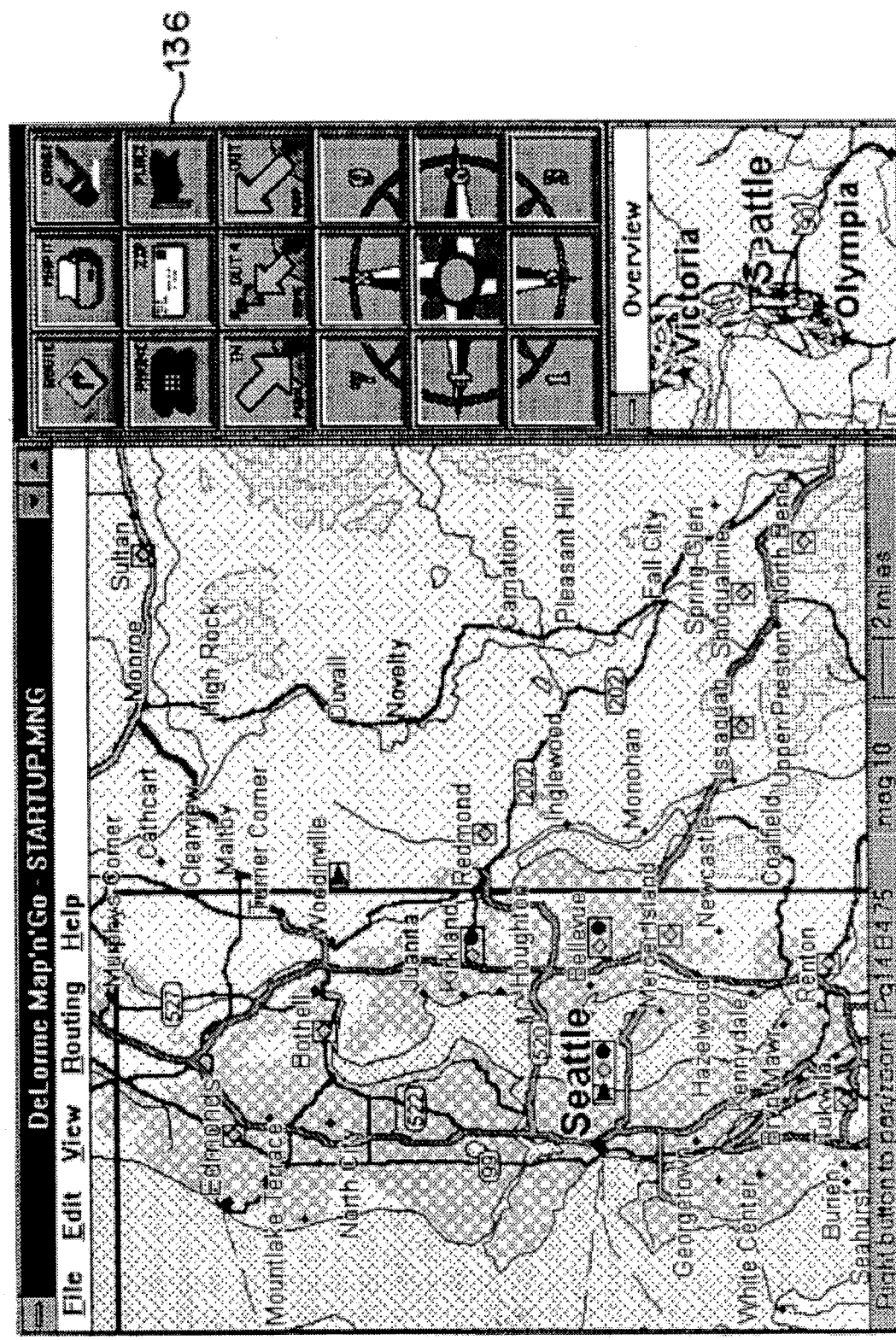
Figure 1D:
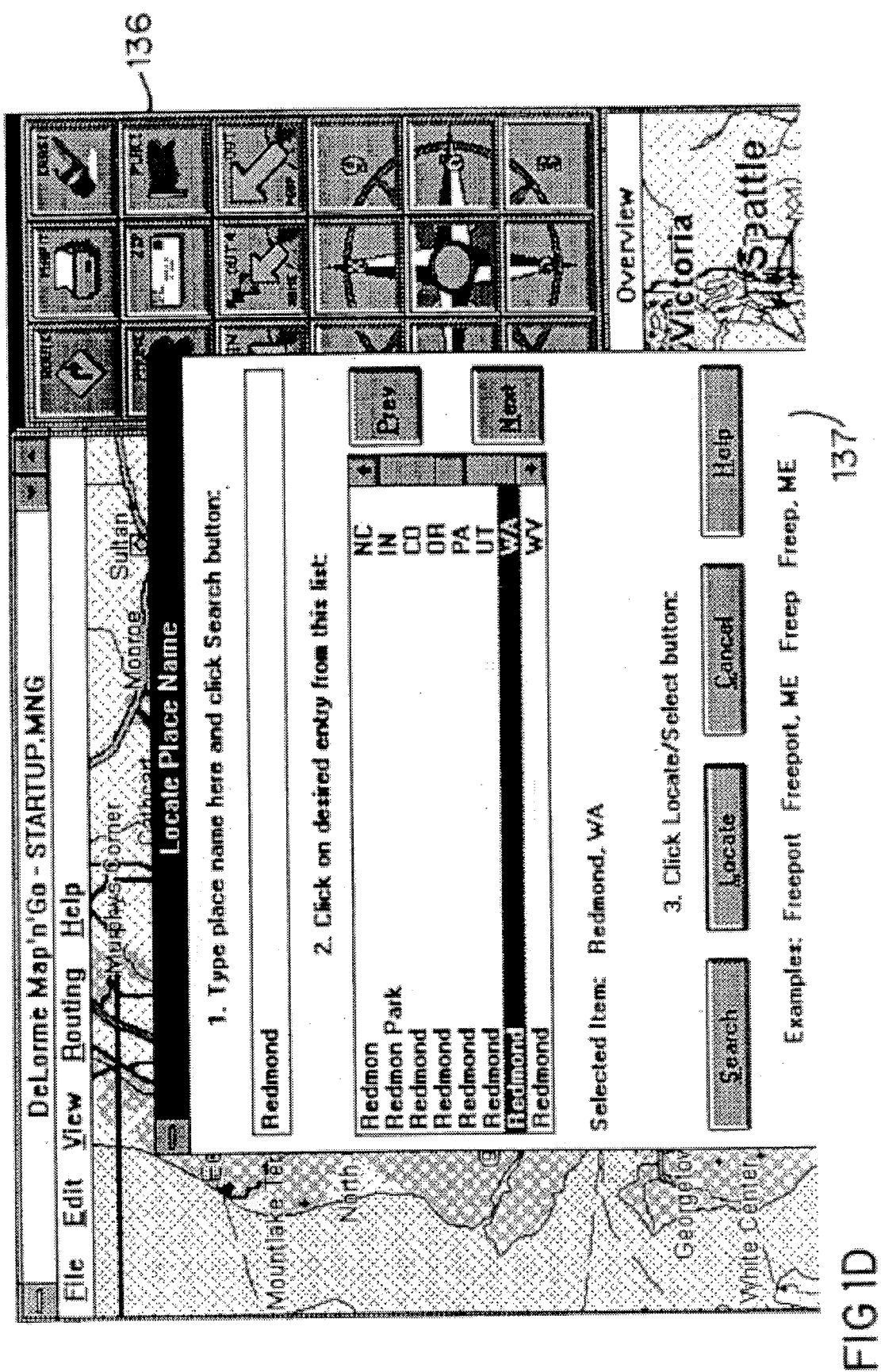
Figure 1G:
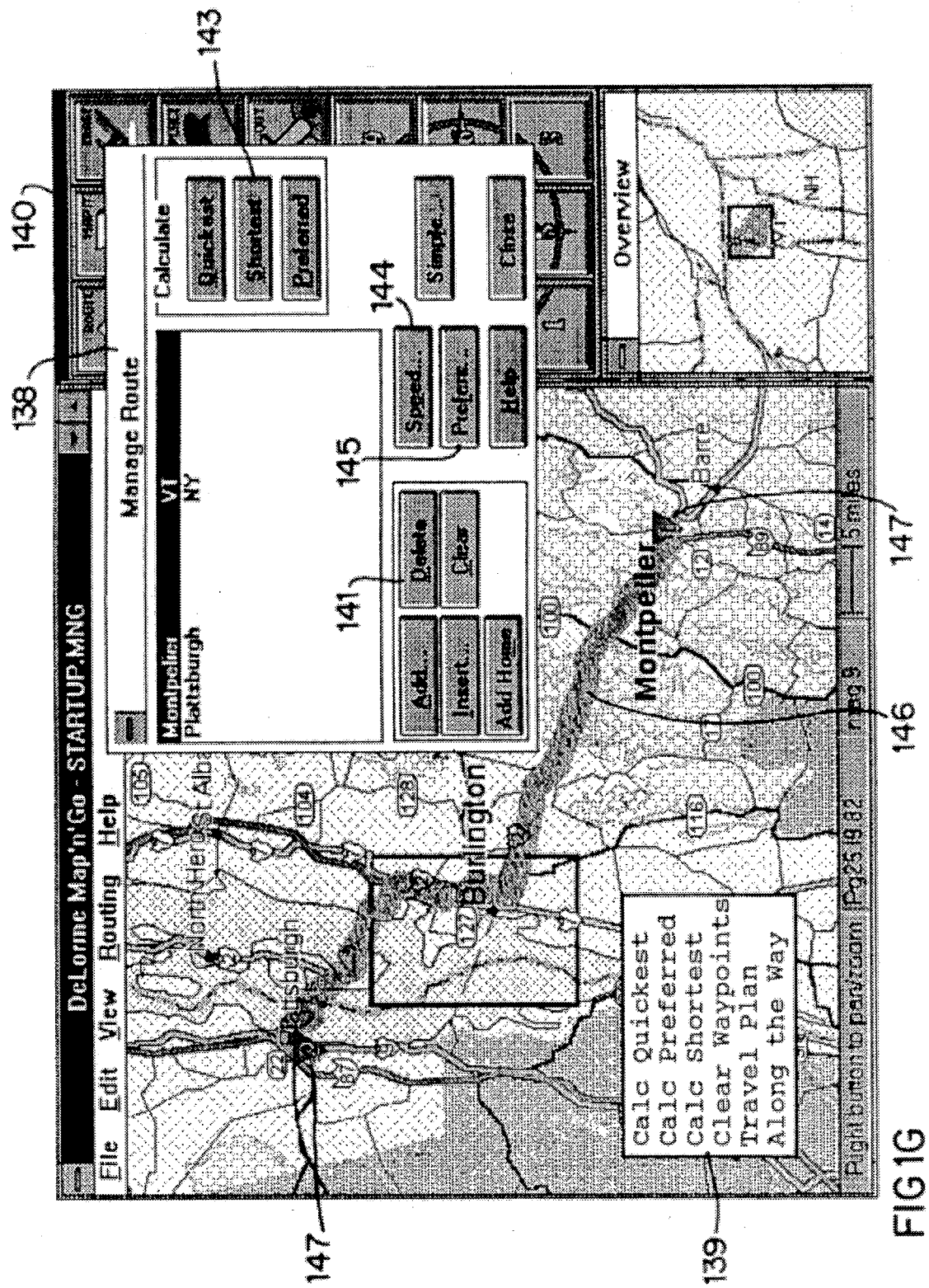
Figure 1I:
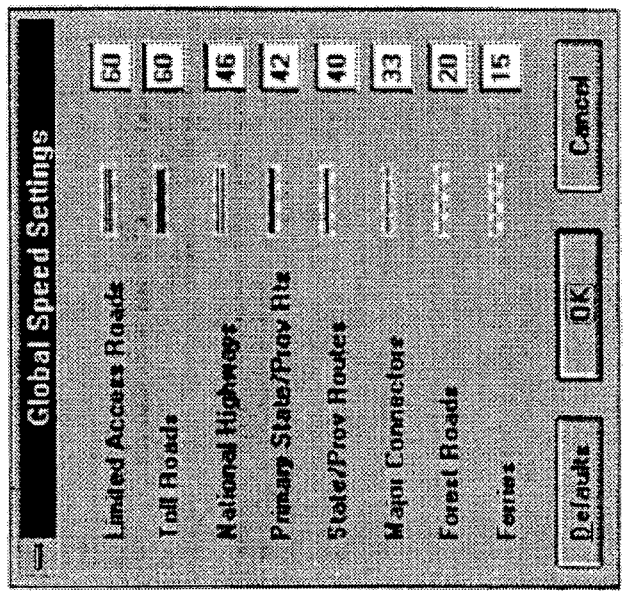
Figure 1H:
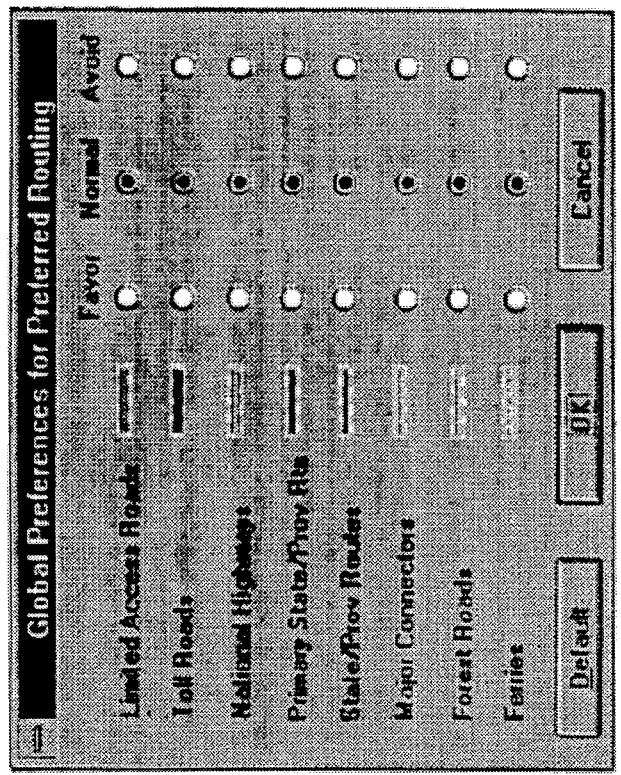
Figure 1J:
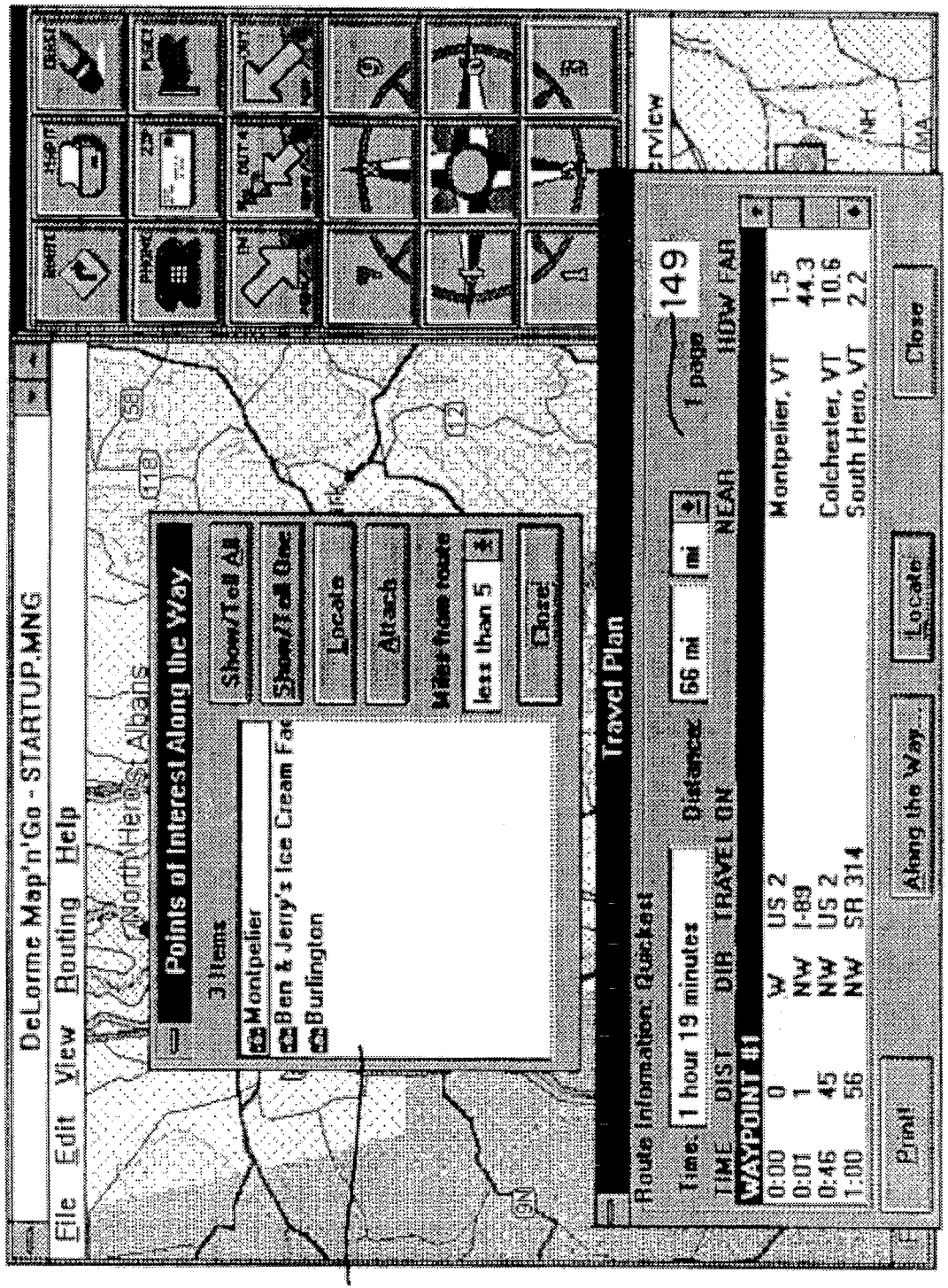
Figure 1K:
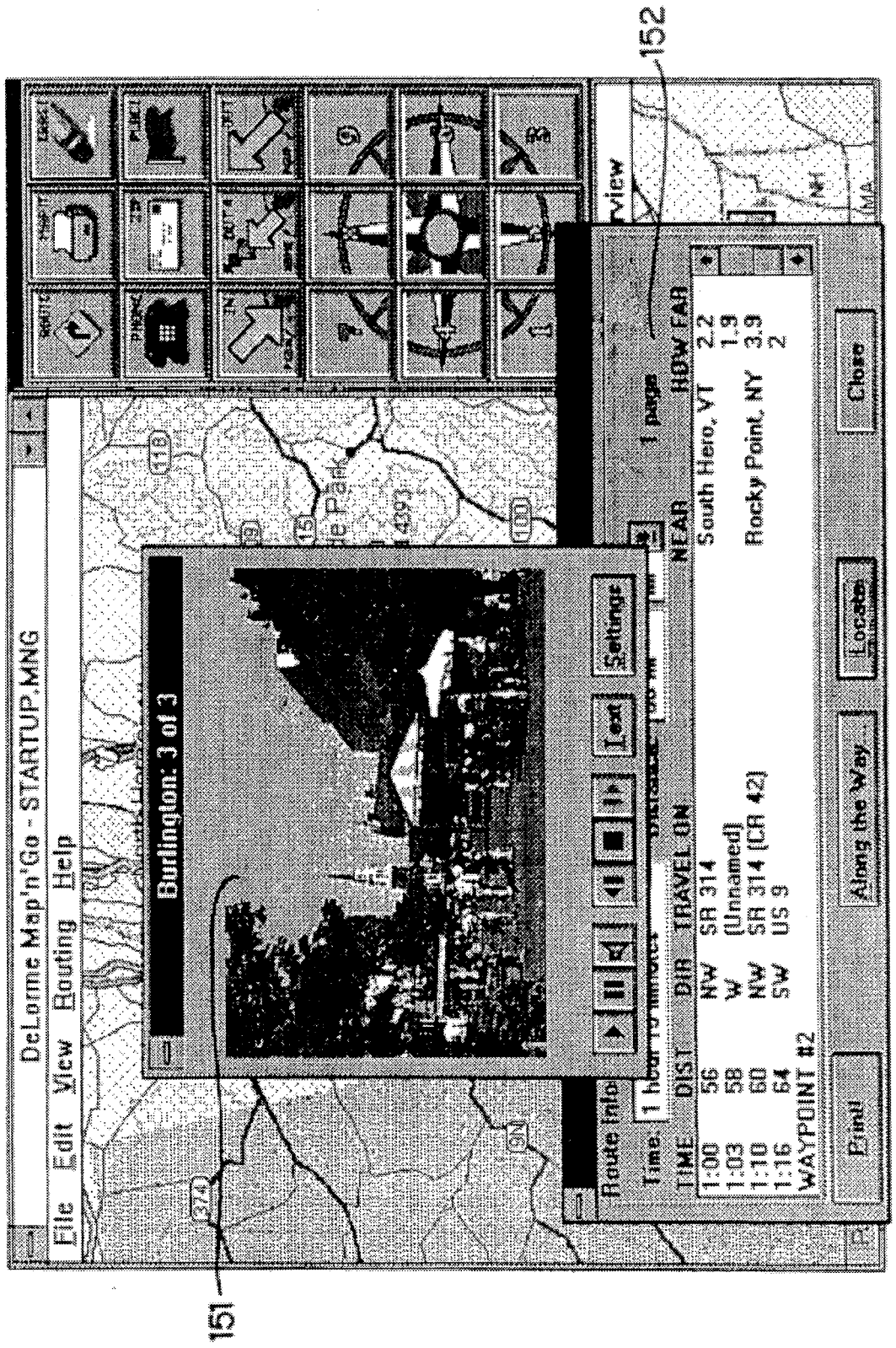
Figure 1L:
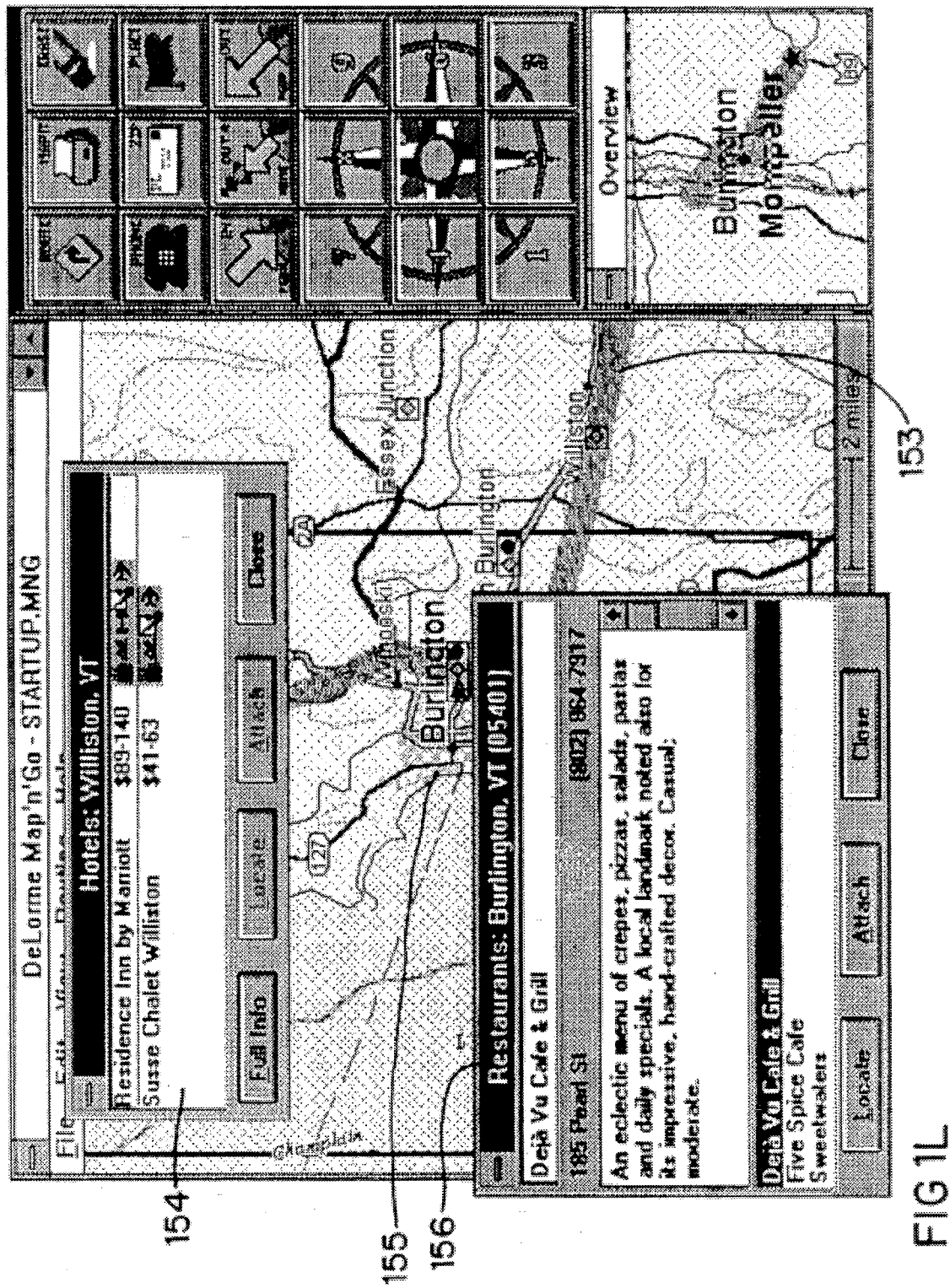
Figure 1M:
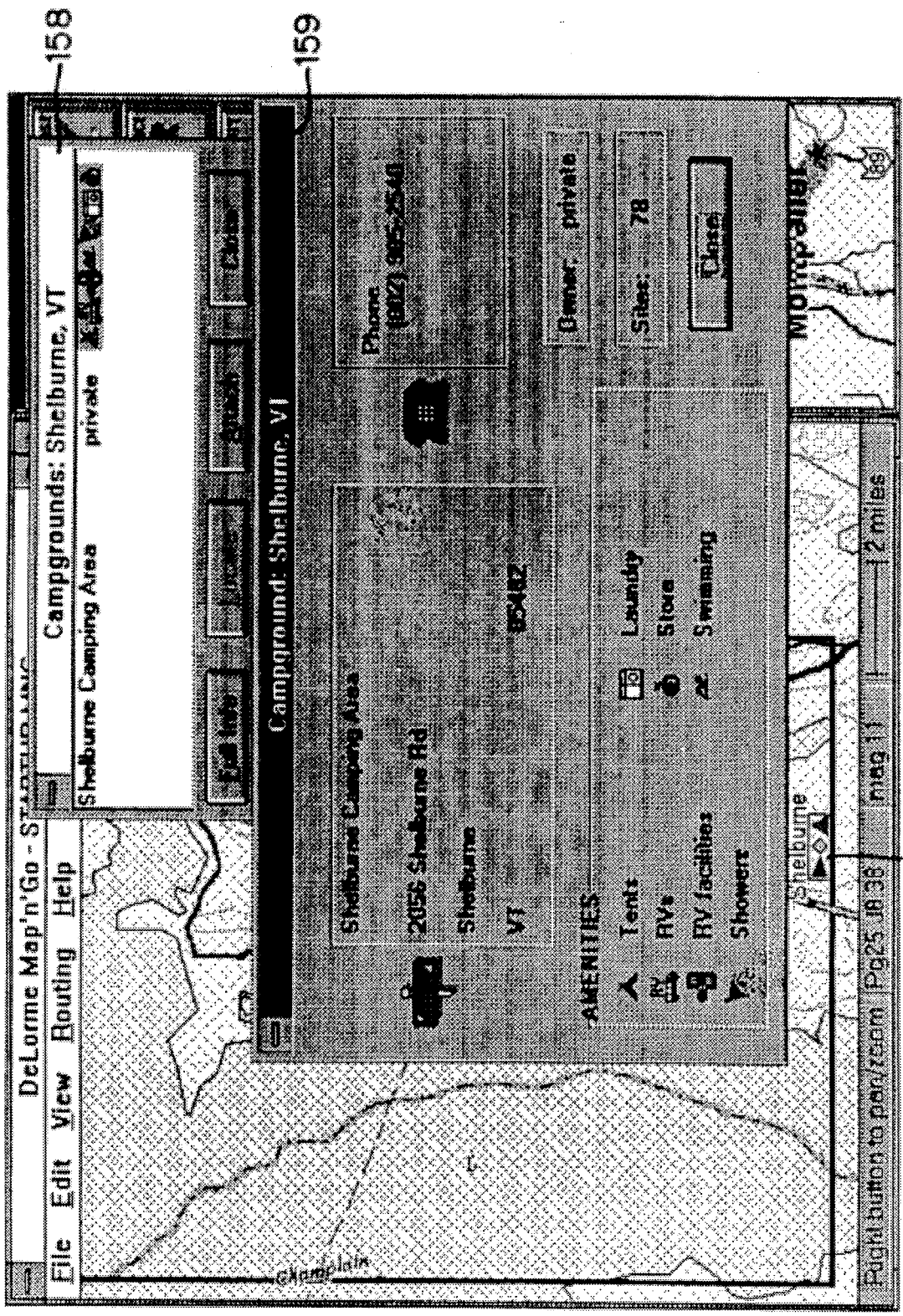
Figure 1N:
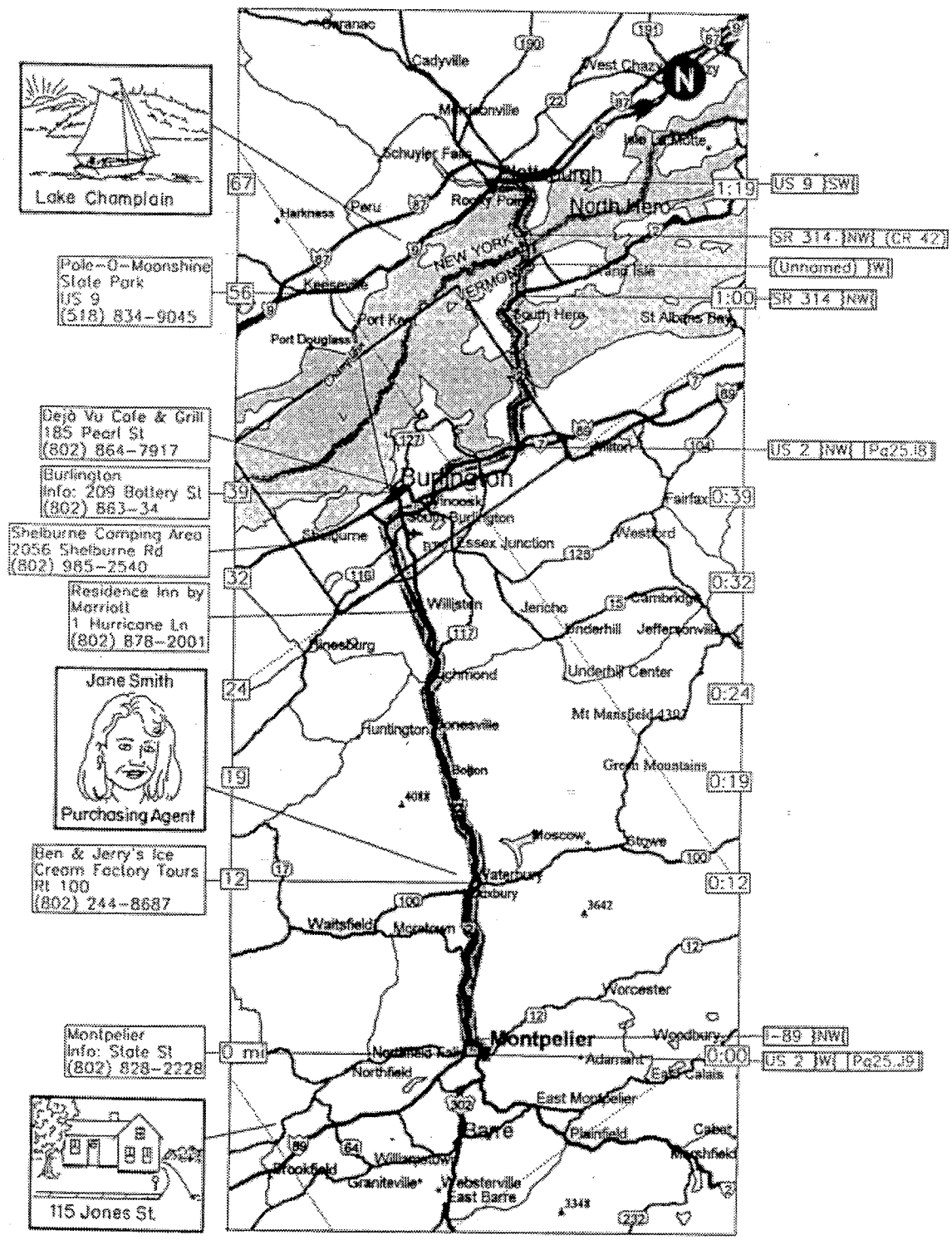
FIG. 1N illustrates an example hard copy printout of a travel plan prepared by the computer aided routing system.
Figure 10:
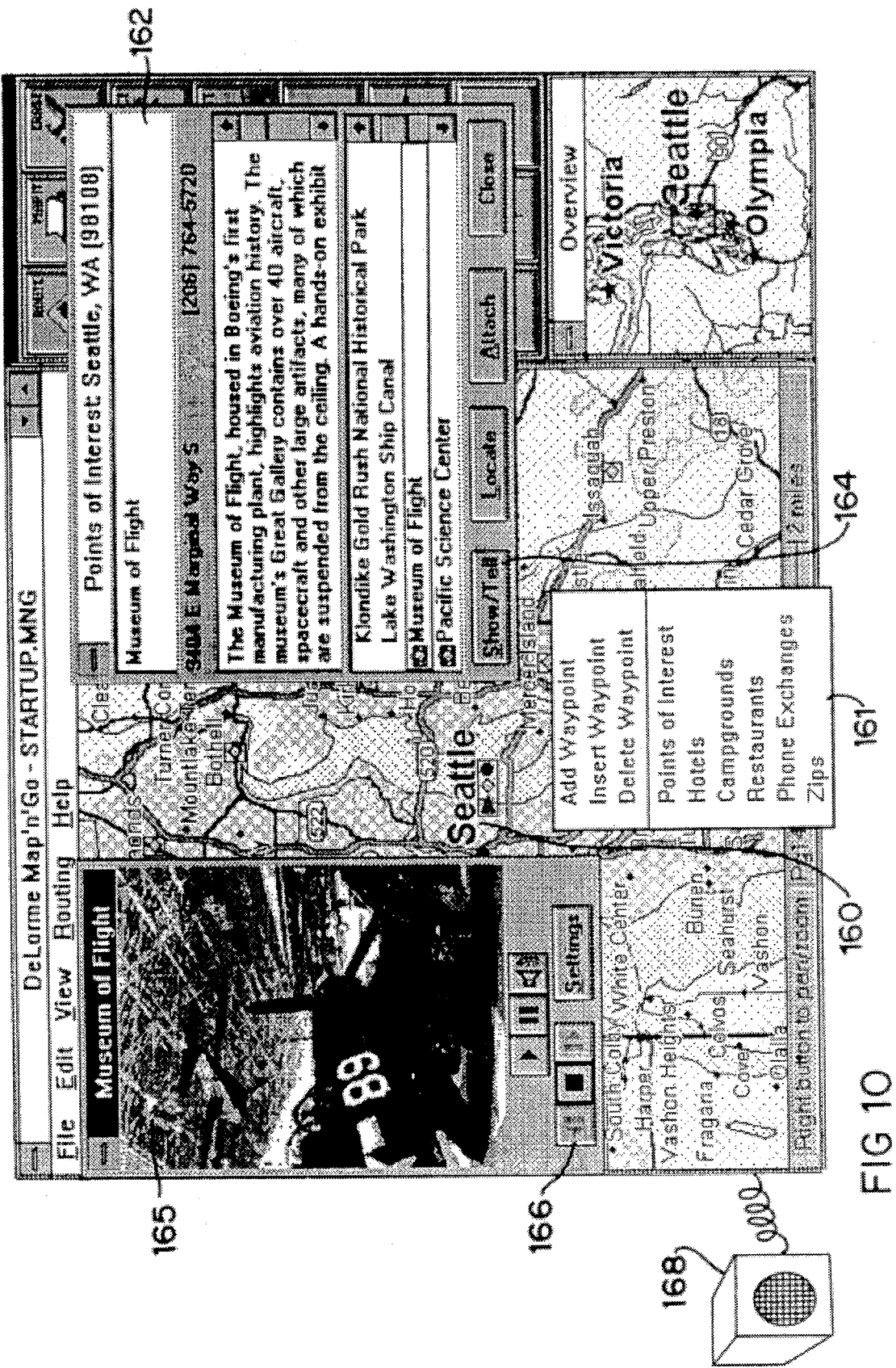

FIG. 1A therefore illustrates but one episode in a potential series of interactions between the routing and multimedia sides of the system, for producing a customized travel plan output, as exemplified by the annotated hardcopy travel plan 126 and further detailed in FIG. 1N. Such a travel plan, and alternative forms of output can result from attaching multiple points of interest, waypoints, and route modifications based upon a succession of multimedia presentations of information on many locations to generate a custom travel plan tailored to the user's personal preferences, as expressed throughout the whole sequence of interactions.

FIGS. 1B–1P

Figure 1P:
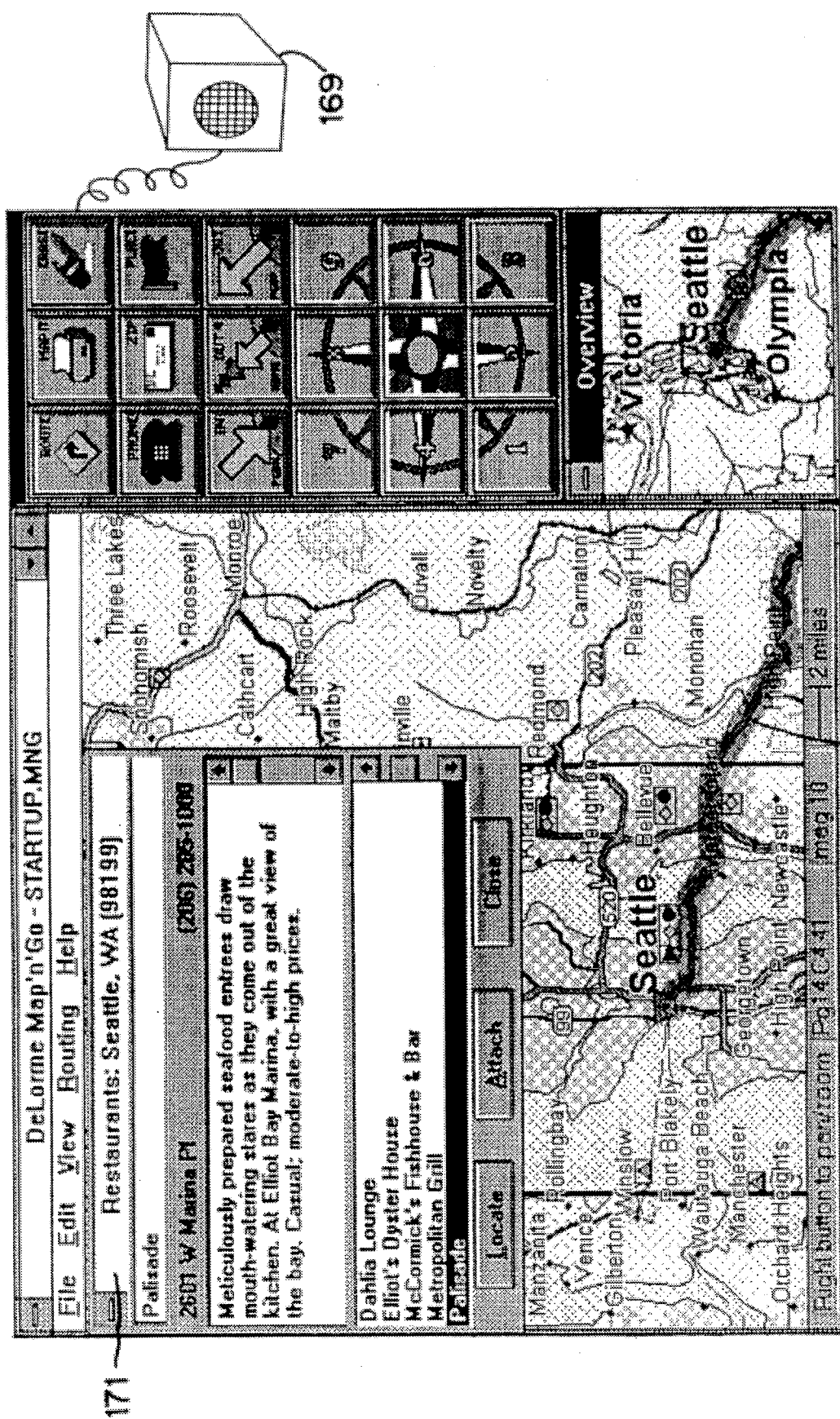

FIGS. 1B through 1P are screen captures from MAP'N'GO ™ 1.0 by DeLorme Mapping, Freeport, Me. 04032. MAP'N'GO 1.0 includes an auto road atlas of North America both on CD-ROM and printed in a companion paper map book. The MAP'N'GO 1.0 CD-ROM contains a travel planning software utility embodiment of the present CARS invention. This utility enables users to generate digital or hardcopy travel plans from routing operations and selected audio, text and pictorial information on hotels, restaurants, campgrounds and tourist attractions.

FIG. 1B reveals the basic user interface, including a map display, and diverse user options for manipulating the electronic maps. Three buttons with diagonal arrows in a row at 130 enable the user to zoom in or out among map scales. Nine buttons in the form of a compass rose at 131 cause the electronic map display to shift or pan to center on a new latitude and longitude. At 134, an overview screen shows the area depicted on the main map in a rectangle in relation to surrounding geography. Mouse clicks in the rectangle further enable the user to shift or pan the center of the map to a different location on the earth's surface. Page numbers and grid identifiers are indicated at 132 for coordinated use of companion paper maps. At 133, the main map scale is shown in terms of "mag" or "magnitude" such that mag 10 offers a closer typically more detailed view than mag 8 or 6, which each present increasingly distant perspectives or map coverage of larger parts of the earth's surface.

FIG. 1C also reveals the basic user interface, including a higher magnitude or closer scale map, as shown at 135. Compared to FIG. 1B, FIG. 1C offers a main electronic map display with more detail including geometric symbols in small rectangles under "Seattle" for example. These symbols represent the availability of supplemental travel information on specific types of locations e.g. Hotels, Campgrounds, Restaurants and Points of Interest. As disclosed hereafter, the user can access and manipulate the added multimedia travel information by various mouse or keyed commands.

FIGS. 1D, 1E and 1F illustrate assorted locating tools for finding geographic locations, recentering the electronic maps, and selecting specific places or geographic loci as input for routing or multimedia operations. Three buttons in the row at 136 prompt the dialog boxes for "Locate Place Name" at 137, "Locate Zip Code" in FIG. 1E and "Locate Area Code and Exchange" in FIG. 1F. This suite of locating tools facilitates searching lists by the names of places or cities and respective states or provinces as well as locating specified places by recentering the map display upon the identified location.

FIGS. 1G, 1H, and 1I express the interface for routing and related operations. The user can access the Manage Route menu or dialog box at 138 by depressing the Route button at 140. A quick pull-down menu at 139 also makes routing or related options available. The user can enter a starting place e.g. Montpelier, Vt. and a final destination e.g. Plattsburgh N.Y. plus intermediate, optional waypoints in between if desired. A suite of buttons at 141 enable the user to add, insert, delete, etc. items to or from the waypoint input list by routine text and graphic input means. Entered waypoints are symbolized on the map interface by numbered inverted triangles as shown at 147. The user prompts calculation of optimal routes by selecting between Quickest, Shortest or Preferred options at 143 or the 139 quick menu. The resulting route is displayed by highlighting the recommended roads on the map display as shown at 146 from Montpelier through Burlington to Plattsburgh. Added control over routing parameters or variables is provided by depressing Speed 144 and Prefers 145 buttons which access dialog boxes for adjusting the routing computation. The FIG. 1I dialog box allows the user to modify estimated or anticipated speed, or rate of travel, in miles or kilometers per hour for various road classifications. The FIG. 1H dialog box enables the user to calibrate the routing computation module to favor or avoid specified types of roads.

FIGS. 1J and 1K further depict routing functionality plus introduce multimedia capabilities. Accessed for example through the 139 quick menu in FIG. 1G, the Points of Interest Along the Way dialog box at 148 in FIG. 1J exhibits a list of three items termed POIs for points of interest in this disclosure. By prompting the Along the Way command, after inputting an ordered list of waypoint input, the user has caused the software to seek and find POIs within a specified distance from the computed route for which further information is available in the form of audio, pictures or text. By depressing either the Show/Tell All or the Show/Tell One buttons on the right in the 148 Along the Way dialog box, the user can prompt a multimedia presentation or series of presentations as shown at 151 in FIG. 1K. Controls along the bottom of the 151 picture display window on Burlington facilitate user control and selection of multimedia content and form, as described hereafter. In FIG. 1J, the Attach button on the right in the 148 dialog box enables the user to pick, fix and include selections of information with travel plan output, as disclosed further hereafter. Travel Plan dialog or list boxes are shown at 149 in FIG. 1J and 152 in FIG. 1K. Travel Plan list boxes are a form of routing computation output including a list of waypoints, routes, compass directions, nearby town, time and distance estimates for route segments and the overall route.

FIGS. 1L and 1M further depict information resources about specific types of places. As disclosed hereafter in relation to FIG. 1-0 and quick menu 161, the user can access information on specific types of POIs such as hotels or restaurants. List boxes for local hotels and restaurants appear at 154 and 156 in FIG. 1L and for campgrounds at 158 in FIG. 1M. These listboxes all have a button to Attach information on chosen accommodations to emerging travel plan output. These listboxes also allow the user to call for more detailed information or Full Info on selected locations of the respective types. Such information availability is indicated on the mapping interface by colored symbols within a small rectangle under or adjacent to the relevant place name, as shown for Shelburne at 157. The Campground information box at 159 shows a typical display of Full Info requested by the user concerning the Shelburne Camping Area.

FIG. 1N illustrates a typical, moderately complex MAP'N'GO ™ 1.0 hardcopy travel plan output, as developed in FIGS. 1G, 1J and 1K. Note the heading up orientation of the travel plan, with point of departure at the bottom and destination at the top of a strip map format, as compared with the conventional North is Up and South is Down orientation of the map display in FIG. 1G. The heading up strip map format of the FIG. 1N travel plan has the advantage of a mapping representation in which a route change involving a righthand turn e.g. in Burlington appears intuitively as a righthand turn on the travel plan map. The FIG. 1N travel plan illustrates text travel directions and travel time estimates in hours and minutes along the right margin. Pictorial and text attachments plus estimated miles of travel are presented in the left margin and border of the FIG. 1N strip map.

FIGS. 1-0 and 1P illustrate advanced capabilities to do routing or multimedia and combined operations. In the absence of any prior routing input, the user can click on a location, like Seattle at 160, for which multimedia is available. The user can then select various operations or types of information from the quick menu at 161. Selection of Points of Interest, for example, brings up a list box for tourist attractions situated in Seattle as shown towards the bottom of the Points of Interest window for Seattle at 162. As shown in the middle of the window at 162, the user can scroll through text information concerning selected attractions, such as the Museum of Flight. The user can prompt pictorial and audio information using the Show/Tell button at 164. The Show/Tell command results in a selectable audio or pictorial presentation at 165 and 168 subject to a flexible set of user controls at 166.

As shown in FIG. 1P, flexible control over multimedia form and content enables the user of an in-vehicle embodiment of the invention, for example, to maintain an output of audio 169 travel directions for the driver to hear. Meanwhile, the passenger can monitor the visual route map at 170 and, at the same time, browse through information about places to eat in Seattle using the 171 Restaurant list box.

FIG. 2

Figure 2:
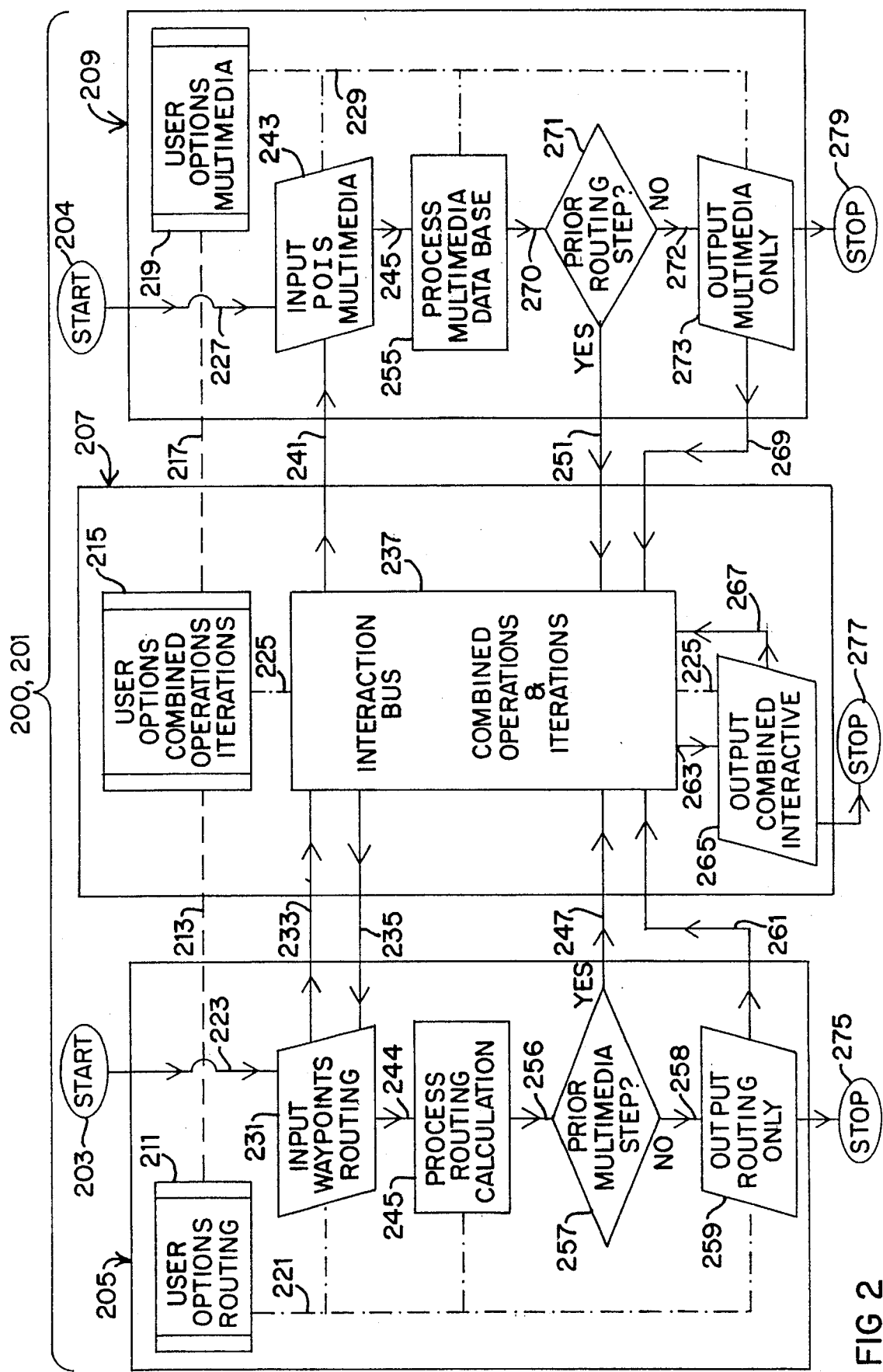
FIG. 2 is an overall block diagram of the interactive CARS system combining routing and travel operations with multimedia information operations.

FIG. 2 is a block diagram illustrating an interactive system 200 which combines computer software processes for routing and travel directions with presentations of multimedia information related to locations.

The CARS system works with one or more geographic information systems (GIS) 201 for storage, retrieval, manipulation, mapping, correlation and computation of spatial data related to geographic coordinates corresponding to locations on, above or beneath the surface of the earth within the realm of human activity. The David M. DeLorme U.S. Pat. Nos. 4,972,319 and 5,030,117, exemplify such geographic information systems for generating the map displays and output, as well as management of the geographic databases. Other GIS, or other database systems which relate data with geographic coordinates e.g. latitude and longitude, also suffice for use with the present invention.

On the left, in FIG. 2, block 205 comprises the subsystem for routing. Block 209, on the far right, relates to one or more databases of multimedia information concerning places or objects identified by geographic coordinates. In the middle, block 207 illustrates the data transfer processes and operational pathways facilitating interactivity, or combined operations, between the multimedia 209 and routing 205 subsystems.

Processing starts either with routing 203 or multimedia 204. For example, as a leading step within the routing subsystem 205, a typical application, or episode of use, proceeds with waypoint input 231, typically selected by the user, including a starting place, a final destination and optionally one or more mid-points or intermediate locations where the user may stop or pass through in his or her travels. Waypoints include departure points and destinations as well as intermediate or mid-route waypoints. Waypoints are listed in the users intended order of travel. The system 200 facilitates waypoint input for routing functions by a variety of means, including database searches, as disclosed for input of points of interest (POIs) within the multimedia block 209.

Next, in the course of a typical operation performed within the routing subsystem 205, the user prompts the computation of an initial route, or optimal travel path, between entered waypoints at step 245. Such software routing computations generally entail known methodologies for the manipulation and calculation of data comprised of vectors, line segments or sets of geographically located points or line intersections sequenced in temporal order or order of the occurrence of events related to travel or motion in geographic space. The user can calibrate or tune routing functions in order to compute either the shortest, quickest, or preferred route, among other parameters, as disclosed hereafter.

Based on user optimized route computations, step 259 next expedites one or more computer displays, graphics, hardcopy, text, audio or other output, representing the initial route as computed along the waypoints input by the user. Such routes are represented as various forms of itinerary including: (1) annotated maps upon which the optimal routes are graphically marked, accentuated or highlighted; (2) lists of waypoints, or place names or geographic coordinates typically arranged in the order encountered along the route; (3) point to point directions how to take the optimal computed route indicating turning points, landmarks, navigation aids, signposts etc. along the computed route also typically arranged in temporal order of travel; (4) various combinations of the three forms of route output or itinerary just listed.

As pictured in FIG. 1N, the preferred route output includes map displays or map hardcopy with the optimal route highlighted, marginal travel directions in an easy to follow format with the point of departure consistently at the map bottom, and the destination near the top of the strip map format. Alternative embodiments express such route information output in pure form at step 259 in FIG. 2, by employing other graphics or map formats, images, text and numbers, or sound/voice output to convey the recommended or optimal itinerary or route.

On the other hand, a typical operation or program can begin on the multimedia side 209 with user entry of one or more points of interest (POIs) selected by the user inputting individual POIs or by database searches, sorting for specific predefined types of POI, related characteristics, or linked data or information using the underlying GIS 201. In FIG. 2, to set up a presentation of multimedia place information, the user can perform individual or manual POI input at step 243. For example, a vacation traveler can request multimedia information on two or three popular resort locations recommended by friends, ads or travel articles by using well known data entry methods such as keying in the resort names, or nearest place name, or geographic coordinates. The system 200 is further able to locate individual POIs for input by enabling a user to select from lists of place names, or through linked phone exchange, zip code or geographic coordinate data. The user can engage in manual input of individual POIs by clicking at points, symbols or place names on the map display.

In fully developed embodiments of the CARS system 200, steps 243 and 255 work together within the multimedia subsystem 209 to enable the user to execute database searches for desired multimedia input. Step 255 enables and manages automated POI sorts or searches in order to generate, among other tasks, one or more lists of locations or POIs, about which information is available in the underlying database system 201 as potential content for multimedia presentation in step 273. For example, step 255 facilitates user searching for resorts of a predefined type e.g. skiing, tennis club, theme park, etc.; or for a list of resorts with specific characteristics including low cost, desired climate, nearby attractions or transport, etc.; or for a list of resorts linked to certain data or data types e.g. graphic images, hotel reservation access, or banquet or conference facilities information, etc. In step 243, the user can then either edit the results of such database sorts, or input the entire list of resort locations produced by such a database search. Whether manually entered by the user or taken from a user designed database search, POI input at step 243 calls forth multimedia information presentations concerning the resort location inputs.

As already noted, step 231 waypoint input within the routing subsystem 205 can involve identical database searching processes, as well as manual input of individual locations. This specification uses the term waypoint to refer to a routing input item at step 231 in the routing subsystem 205. POI for point of interest is the term generally reserved for an item of multimedia input at step 243 in the multimedia subsystem 209. Terms such as place, location or geographic object refer to definite points, loci or sites on or proximate to the surface of the earth. Such loci, points or sites are associated in the GIS 201 with particular or ascertainable geographical coordinates e.g. latitude\longitude, plus an index of elevation, altitude or depth as appropriate, A single unique place, location or geographic object could be both a waypoint i.e. a routing input item and a POI i.e. a multimedia input item. Outputs and inputs are transferred between routing and multimedia as part and parcel of important applications of the system technology.

Within the multimedia subsystem 209, step 273 facilitates diverse multimedia information presentations or output on places, locations or geographic objects listed as POI or multimedia input in step 243. The step 273 output or multimedia presentations are subject to flexible user control, inviting further user response and interaction. The invention 200 facilitates user participation in, and user control of, both the form and content of ongoing multimedia presentations. The multimedia subsystem 209 provides access to commands or user options for making further manual selections of individual POIs, or further database POI searches, even in the middle of an ongoing multimedia presentation. In step 273, as detailed hereafter, the user can elect to repeat or skip parts of a multimedia presentation, pick among or combine forms of media such as audio, text or graphics, alter the current POI list governing the order and geographical focus of the unfolding ongoing multimedia experience, or prompt alternative or more detailed multimedia presentations about the places of interest to the user.

Pure routing is accomplished entirely in the routing block or subsystem 205. Block 205 generally illustrates a software process for routing which computes the temporal arrangement, sequencing and linear structure of travel or movement, between two or more places or waypoint locations, following specified transportation routes such as vehicular roads, hiking trails, shipping channels or flight paths, etc. Such routing computations are subject to adjustable parameters. For example, users can opt to compute the shortest route in terms of the absolute travel distance, or in the alternative, the quickest route in terms of the predicted, elapsed time it will take to travel the route. Routing output from such computations can also report estimated distances and expected time frames for an overall journey as well as discrete parts or segments of an optimal computed route. The users can engage exclusively in routing functions, absent any intervening multimedia operations, starting at 203 and stopping at 275, all within the routing subsystem 205.

Similarly, pure multimedia can commence at 204 and stop at 279, unfolding entirely within block 209, without reference to or interaction with the routing subsystem 205. The term multimedia in this context refers to a broad range of audible, visible, legible, or otherwise humanly perceptible data or information as stored, processed, output and transmitted within and between computer systems. The GIS at 201, underlying the invention 200, stores, retrieves, manipulates and manages discrete units or items of information in various media in relation to geographic coordinates, Block 209 in FIG. 2 illustrates a multimedia database subsystem for flexible, user controlled, processing and presentation of located information in various media and formats including alphanumeric data, text, graphics, still or moving imagery, and sound, etc. which can be separate from routing, The overall system 200, however, enables transfers of intermediate and final outputs between the independent routing 205 and multimedia 209 processes or subsystems. Multimedia and pure routing functions, as just discussed, are blended or integrated essentially by sequencing multimedia and routing operations under user control. Routing 205 plus multimedia 209 subsystem operations, performed sequentially, produce combined or interactive output at step 265. The combined or interactive output typically includes a unique, customized or personalized travel plan provided in the form of map displays or hardcopy maps annotated with information about places, and travel directions, with the optimal computed route highlighted, labelled or otherwise marked. Users can opt to further embellish combined, interactive travel plan output with selected multimedia graphic images, videos, animations, sound or voice output as well as text, documents, numeric or tabular data about locations, POIs or points of interest or other geographic objects along the way i.e. on or near the computed optimal route. One preferred form of such combined travel plan output is illustrated in FIG. 1N.

User interaction with routing and multimedia, as illustrated at step 265, gives a combined interactive output that reflects choices made by the user. Step 265 output integrates the user's decisions about waypoint input or routing calculation parameters, plus the user's selection of individual POIs or multimedia inputs derived from database searches, along with the user's interaction with and responses to multimedia presentations. For example, in order to revise or refine his or her emerging itinerary, the user can modify an initial route by altering the current waypoint list adding places he or she really desires to visit, or excluding places from the itinerary, in response to selected multimedia information about the locations found along the initial route. The system 200 further enables users to attach or include multimedia selections to or with travel plan output i.e printouts, audio, screen displays, etc. As shown at 265 in FIG. 2, combined output incorporates the user's choices and interests as exercised through one or more interactions with and between the routing 205 and multimedia 209 subsystems.

FIG. 2 illustrates the invention's capability for combined interactive routing and multimedia about locations, in the middle block 207, and related lines portraying operational flows between the routing block 205 and the multimedia 209 block. Pathways for transfers of intermediate or final input/output among the routing 205 and multimedia 209 subsystems coinciding with pathways for sequencing combinations of multimedia and routing operations are illustrated by solid lines with one-way arrows symbolizing a single direction of flow e.g. 233, 235, 241,247, 251,261 & 269.

As disclosed in detail hereafter, various input/output transfers and combined routing/multimedia operational sequences take place through the interaction bus 237. Within the middle block 207, the interaction bus 237 facilitates repetitive, looped or iterative operations as well as user interactions producing combined output at step 265 by sequencing multimedia and routing operations. For example, the system 200 enables users to blend pure routing output generated at 259 with subsequent multimedia operations by transferring data via path 261, the interaction bus 237, and path 241 to the multimedia input step 243. In this manner, users can prompt a multimedia experience of information focused upon places found along the way i.e. within a preset distance of, or in a user defined region around, an initial route or set of waypoints. Thus in typical operations, the invention 200 sequences prior routing and subsequent multimedia operations to generate route based multimedia information presentations on locations or points of interest along an initial route. Output 259 from prior route computations gets transferred from block 205, the routing subsystem, through the interaction bus 237, over into the multimedia subsystem 209 which then absorbs the route data as multimedia input at step 243. The user can then pick and play one or more multimedia presentations about points of interest or geographic locations found in the vicinity of the current optimal route highlighted on the map display.

In the examples just cited, the geographic content of the subsequent multimedia presentation is circumscribed by the prior routing operation. As detailed hereafter, location data from the routing subsystem 205 focuses or sets the overall agenda for the following multimedia show about places nearby the computed route. This location data comes to step 243, to become multimedia input, through the interaction bus 237, via procedural and data transfer pathways at 261 and 241. Any resulting multimedia presentations are no longer pure, in the language of this disclosure. Rather the multimedia has been combined with, and derives its geographic context or structure from, the prior routing operation. Routing operations are also preceded by multimedia in other applications or uses of the invention 200, as disclosed hereafter. In those cases, the geographic context of the subsequent routing follows the lead i.e. the locational focus of the prior multimedia.

So called pure multimedia output at step 273 involves no prior routing operations. No multimedia operations come before pure step 259 routing output. In FIG. 2, steps 257 and 271 distinguish such pure sequences of operations from mixtures or series of multimedia and routing functions. Given the existence of a prior routing step or operation, output from such a combined prior routing and subsequent multimedia sequence of operations is shunted in step 271 away from step 273, reserved only for pure multimedia output. Output from a routing operation followed by a multimedia operation appears at step 265, arriving there by dint of the logic of step 271, then path 251, the interaction bus 237, and path 263. Combined interactive output at 265 can also follow one or more prior multimedia operations followed by one or more routing operations. In such cases, data transfers and operational sequences follow the logic of step 257, through path 247, the interaction bus 237 and path 263, resulting in combined output at step 265.

The interactive system 200 facilitates additional iterations and combinations. For example, during or after the playing of a multimedia presentation based upon an initial route computation as just described, the user can then decide to add or remove one or more locations or places from his or her itinerary as a matter of personal preference, responding to the multimedia experience. This additional operation gets done by a transfer of the combined multimedia output from step 265, through path 267, looping back into the interaction bus 237, to become routing or waypoint input at step 231 via path 235. In this manner, the user calls forth a new or revised route computation, via step 245, based on his or her responses to multimedia information about points of interest found along the initial route.

The foregoing example of system usage focuses on a combined interactive multimedia and routing process made up of a sequence of three operations: (1) an initial routing computation and output (R1); (2) a multimedia information presentation about places or points of interest found nearby the initial route (M1); and (3) a re-calculation or a modification of the initial route output based upon new waypoint input stemming from the user's response to the multimedia presentation (R2). In a shorthand notation, amplified below, this combined operation is formulated thus: R1, M1, R2=CO1. Equivalently in words, first routing operation, followed by first multimedia operation, then second modified routing operation yields first combined output.

Anytime that output results from a substantial sequence of routing and multimedia steps, then the resulting combined output appears at step 265. Steps 259 and 273 are reserved for pure output, meaning multimedia not preceded by any routing, as well as routing steps absent any prior multimedia, software decisions managed in steps 271 and 257 respectively. Otherwise, steps 257 and 271 work to shunt the product of sequences of multimedia and routing operations through the interaction bus 237 to appear as combined interactive output at 265 in FIG. 2. Such a combined output could result from a single multimedia operation followed by a single routing operation. Moreover, one or more multimedia operations can precede one or more routing operations. What is more, as exemplified hereafter, the CARS system 200 is capable of complex, prolonged iterations and operations composed of at least one multimedia or at least one routing operation combined with a plurality of counterpart operations.

As a shorthand notation for such combined or sequenced sets of operations, this disclosure employs the expression R1, R2, R3, Rx=RO1 to denominate a series of pure routing operations and its pure output as shown in step 259 in FIG. 2. M1, M2, M3, Mx=MO1 denote a pure multimedia operational sequence and its multimedia only output as shown at step 273 in FIG. 2. Thus, sequences of steps such as R1, M1=CO1 and M1, R1=CO2 represent combinations of multimedia and routing operations productive of combined, interactive output as shown at step 265 in FIG. 2. The system 200 is capable of complex iterations and combinations of operations as, for one example, expressed in the following shorthand formula: R1, R2, M1, R3, M2, M3, M4, R4, M5=CO3.

As detailed hereafter the CARS system 200 enables even more complex operational chains and loops, typically because the user is engaged in replaying selected routing and multimedia steps or operations, usually with minor or modest variations of inputs and parameters, in an effort to refine his or her travel plan. Complex operational sequences also occur because the user shifts back and forth repeatedly between routing and multimedia tasks, for example, to play multimedia information related to routes and waypoints appearing on the map display, or to revise their travel plans by altering the current list of waypoints in response to multimedia information about places and POIs, Thus, the system 200 enables the user to generate, review, reshape, edit, improve, simplify, complicate or otherwise amend a custom, personalized or individualized travel plan. Travel plans are typically the product of a unique process of interactivity, consisting of particular series of routing and multimedia operations, arranged by the user. The user can impose his or her idiosyncratic responses or personal choices to shape each operation's form and content, or repeat and vary operations, by adjusting parameters and by exercising commands and options disclosed in more detail hereafter.

The user can opt for a quick and simple routing operation or extensive travel planning with multimedia input. For example, a user can employ the system 200 just to input Boston as a point of departure and New York as a final destination, then compute the quickest route for automobile travel between the two cities. Given more leisure time, however, the user can elect to proceed with the invention 200 to experience multimedia about points of interest around the quick car route to New York from Boston, or to explore and compare rail, air or marine routes between these two cities. Moreover, in response to the multimedia experience, this user can plan various side trips, or a much more convoluted route incorporating intermediate waypoints, including places the user wants to visit. Furthermore, the user can choose to compute a combined transportation route, for example, driving by car from Boston, Mass. to Providence, R.I., then taking a train to New Haven, Conn., with the journey on to New York City completed by bicycle, or on foot.

After making an extensive travel plan, including more side trips or stopovers than available leisure time, the user can opt to edit or revise down an overambitious travel plan. This task of prioritizing or selectively reducing a travel plan entails yet another series of multimedia presentations and routing computations, aimed at the discriminating elimination of the intermediate destinations of least interest to the user, and the side trips or modes of transportation which involve too much travel distance or travel time. This disclosure employs the shorthand notation explained above in order to help express or describe such complicated sequences of multimedia and routing operations in relation to the FIG. 2 block diagram, or more detailed flow charts presented hereafter.

The shorthand notation, proposed above, helps delineate and understand the crucial ability of the invention 200 to facilitate a diversity of repeated or combined software operations. The interaction bus at 237, within the interaction block 207, enables pure sequences of iterative operations e.g. a series of routing operations only, as well as sequential combinations of mixed multimedia and routing operations. By taking or following different paths through the interaction block 207, for example, the user can either recycle a pure routing operation, with deliberate variations, or combine antecedent routing output with subsequent multimedia operations to produce presentations of information in various media related to the prior routing output. Vice-versa, the user can repeat a pure multimedia operation varying significant details. Or the user can invoke an ensuing routing operation, after a multimedia presentation about locations or geographically located objects, typically in order to plan and map out optimal travel routes and transport between selected places or points of interest experienced by the user in the multimedia.

By way of illustration, in FIG. 2, the routing subsystem 205 enables the user to compute and compare alternate routes or modes of transportation, by iterative or cumulative operations accomplished through the interaction bus 237. Starting with an initial pure routing computation, such cyclical sequences of pure operations involve looping or feeding step 259 output back up via path 261, through the interaction bus 237 and path 235 in to the routing or waypoint input step at 231. In this manner without any reference to multimedia information, the user replays and reworks routing computations in order to insert or delete waypoints, or to try other parameters for routing.

For a concrete case, suppose the user first computes the quickest way by automobile from Boston to New York City. The user has many options for a second or followup routing operation, which takes the first routing output as the baseline input for one or more successive routing operations. As a second phase for instance, the user can recompute the first route in order to compare the cost and benefits of travel by rail or air or sea to New York City from Boston. In the alternative, as a second operation of divining optimal automobile routes, the user can opt to readjust software routing parameters, as disclosed hereafter. Then, the user can recompute and output the shortest route in total miles or kilometers, or the best roads and highways for wide or heavy truck loads, or the most scenic automobile route from Boston to New York City. Other optional routing software parameters also are described in more detail elsewhere in the specification. Yet another option for a second or successive routing operation is for the user to recompute the optimal route from Boston to New York City, incorporating the user's personal desire to stopover en route for an overnight visit with friends or relatives living in Bennington, Vt.

In shorthand notation already proposed, all examples, just expressed in the foregoing paragraph, of a second or successive routing operation get formulated as follows: R1, R2=RO2. This particular expression denominates a pure sequence, composed of two routing operations producing routing output only at step 259. Of course, the initial or first phase routing operation i.e. the quickest route by car from Boston to New York, upon which later iterative operations are based, is expressed as follows: R1=R01. The vital result is that the first and second routing operations produce first and second outputs i.e. RO1 and RO2 for the user to consider and compare in planning his or her itinerary. Such iterative or followup routing operations enable the user to evaluate and make choices between two or more alternate routes or modes of transport by looping or recycling routing subsystem operations through the interaction bus 237 and interaction block 207, without necessarily involving multimedia.

In a similar fashion, the invention 200 enables the user to replay multimedia operations in sequences, purely within the multimedia subsystem 209. For example, the first such operation would be expressed as M1=MO1. M1, M2=MO2 expresses a range of possible second phase operations in a pure multimedia only sequence. Such replaying within the multimedia subsystem 209 is accomplished by transferring or looping the MO1 output from step 273 at the end of first operation via path 269 through the interaction bus 237 and path 241 to step 243 where the second or iterative operation can begin.

The formulae and pathways, cited in the foregoing paragraph, are consistent with recycled multimedia operations such as the following. (1) MO1 comprises a multimedia presentation of all sports oriented resorts on the West Coast of the United States as found in a database search. The user elected only to examine a brief text description about each of the 100 resorts found in the search, to browse for places to go on his or her vacation. (2) MO2 comprises a user selection or short list of 10 from the full MO1 list of 100 resorts. The user has chosen to experience more multimedia information, such as digital photos or videos of selected resorts, voiced descriptions of the sports facilities, text concerning nearby cultural happenings and price information in tabular form about the short list of 10 resorts picked by the user in browsing the brief text descriptions about all 100 resorts on the MO1 list. In yet a third phase multimedia operation, the user could review, compose and save selections of the multimedia information about the 5 personally most appealing resort locations to share with his or her family. Including this third operation of editing down the list to five resorts and selecting related information in various media, the full sequence of pure multimedia discussed in this paragraph is formulated as follows: M1, M2, M3=MO3.

The user may be content to show family members the MO3 pure multimedia presentation on his or her favorite five resorts. But the invention enables further operational sequences at the user's election. In addition to or as an alternative to more operations in the multimedia subsystem 209, the user can choose to engage in diverse followup travel planning functions utilizing the routing subsystem 205. Routing operations, following up such multimedia operations, entail transferring the resort POI data by way of path 269 through the interaction bus 237 and path 235 to the waypoint input module at 231. Then, as described further in relation to FIG. 4, the user can variously pick and arrange the resort POIs or the nearest nodes subject to routing computations as waypoints for one or more subsequent travel planning or routing operations.

For example, the user might proceed to compute an optimized route from home to the one resort location most preferred by the whole family. This entails transfer of POI data on the selected resort from the multimedia subsystem 209 into the waypoint input module 231. There the user can input the resort location, or the nearest routable node, as the ultimate travel destination. The user's home address is entered as the point of departure. Then, in step 245, the user can prompt the computation of the quickest, shortest or another optimized route, as detailed hereafter. In combination with prior multimedia tasks developing a short list of resorts, this one simple followup routing computation expands the overall formulation to the following: MI, M2, M3, RI=C01. The first three multimedia operations can also be expressed in terms of their pure output M03, which the user can elect to save for later comparison and/or added processing. Thus, the overall sequence of combined routing and multimedia can be equivalently and compactly formulated as: MO3, RI=C01. In any event, CO1 stands for a combined output rather than pure output. Following up the antecedent multimedia selection of resort locations, the routing operation R1 proceeds by way of steps 245 and 257, then path 247, through the interaction bus 237, down path 263 to step 265. There it becomes the COI combined output, typically in the form of highlighting the optimal computed route from the user's home to the selected resort on the underlying map display.

As just noted above, the system 200 lets the user save, compare or continue processing output from pure and/or combined routing or multimedia operations. Although essentially equivalent to MI, M2, M3, RI=C01, for example, the formulation M03, RI=C01 indicates that the prior pure multimedia output was saved or memorized by routine means, then retrieved and combined with the RI followup routing operation. Similarly, the user can save the COI combined output for later processing. This capacity of the invention 200 for later processing of memorized output, or operational sequences, enables the user to perform a diversity of combined routing and multimedia based on the same initial set of operations such as produced the MO3 or COI outputs. This feature helps to compare routes and compute multiple travel plans.

For example, instead of clearly preferring one resort on the MO3 list, based upon their experience of the MO3 presentation of multimedia information, suppose that the user's family favors two resorts about the same. The choice between the two resorts might depend on the travel cost or distance or other factors related to the routes to the two resorts. In such cases, the invention 200 facilitates additional routing operations combined with the prior MO3 output to aid the user comparing routes and composing various alternative travel plans. MO3, R2=C02 is the shorthand formula for a second followup routing operation from home to the family's other favored resort, yielding combined output C02 for comparison with CO1. Moreover, an extended family, whose members reside in different places, but who are planning to vacation together, can compose multiple travel routes from their respective homes to the chosen resort. All based on the MO3 list, here is a group of shorthand formulae for various sequences of operations producing multiple routes to a single resort for an extended family living in three different locations e.g. grandparents residing in Santa Fe, parents in St. Louis and a son or daughter away at college in Chicago: MO3, R3=C03; MO3, R4=C04; and MO3, R5=C05. This capability of the system 200 to save the output from operational sequences, for later replay varying formats or inputs subject to the user's control, facilitates comparative or multiple routing operations which the user can combine selectively with multimedia information about places along the routes.

The invention 200 also provides for selectivity, flexibility and iteration in composing operational sequences so that the user can engage in extended integrated series of operations to develop and refine a single personalized travel plan. Such unique custom or individualized travel plans typically culminate from sequences of pure or combined multimedia or routing operations. The system 200 is interactive i.e. enabling the user to control operational content, sequencing, parameters and media. This disclosure uses the term "interactivity" to describe how the system 200 provides for flexible ongoing user control over the order or sequencing of operations, and the exercise of optional commands and parameters, shown generally at 211, 215 and 219. User options are described further relative to FIGS. 1B–1M and I-O to 1P which picture the user interface for one embodiment. Command and parameter options that influence multimedia or routing format, content or sequencing are also disclosed in relation to FIGS. 3, 4, 7, 8A–8E. For one example, the user can calibrate or adjust the module for routing calculations, at 245 in FIG. 2, to get the quickest or shortest travel route, or other preferred or optimal parameters for routing computations, as detailed relative to FIG. 4. For another example, paths 233, 235, 261, 263, 267, 241, 251 and 269 comprise optional pathways for the transfer of location data and travel information in various media between the routing 205 and the multimedia subsystems. Selecting among these pathways, the user controls sequencing, combination and iteration of multimedia and/or routing, as detailed hereafter. Also, alternative options to start and stop operations shown at 203, 204, 275, 277 and 279 facilitate user control over operational arrangements as well as input and output formats. Moreover, the user exercises flexible controls over the medium, topical focus and substantive content of the geographic information or travel presentations which are generated in the multimedia subsystem 209 in FIG. 2, described hereafter in more detail relative to FIGS. 8A–8E.

Along with the capability to modify multimedia and routing parameters and content, the invention 200 provides user control over operational sequencing and combinations, facilitating the production of individualized, custom, or personal travel plans. This disclosure uses the terms "individualized, "customized" or "personalized" to characterize output generated with substantial user interactivity. Even in the example previously cited, where the user only opts to compute the quickest automobile route from Boston to New York City, the user exercises choice over the point of departure and the travel destination. More user interactivity productive of custom output is illustrated by the added selection of intermediate waypoints, such as Hartford Conn. and Providence R.I., and the specific order of travel between waypoints. User choices or interaction are also enhanced by the capability for comparison of varied routing parameters e.g. scenic or shortest route and varied modes of transport e.g. rail, bus, ferry, air as well as automobile travel . The invention further enables individualized or custom output by facilitating unique iterative, sequenced and combined multimedia or routing operations, according to the user's responses and preferences while operating the system 200.

Customizing travel plans through the selective exercise of user controls over the sequencing and combination of operations was already exemplified above in the case of the resorts picked first in the multimedia subsystem 209. The user could proceed thereafter with various scenarios for followup routing tailored to user requirements and preferences. Comparing and evaluating alternate destinations and routes enabled the user to develop or refine individualized travel plans, reflecting "roads not taken" or selectively deleted waypoints as well as explicit travel information. Such customized travel planning often entails some operational sequences being repeated with the user varying the format, content, media and parameters involved in succeeding operations. Such systematic variations help the user to decide about alternative waypoints, transport, points of interest, or variable informational forms and content, in order to compose a personal travel plan. Travel planning is typically individualized by the user controlling transfers and integration of data between the multimedia 209 and the routing 205 subsystems by means of user selectable pathways through the interaction bus 237. For instance, individualized travel plans are further facilitated by operational sequences, commencing in the routing subsystem 205, which are then combined with followup presentations in the multimedia subsystem 209.

For example, going back to the case of planning travel from Boston Mass. to New York City N.Y., the user commenced operations at 203 in the routing 205 rather than the multimedia subsystem 209. On the one hand, the user can conduct sequences of pure routing, adding intermediate waypoints and varying routing parameters, as formulated for example by the short hand expression RI, R2, R3=RO1. Other even longer pure routing operational sequences could involve added evaluation of alternate means of transport. On the other hand, the invention 200 provides the user with commands or options for variously interposing multimedia operations.

FIG. 2 depicts the flexibility or user options as provided by the invention 200 for variable or custom sequences of routing and multimedia operations. For one instance, having done no more than enter Boston as the starting point plus New York City as the final destination in the waypoint input module 231, the user can choose to transfer operations and data via paths 233 and 241, and prompt multimedia presentations on the attractions, accommodations and other geographically located information about Boston or New York City, which are stored in the CARS database. This option is further described in relation to FIG. 4, particularly step 431. Alternatively, the user can opt to transfer to the multimedia 209 only after computing and displaying an optimal route from Boston to New York through steps 245 and 259 in FIG. 2. Then, paths 261 and 241 enable access to a variety of subsequent multimedia about Boston, New York City, or points of interest or POIs found along or within a certain user defined region around the optimal route. FIG. 4 especially step 471, FIGS. 5, 6A and 6B, and related text, further specify this process whereby POIs are found or located along the way or within a user defined distance from a computed route or its component waypoints. In sum, the sequences of operations discussed in this paragraph generally reduce in the shorthand notation as follows: R1, M1=CO1. The one multimedia operation, following one prior substantial routing computation or waypoint input operation, logically generates combined output 265 via path 251, the interaction bus 237 and path 263.

The invention 200, particularly the 207 subsystem governing interactive, iterative or combined operations, enables more individualized travel planning by means of varied combinations or sequences of operations. For example, pathways 251 and 235 offer the user the opportunity following the R1, M1 sequence to return to the routing subsystem 205. The user could then add, delete or insert waypoints selected in response to information experienced back in the multimedia, as detailed hereafter relative to FIG. 4. As detailed more in relation to steps 465 and 467, the user can also return from the multimedia 209 to the routing subsystem 205 to attach multimedia information about POIs to a developing travel plan, or to alter the dimensions of the region around the user's intended route in which the system 200 searches for POIs and related multimedia information. By returning for an added routing operation, the user enlarges the general formulation of sequenced operations in shorthand as follows: R1, M1, R2=C02. C02 combined output gets done at 265 via paths 247 and 263. The M1 multimedia step is recognized as "prior" to R2 in step 257.

As already disclosed, the invention 200 lets the user stop and output or memorize RO1, CO1 and C02 or other output from any valid sequence or combination of operations. As emphasized and exemplified below, the invention 200 also facilitates much more extensive series of operations refining and individualizing the user's emerging travel plan by repeated and varied multimedia or routing operations. Extending the example in the last paragraph, new waypoints or routing computations, performed in R2 after returning from the preceding M1 multimedia operation, may tempt the user to further explore multimedia information. As detailed hereafter, new waypoints or altered route computations can often generate added POI inputs about locations found around or along the new waypoints or computed route. Further exploration of the new POIs through an added multimedia operation entail an expanded sequence of operations as follows: R1, M1, R2, M2=C03. In turn the added multimedia exploration M2 could provide information on locations motivating the user to return yet again to the routing subsystem 205, for example, to insert or delete more waypoints at 231 as a matter of personal or individual preference. This added operation expands the formulation as follows: R1, M1, R2, M2, R3=C04. Moreover, the system 200 also permits repeated and varied multimedia or routing operations within a given sequence. Thus, R1, R2, M1, M2, M3, R4=C05 is a feasible operational sequence.

Combined outputs C04 and C05 stem from relatively extensive operational sequences. The invention 200 facilitates still more complex sequences and combinations of operations, typically with more user interaction or exercise of user options built into the system 200. Therefore, as a rule, the more elongated or complex sequences of routing and multimedia operations tend to generate travel plan outputs which are more unique or individualized. The invention 200 further enables the user to edit down or prioritize overdeveloped travel plans eliminating side trips or waypoints of less personal interest, for example, in case time does not permit an overambitious itinerary. Such editing typically results in a simplified, concentrated travel plan. But, this editing process nonetheless involves additional routing or multimedia operations in order to delete less interesting waypoints or remove attached information about lesser POIs. Thus, relatively succinct custom travel plans could result from extensive sequences of multimedia and routing. In sum, the invention 200 provides flexibility and control over the sequencing, media, parameters and substance of routing and multimedia operations, yielding individualized travel plan outputs. Such travel plans are uniquely shaped and defined by the process of user interactivity involved in developing each travel plan, and optionally editing it down.

FIG. 2 also provides an overview of the user options and program controls, described in greater detail elsewhere in this disclosure as, for example, command menus, dialog boxes, control panels, adjustable parameters and global/local system settings. The user exercises such user options by command input and system management methodologies well known to software artisans e.g. conventional keystroke sequences; mouse, joystick or touch-screen manipulations on pertinent pixel locations, symbols and buttons; command text entries; voice-recognition technologies; macros and batch commands; and equivalents. In various embodiments, particularly embedded applications, such user control mechanisms are consolidated, overlapping, redundant, or simplified, as dictated by consumer requirements, user friendly design criteria and anticipated usage patterns.

For conceptual purposes, FIG. 2 depicts three distinct control interfaces, one for routing 211, another for the interaction block 215 and a third for multimedia 219. Simple dotted lines, at 213 and 217, indicate that all command and control interfaces are accessible between blocks or subsystems, one from another. Users involved in a routing process, for example, can stop in mid-operation and access the interaction or multimedia commands and controls. Some implementations have routing, interactivity and multimedia buttons or controls visible on screen from within any given mode of operation, particularly simplified versions of the invention and embedded applications.

In FIG. 2, the broken dotted lines, at 221, 225 and 229, represent two way connections between substantive steps and the user option managers for any given mode of operation. Line 221, for example, means that the user is able to control and define any and all routing input, calculation and output parameters by setting or adjustment before a particular operation. Moreover, the user can halt, suspend or detach from an ongoing operation to manipulate relevant controls and settings on the fly. Control lines 225 and 229 represent similar connections and capabilities for user option management within the interaction block 207 and the multimedia block 209 respectively.

FIG. 3

Figure 3:
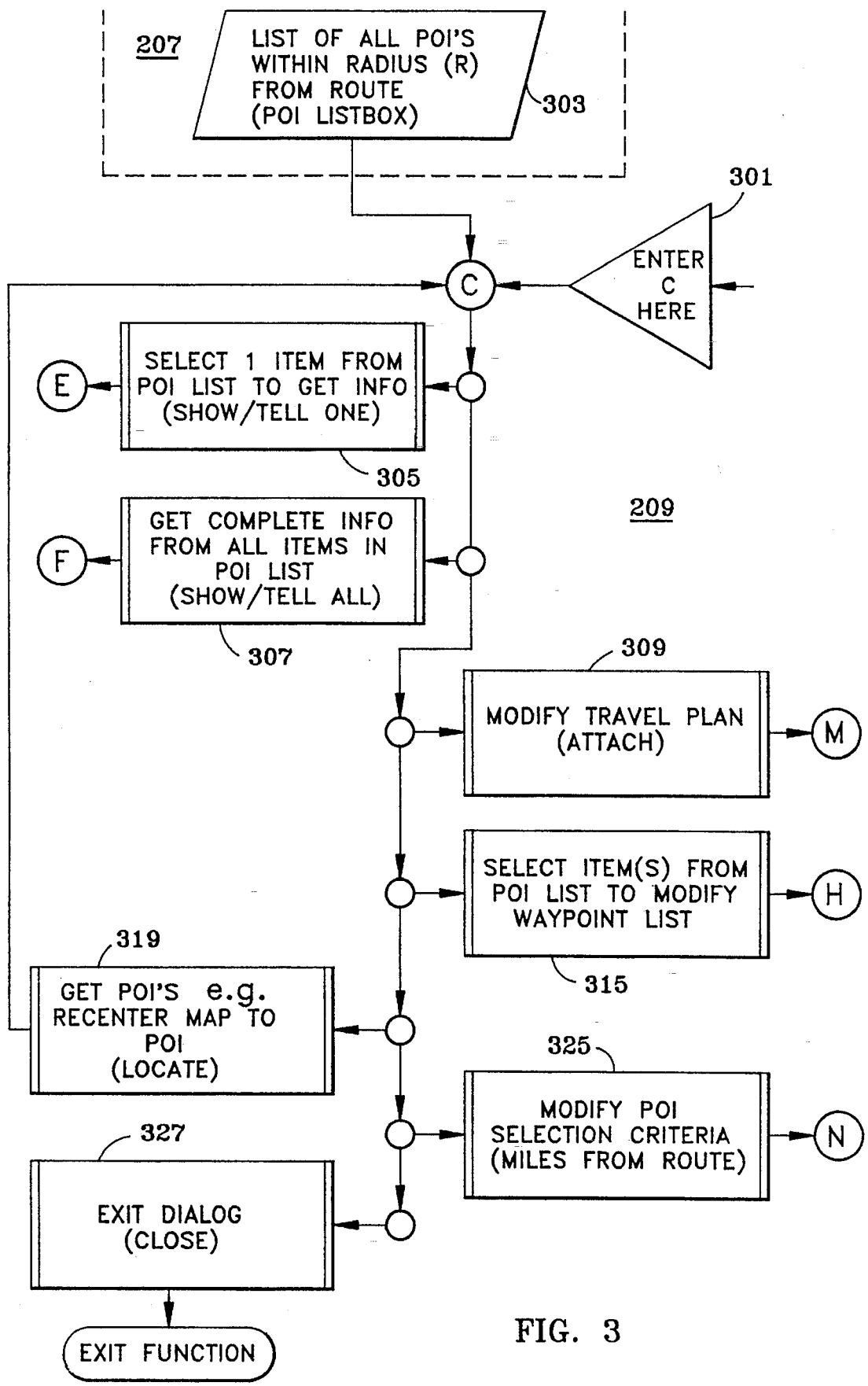
FIG. 3 is a flow chart showing the operational steps and user options available to multimedia users of the CARS system.

FIG. 3 is a flow chart illustrating the organization and procedural logic of the commands or user options available to multimedia users of the preferred embodiment of the CARS system. The system combines multimedia and routing to provide a software utility for personal and business travel planning. FIG. 3 depicts data transfer pathways as well as the hierarchy of commands and user options available to users in the Points of Interest system listbox or dialog box shown in FIG. 1J. In the multimedia mode, the user can call up this dialog box on top of the map display which typically dominates the computer screen.

FIG. 3 relates to the user options 219 and POI input 243 steps found within the multimedia subsystem block 207 in FIG. 2. In FIG. 3, dotted lines and reference numbers delineate the margins of the routing 205 and interaction 207 subsystems portrayed in FIG. 2. FIG. 3 shows the particular multimedia user options and commands for POI input and pertinent data transfers embodied in the CARS system in relation to the more generalized FIG. 2 system block diagram.

In FIG. 3, processing begins at reference letter C. The user can activate the multimedia mode at 301 in the first instance for purposes of composing fresh or new multimedia presentations uncombined with prior operations. Activation of the multimedia mode facilitates user access to the user options and commands shown in FIGS. 1J, K, L, M, O and P as well as FIG. 3. From C, the user proceeds to step 319 to select or get fresh POI inputs for multimedia presentations implemented by looping back through C to steps 305 and 307. This is how, in the vocabulary of this disclosure, pure multimedia is started by the user from scratch, uncombined with prior routing or multimedia. But, the user can also recycle pure multimedia through C typically for replay with variations in media, focus, contents or locations.

Entry point C plays a pivotal role in recycling multimedia presentations and combining routing and multimedia. During or after multimedia presentations, the user can return to C proceeding to replay multimedia she or he has just experienced, by recycling the prior multimedia presentations through steps 305 or 307 typically in order to vary the multimedia form, content or focus according to the user's interests, as disclosed hereafter in more detail in relation to FIGS. 7, 8A–8E. In step 319, the user is able to amend or revise preexisting POI input lists, on which prior multimedia was based, by adding or deleting points of interest or locations to or from the preexisting list. This altered POI list sets up a new variation or altered geographic foci for multimedia replay implemented by looping around through C to step 305 or 307. Moreover, multimedia presentations can derive from or combine with output from prior routing, as shown, entering C at 303 in FIG. 3.

Either to start a fresh pure multimedia presentation or to modify one or more pre-existing POI lists, the user proceeds from C to step 319 in order to get and decide on POI inputs in several ways. Users can get and manually enter one or more POIs typing in place names, geographic coordinates or other literal location indicators. The user can also seek, pick or delete POI input by browsing lists of locations, or other situated data, and choosing points of interest. Moreover, the user can employ cartographical or graphic means in order to locate potential POIs to be added to or deleted from the current POI input list. This typically is done by positioning the cursor on locations, symbols, geographic coordinates, place names, etc. on the current map display. The user can manipulate the cursor position on the map display with the mouse, arrow keys or other means in order to recenter the map display, causing it to shift or pan laterally to a new location centered on a different latitude and longitude. In summary, the "GET POI" operations at 319 include user options to add, delete and rearrange the POI input list along with shifting or recentering the map display on the current POI.

Users can also opt for zooming down to a closer map scale for a more detailed perspective or zooming up or out to get a more global outlook covering larger territory. The CARS system utilizes such flexible and intuitive capabilities to zoom among map scales or shift across digital maps, seeking POI input, with map generation and cartographic database technology as disclosed in the David M. DeLorme U.S. Pat. Nos. 4,972,319 and 5,030,117. The user can also shift, or recenter, map displays to locate POI inputs by entry of telephone numbers, zip codes, street address information and other located or locatable data. The CARS system provides several textual or graphic methods for the user to get POI input by means of selective commands and procedures made available at step 319. The system also enables the generation and modification of lists of POI inputs by various methods for database searching and sorting well known in the art of computer programming.

In a typical usage of the system, the multimedia mode of operation of the invention is invoked at C, deploying the command and user option arrangements illustrated in FIG. 3. POI inputs are transferred and transformed within the interaction block 207 into the multimedia subsystem 209 in the form of a list of POIs found in proximity to a route previously computed, as revealed at 303 and detailed hereafter in relation to FIGS. 5, 6A & 6B. Step 303 deals with output from a previous operation of routing, transferred from the routing subsystem and transformed into multimedia input for processing, subject to the user options and command organization shown in FIG. 3. In this fashion, the user is enabled to selectively experience multimedia information about locations and points of interest along the way or within a user-defined region around i.e. circumscribing an optimal route already computed. Steps 309, 315 and 325 enable the user to return to and modify the previous route or travel plan output with changes typically based on the user's responses to an intervening CARS system multimedia presentation.

FIG. 3 illustrates the commands and user options made available to users upon startup or recycling of the multimedia mode of operation of the CARS system. Through 301 and C, the user can make a completely fresh start on a pure multimedia process, proceeding to get and locate POI input by a great variety of means at step 319. Step 319 is also available for users to get or revise multimedia input for amendment of one or more pre-existing POI lists. Recycling of a preexisting list of POI input through C can involve pure multimedia inputs, generated without reference to routing. As presented for multimedia processing at 303, data transformed into multimedia input from previous routing output illustrates POI input in the form of an amendable or modifiable preexisting list which is not pure multimedia. Rather, it derives from and is combined with previous routing operations.

The user can opt for a selectable multimedia presentation on any single POI input of his or her choice at step 305, described further in relation to FIG. 7 hereafter. Such Show/Tell One operations unfold from E, as shown in both in FIG. 3 and FIG. 7. After or in the midst of such multimedia presentations about a single POI or location, the user can return to C, typically in order to add or cull one or more POIs as just experienced in multimedia to or from his or her travel plan. The user can also prompt further presentations of located multimedia information which vary in form, media or level of detail as detailed hereafter. Similarly, at 307, FIG. 3 depicts user options and commands for multimedia presentations on a total list of POIs. Step 307 Show/Tell All functions proceed from reference letter F, as disclosed hereafter with respect to FIG. 8A. The user is also able to return from the midst or conclusion of a Show/Tell All operation to C in order to browse the multimedia command set and user options in FIG. 3.

The system also enables the user to prompt multimedia presentations about a selected fraction of one or more POI input lists i.e. Show/Tell Certain POIs by various methods such as concatenating individual Show/Tell One operations, or by means of searching for POIs of a predefined type or by sorting POIs as related to characteristic data.

For example, the system routing and multimedia utility presents the user with at least four predefined types of POIs: (1) Points of Interest i.e. tourist, recreational and cultural attractions; (2) Hotels; (3) Campgrounds; (4) Restaurants. Thus, the hungry user can search for multimedia input on places to eat only, while the tired user can employ well known database sorting techniques to focus upon multimedia information about places to stay for the night e.g. Hotels and Campgrounds.

The dialog box or organized set of commands and user options in FIG. 3 also facilitates initial transfer or return of ongoing operations to the routing mode as well as termination of the multimedia mode of operations in favor of some new or fresh operation or sequence of operations, or in order to exit the program entirely. The user options in FIG. 3 correspond to the 162 dialog box in FIG. 1-0 and the 161 quick menu. Steps 309, 315 and 325 allow access to, and modification of, subsequent routing operations performed within the routing subsystem or block 205 revealed from a more general perspective in FIG. 2. Step 327 provides an exit from the multimedia mode. Step 327 corresponds to step 279 and partly to step 277 in FIG. 2. After exiting at 327 in FIG. 3, users can commence fresh operations, on the one hand, by starting anew in the routing mode, as detailed elsewhere in relation to FIG. 2 and 4. On the other hand, exiting at 327, the user can begin a completely new or unprecedented multimedia operation, or sequence of operations, reactivating the multimedia mode at 301, and then proceeding through C in FIG. 3.

At 309, in FIG. 3, the user develops or alters his or her travel plan or itinerary by attaching selections of multimedia, as experienced in a Show/Tell operation. Such travel plans or itineraries are composed in the system embodiment in part by the attaching of multimedia information about places and locations to the underlying map display on which is highlighted previously computed optimal route output. FIG. 1N illustrates one example of such travel plan output, adorned with annotations, pictures, and graphic arrows concerning points of interest as selected by the user in response to multimedia presentations on those locations or POIs, generated by the CARS system preferred embodiment. Different, more advanced embodiments facilitate attachment and location of audio or video output, experienced in the multimedia mode, on digital travel plan outputs combining multimedia and routing as detailed elsewhere in this disclosure. Step 309 enables the user to transfer selected multimedia through M to be attached to an itinerary or travel plan, as depicted in FIG. 1N, by processes described hereafter in relation to FIG. 4.

In the lexicon of this disclosure, attaching multimedia refers to the process of picking, transferring and displaying multimedia about particular POIs or locations through the interaction block 207 for inclusion upon travel plan output at 265 with reference to FIG. 2. Attached multimedia can comprise text annotations about POIs with graphic arrows or pointers indicating the site or geographic location of specific POIs on travel plans in the form of map hardcopy or map display output on which one or more routes are highlighted, as shown in FIG. 1N. Other embodiments enable attachment of still or moving images, sound, and various other media to travel plan output. Though such multimedia attachments invariably modify the informational content of travel plans, the definitive feature of travel plans with attached multimedia is that the highlighted computed optimal routing component has not been altered by modification of the waypoint lists.

Instead, information about POIs, found along the way, is presented as a supplement or marginal note on a travel plan showing one or more optimal routes already computed as depicted in FIG. 1N. Thus, attached annotations or other selected multimedia about POIs or places, situated along the way or in vicinity of a precomputed routing output, constitute a preferred travel plan output format in cases where the user needs information on a travel plan about locations nearby one or more optimal routes previously computed. However, the user does not require a revised routing computation based on new waypoint input chosen by the user while browsing multimedia information about proximate POIs or locations.

Step 315 in FIG. 3 does facilitate transfer of POIs picked by the user, experiencing multimedia information about such POIs, over to the routing subsystem 205 to be transformed into a new, or modified, list of waypoint input in order to prompt a new, or a revised or recycled, routing computation as described relative to FIG. 4. In contrast to merely attaching prior multimedia information to travel plans by way of step 309, through step 315 the CARS system user is able to add or delete new waypoints and highlight a newly computed optimal route based on his or her experience of, interaction with and responses to multimedia place information. This new or altered highlighted route output can appear at the user's option without any supplemental information from the preceding multimedia added to the user's itinerary. The user can also opt to include annotations, or alternate selections from the prior multimedia, embellishing the resultant travel plan output, along with the optimal route encompassing new waypoint selections, based upon the user's multimedia experience. In sum, step 315 provides preferred travel plan output in cases where the user wants a new optimal route computed in response to multimedia about pertinent places and locations.

Steps 309 and 315 apply both to transfers of pure multimedia, as yet uncombined with prior routing, and multimedia already combined with routing, pursuant to step 303. In another form of expression, in the shorthand notation for sequences of operations presented above relative to FIG. 2, steps 309 and 315 enable routing operations subsequent to, and combined with, multimedia in accord with both of the following formulae:

(1) M1, R1=C01; and (2) R1, M1, R2=C02.

In the two fairly simple examples just formulated, step 309 or 315 each are interposed right after M1 to transfer data from the operation M1 into the immediately ensuing routing operation. The first formula represents a case of output from a pure multimedia operation M1 transferred through step 309 or 315 for subsequent processing in the routing subsystem. The second formula represents a transfer of an output from a combined sequence of routing (R1) and multimedia (M1) via step 309 or 315 to become input for one further routing operation (R2). The invention can facilitate more complex combinations and sequences of multimedia and routing functions in order to produce combined output e.g. C01 and C02 that incorporates and reflects the user's unique responses to, and interaction pattern with, the flexible technology.

In FIG. 3, step 325 enables users to return to the routing subsystem 205 to modify parameters on which a previous routing computation was based. For example, as one possible response to a multimedia experience derived from previous routing at 303, the user can elect to go back to the routing mode by way of step 325 in order to prompt computation of the shortest rather than the quickest route, or to shrink or swell the user defined region around the route from which POIs are extracted, as described in more detail in relation to FIGS. 4, 5, 6A and 6B. Of course, such selection criteria are fully adjustable by user from within the routing mode. Step 325 provides the system user with a quick return from the multimedia mode or subsystem 209 for a corrective readjustment of routing computation parameters or the distance from a route or set of waypoints within which POIs are recovered as potential input for subsequent multimedia. This is a convenience to the user when a list of route related POIs as provided in step 303 is far too long or far too short.

The user can quickly enlarge or diminish the user defined region around the route, or alter the manner in which the route is computed, in hopes of generating a POI list of a more useful size as potential input for multimedia. For example, suppose no hotels or eating places turn up as POIs along a particular stretch of highway, step 325 then lets the user go right back to the routing mode or subsystem 205 in order to calculate a more local route along which he or she can hope to find food and lodging. Or, the user can readjust the system selection criteria to prompt the system to search for hotels and restaurants at an increased distance from the exits off the major highway. Readjustment of the radius or area searched for POIs is also detailed hereafter in relation to step 467 in FIG. 4. FIG. 4

Figure 4A:
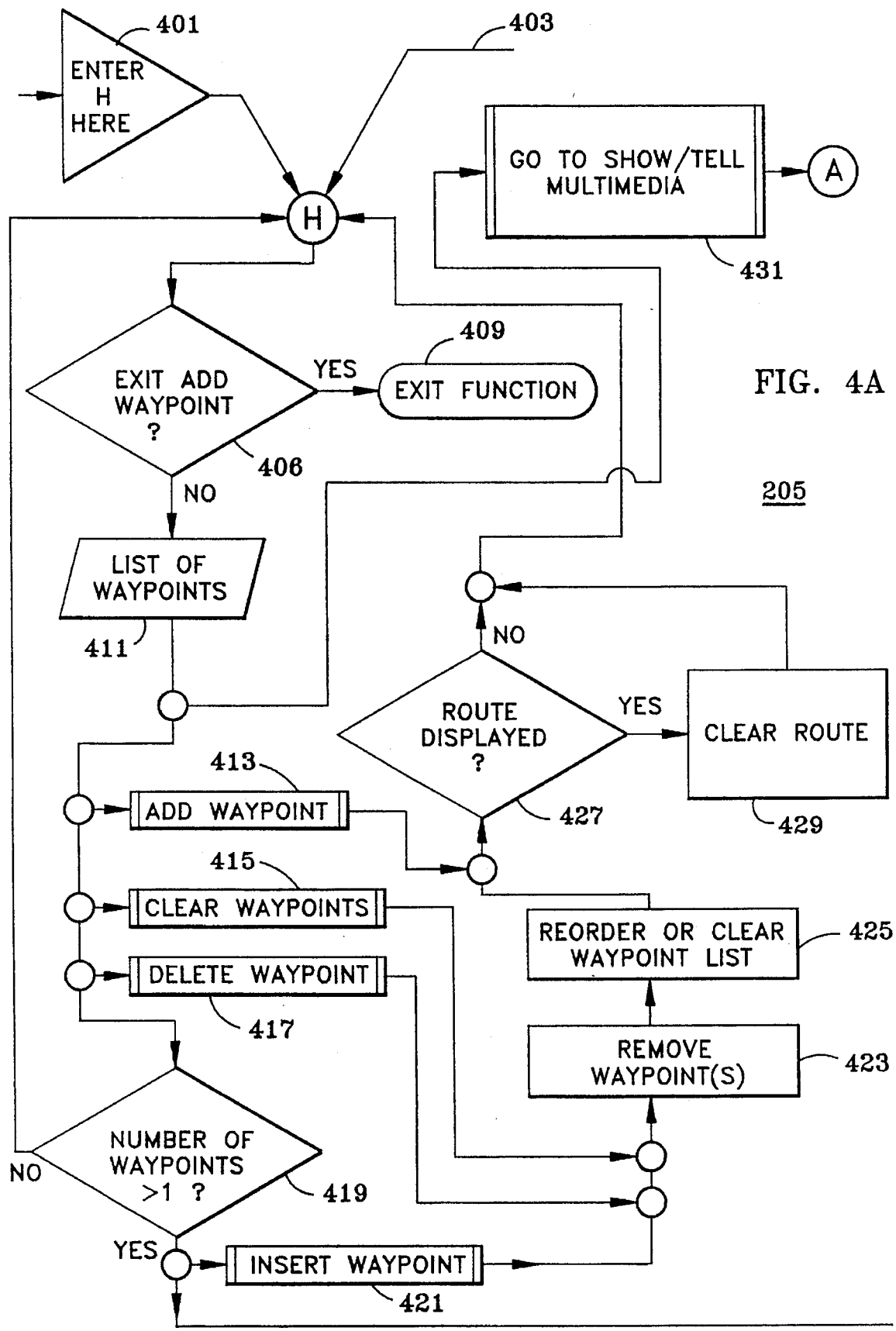
FIGS. 4A, 4B, and 4C are assembled to form a flow chart showing the operational steps and user options available to travel planning and routing users of the CARS system. The flow chart assembled by FIGS. 4A, 4B, and 4C is referred to in the specification as FIG. 4.
Figure 4B:
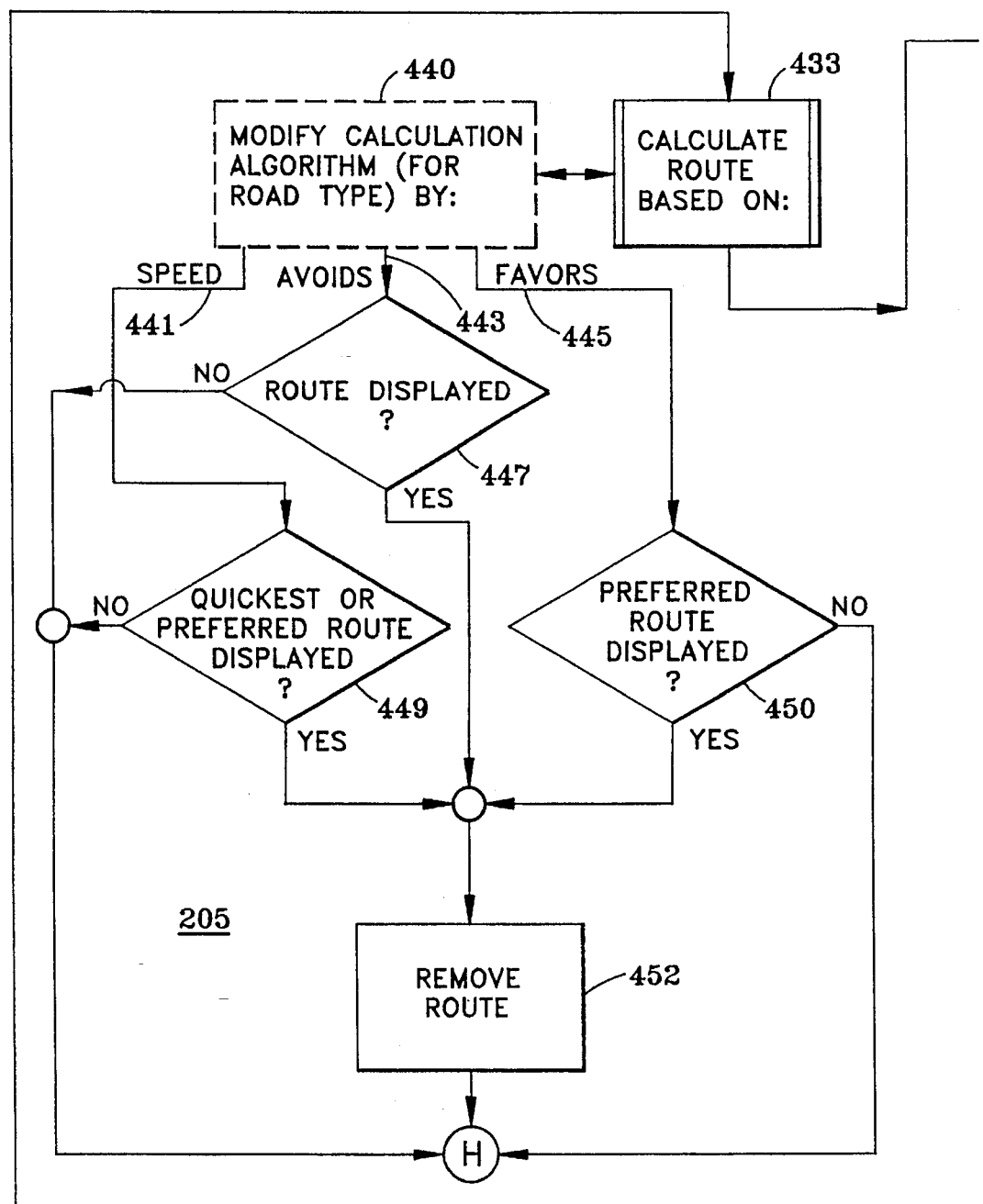
Figure 4C:
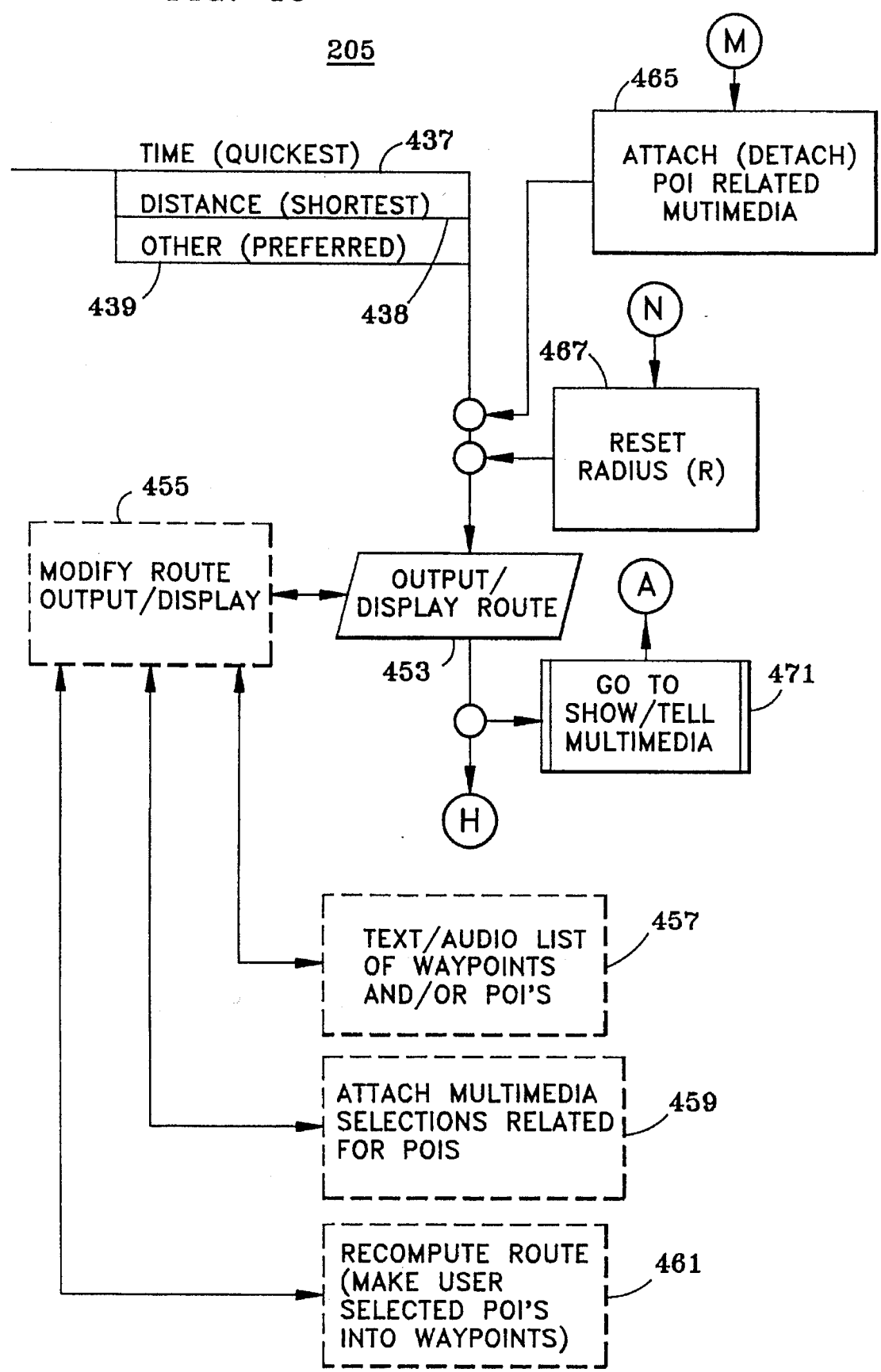

FIGS. 4A,4B, and 4C are assembled to form the flow chart referred to hereafter as FIG. 4. FIG. 4 is a flow chart illustrating the processes and user options included in the routing mode of a preferred embodiment of the CARS system. The system is a component software travel planning tool which combines multimedia and routing. FIG. 4 relates to the operational sequences, data transfers and user controls implemented by way of the Manage Route dialog box depicted at 138 in FIG. 1G. The user can access this suite of tools, commands and processes, invoking the routing mode of operations, by calling up the Manage Route dialog box on top of a portion of the map display which pervades the computer screen in typical applications of the system.

FIG. 4 illustrates the specific user options and processes embodied in the CARS system corresponding to the routing subsystem 205 shown at a more generalized level in FIG. 2. FIG. 4 also depicts pathways for input/output data transfers to and from the multimedia operating mode, as shown at 403. Connectors A, M and N comprise the pathways or channels which facilitate the combining of multimedia and routing operations in various sequences at the user's option, as described in relation to FIG. 2 and in other places in the specification disclosure. In the vocabulary of this disclosure, FIG. 4 illustrates both pure routing i.e. uncombined with multimedia and operations yielding combined output at step 453 which result from an integrated succession of multimedia and routing software functions. Because step 453 handles both pure routing output and output combined with previous multimedia, step 453 in FIG. 4 corresponds in part to step 265 and embraces step 259 in the more generalized FIG. 2.

In FIG. 4, processing commences and is recycled through H. The user activates the routing mode at step 401, in order to start a fresh routing operation, for example. Thus, step 203 in FIG. 2 corresponds to step 401 in FIG. 4. Pathway 403 shows how the user can transfer from the multimedia mode to subsequent routing operations in order to transform the output from previous multimedia operations into new or revised waypoint input for one or more succeeding impure routing operations i.e. routing that has been modified by the user in response to preceding multimedia operations. Therefore, pathway 235 in FIG. 2 is analogous to pathway 403 as shown in FIG. 4. Path 403 stems from step 315 in FIG. 3.

In FIG. 4, steps 406, 409, 411, 413, 415, 417, 419, 421, 423, 425, 427 and 429 comprise the waypoint entry module in which the user can engage a suite of commands in to add, clear, delete or insert waypoints or routing input. The specific process for waypoint input shown here in FIG. 4 corresponds to the more generalized step 231 in the FIG. 2 Block Diagram. The user is also able to access waypoint input commands while in the multimedia mode, in order to provide for immediate transfer of POIs to become input for new or recycled routing operations. As portrayed in the FIG. 2 block diagram at 211, 213, 217 and 219, an user can access commands and options betwixt and between the routing 205, interaction 207 and multimedia subsystems. For clarity in this disclosure, however, waypoint input operations are presented as prompted and executed within the routing subsystem.

In FIG. 4, steps 406 and 409 mean that the user can opt to exit from or close the waypoint input module. Like virtually all operations embodying the invention, waypoint input is achieved on top of a computer map display, which becomes part of the waypoint input interface, as described hereafter. In the lexicon of this disclosure, waypoints are route input items including one point of departure, one final destination and, optionally, one or more intermediate loci entered in order of travel. Waypoints are highlighted as input with inverted green triangle symbols on the map display as shown at 147 in FIG. 1G. As entered, waypoints also appear on a list in the order to be encountered on the intended journey, as shown in the Manage Route dialog box illustrated at 138 in FIG. 1G. The list of waypoints arranged in planned order of travel in the Manage Route dialog box corresponds to step 411 in FIG. 4. The user works in the waypoint entry module or command suite until he or she elects to close the function at 406 and 409, or to compute a route at 433, or to transfer waypoint input through 431 in order to experience selected multimedia information about the waypoint locations and nearby places.

Consistent with methods for the management of ordered lists well known in software, the module for waypoint input enables the user to add one or more waypoints to the end of the waypoint list at 413, clear all waypoints at 415, or delete one or more waypoints at 417. Routing requires at least a starting place and a destination i.e. at least two waypoints. Step 419 recycles empty or single item waypoint lists for further input to meet this requirement. Step 421 facilitates the insertion of one or more new waypoints at places chosen by the user between or before other waypoints on a preexisting list. In this way, the user can amend a waypoint list starting out from Boston going to New York City by inserting Hartford en route. Or, the user can insert Los Angeles or Mexico City as intermediate stops or places to pass through on his or her planned trip departing from Boston and ending in New York City. After specific waypoints have been cleared, deleted or inserted, steps 423 and 425 implement those changes by rearranging the current waypoint list in accord with the user's revised or amended order of planned travel.

Even entry of a fresh waypoint list can cycle several times through H while the user is engaged in revising his or her initial input. Moreover, the waypoint entry module also enables the user to edit and alter a waypoint list from which an optimal route has already been computed and displayed. In such cases, a user adds, deletes or inserts waypoints relating to a previously computed route. Then steps 427 and 429 function to clear away the old route display, anticipating a new route computation which will incorporate the user's new waypoint list based on revision of the old waypoint list.

The system enables input and alteration of waypoint lists by means of an array of list based locating tools that can search zip code, phone exchange and place name indexes, as shown in FIGS. 1D, 1E and 1F. The map display recenters on new locations thus selected by the user. Also, the user can employ graphic/cartographic means for the selection of waypoints and related manipulation of the map display. For an example, users can choose waypoints by pointing and clicking upon symbols or place names or at specified pixel locations on the digital map display which correspond to geographic coordinates of places or objects situated on or adjacent to the earth's surface. Graphic, intuitive waypoint input location is further facilitated by capabilities to zoom amongst map scales and detail levels as well as panning or shifting to recenter the map display upon a different place or set of geographic coordinates.

The first release in July 1994 of the Map'n'Go ™ Atlas of North America on CD-ROM by DeLorme Mapping Freeport Me. 04032 includes a version of the CARS system that limits the nodes or routable waypoints to specified intersections of selected roads and highways, and car ferry terminals. In alternate embodiments of the CARS system and enhanced commercial versions, routing or waypoint input can encompass airports plus flight paths, bus stations and bus routes, railroad terminals and tracks, subways and other urban transit systems, off-road vehicle travel, trails for bicycles, hiking and other pedestrian paths as well as oceanic, coastal and inland shipping channels, also boat launches, portages and river passages for canoes or rafts, plus other commercial and recreational transport and travel means. Even more generalized point-to-point routing more or less "as the crow flies" over rasterized or digitized computer maps can be added. The present system is applicable to a broad range of point and vector data structures familiar in the routine arts of geographic databasing and digital cartography including but not limited to the foregoing specific input/output formats for waypoints or POIs as detailed in relation to FIGS. 5, 6A and 6B.

The system technology is designed to take user travel planning requirements into account. Waypoint inputs are ordinally structured. First on any waypoint list is a single point of departure. By definition, waypoint lists end with one final destination. In between, stops and places to pass through picked by the user are arranged in the order of intended travel. Thus, a first waypoint list consisting of Boston, Hartford, New Haven and New York City is not the same for example as a second waypoint list which calls for leaving Boston, going to New Haven, then Hartford, on the way to New York City. Waypoints are input in an ordinal or serial data structure which is a representation of the user's intended order of travel: (1) first, the starting place; (2) second, initial intermediate waypoint; (3) third, next stop or waypoint; N-1th intermediate waypoint; and Nth waypoint, final destination or end of planned journey. Intermediate waypoints are optional, of course, but get entered in a specific order corresponding to the user's intended itinerary. Even before any computation of the optimal routes between a set of waypoints, waypoint input is already arranged in a data format descriptive of the user's overall planned itinerary.

In enhanced versions, step 431 facilitates the transfer and transformation of ordinally structured waypoint input data over through the interaction subsystem 207 into the multimedia subsystem 209 so that the user can browse multimedia information about the input waypoint locations. Transformation of the waypoint input into the POI or multimedia input format is involved, as detailed hereafter in relation to FIGS. 5, 6A and 6B. Step 431 in FIG. 4 approximates pathways 233 and 241, as shown in FIG. 2. Step 431 in FIG. 4 concerns waypoint input only, in advance of any routing computation based on said input. Step 471 transfers output from subsequent routing computations for multimedia exposition. Step 431 further enables the user to intelligently refine his or her current waypoint list by prompting and experiencing selected multimedia information on chosen waypoints. In response to such multimedia information, the user can return to the waypoint input module via 403 in to order make more informed choices about which waypoints to keep or delete and in what order to travel.

This disclosure confines the term routing output to output from computation and display operations at steps 433 through 453, as detailed hereafter. Waypoint input operations, transferred to multimedia via step 431, still qualify nonetheless as substantial routing steps or operations for purposes of making up a valid set of routing and multimedia operations combined in sequence within the inventive technology. This is because ordinally structured waypoint input can be distinguished from random location data, or even from a list of POIs selected manually by the user or from a database search based on personal interest or links to specific topics or subject-matter. Waypoint input describes the user's point of departure, planned stop-overs or intermediate waypoints and ultimate destination in order.

By contrast with an alphabetical list of regional hotels, or a handpicked list of the user's favorite type of resort, the rudiments of a travel plan or itinerary are presented in the standard waypoint input structure consisting of a list of locations ordinally arranged in order of planned travel. For sequences of operations employed in this disclosure, waypoint input entered in such an ordinal data structure does qualify as a substantial routing operation. Therefore, the expression R1, M1=CO1 can describe an operation of waypoint input succeeded by a related multimedia presentation which produces output shaped by the user's interaction through the combination of substantial routing and multimedia functions.

In the simplified embodiment of the CARS system the user can choose to browse one or more of the following lists: (1) Points of Interest i.e. tourist or cultural attractions; (2) Hotels; (2) Campgrounds; and (3) Restaurants. Alternative embodiments incorporate a broader range of well-known techniques for storage, retrieval and correlation of geographic or cartographic data. For example, customer and sales prospect information can be stored in a relational database linking geographic locations with various personal, business and financial data. Such a database would be useful for diverse sales, service, delivery, property survey and security functions, particularly to prepare travel or route plans with multimedia digital photos of valued prospects or real estate. Utilizing such a relational customer database, sales force personnel can evaluate and locate prospects and established accounts needing a sales call, then extract the pertinent street addresses as waypoint input in order to prompt computation of an efficient, comprehensive route for making a round of sales calls.

Similarly, service and delivery personnel can plan their work for the day or the week on the road. Appropriate databases can help identify prime properties or security trouble spots. Real estate or security agents can input the street addresses or other location identifiers from the database in order to compose a waypoint list as input for the computation of an optimal route encompassing the properties of interest to the agents. With the waypoint list at step 411 and the background map display, alternate embodiments of the invention incorporate a variety of well-known databasing methodologies in order to enable the user to design, implement, output and further process diverse searches for waypoint input. In like fashion, waypoint lists can be memorized and recalled for later use or modification.

Step 411 and the map display interface also facilitate the processing of canned or prepackaged sets of waypoint inputs in addition to individual ad hoc waypoint input lists made by users planning personal travels in the waypoint entry module. Thus, the present invention enables processing by the user of prepared lists of particular types of museums or recreational facilities, for example, with database links to the pertinent street addresses or other location identifiers such as latitude\longitude. The user may purchase such digital lists of potential waypoints on software media e.g. diskette, CD-ROM, PCM-CIA cards etc. as a data accessory for use in the system. Such prepackaged lists of waypoint inputs can also be downloaded via modem from another computer or a central service bureau. Such prerecorded lists include sets of business or residential names and addresses linked to certain financial or demographic data. Alternatively, an off-the-shelf travel plan might include a recommended list of waypoints for a selected region or user interest. Utilizing the waypoint entry module, the user can then modify or personalize and customize such prerecorded waypoint lists. To assist with the task of individualizing a canned list, the user can invoke step 431 to consult selected multimedia information concerning the predefined waypoints, nearby resources and attractions.

In FIG. 4, steps 433, 437, 438, 439, 440, 441, 443, 445, 449, 450 and 452 comprise the routing calculation or computation module including related user adjustments and options, corresponding to steps 245 and 211 in FIG. 2. As implemented in steps 433, 437, 438 and 439, such routing computations generally involve known methodologies or processes for the manipulation and calculation of geographically situated data in the form of vectors, line segments, networks, nodes, or other sets of geographic points which represent specific transportation systems or permissible routes. These methodologies facilitate computation of optimum routes or pathways in relation to the temporal order of planned travel or movement through space in spheres of human activity on or near the surface of the earth. Such processes or algorithms for the calculation of optimized routes may take into account factors such as the physical structure of transportation routes, legal and customary rules of the road or other transport systems, estimated or allowed travel speed, available transportation modes, schedules and connections, traffic, obstacles, currents, weather and other advantageous or limiting conditions.

For example, the July 1994 release of the MAP'N'GO ™ 1.0 on CD-ROM included a preferred embodiment of the invention, in the form of a travel planning utility, which computes quickest, shortest, or other preferred or optimal routes along major auto roads and selected car ferries. This embodiment represents the available routes as certain line segments on map displays which are drawn between the routable geographic points generally termed "nodes". The MAP'N'GO ™ 1.0 travel planning utility treats the following geographic points as possible waypoints or nodes: (1) major road and highway intersections; (2) the junctures or turning points of connected line segments representing the major auto roads and highways; (3) place names situated right on major auto roads and highways; and (4) POIs located on or immediately adjacent to the major roads or highways. To facilitate and speed routing computations in this embodiment, every possible waypoint or routable node is stored in the CARS database on the CD-ROM in association with a list of all immediately adjacent nodes and the precalculated distance thereto. The July 1994 MAP'N'GO ™ 1.0 travel planning utility computes optimal routes between selected and ordered lists of nodes or waypoints employing routines based on the Sedgwick-Vitter algorithm disclosed in James A. McHugh, *Algorithmic Graph Theory* (Prentice Hall 1990) pp. 107–108. This embodiment permits the user to adjust parameters for the routing computations, such as speed settings and preferences for/against certain road types as disclosed hereafter. The present technology works, however, with other transport system databases, various types of routes and definitions of routable nodes as well as alternative routing algorithms and adjustable parameters.

As shown in FIG. 4, new or recycled routing computations follow input, recall or alteration of a particular waypoint list including a selection of routable nodes which are arranged in an ordinal array according to the user's intended itinerary or order of travel. Provided with input of at least two waypoints, including one point of departure and one destination, step 433 enables the user to select and execute various routing computation options. The system facilitates the following alternative route computations: (1) Quickest i.e the route estimated to take the least time to travel between entered waypoints, even if over a longer distance on faster roads (step 437); (2) Shortest i.e the route which is the least distance in the actual miles or kilometers, etc. one must travel even if the route takes more time to travel on slow roads (step 438); and (3) Preferred i.e. the user can select various road conditions or types to favor or avoid, such as toll roads, forest roads and routes involving car ferries (step 439). The Manage Route dialog box, shown in FIG. 1G, facilitates user choice among the foregoing criteria or variables for routing computations.

The Manage Route dialog box in the July 1994 MAP'N'GO ™ 1.0 travel planner embodiment also provides access to a Preferred Routing dialog box, shown in FIG. 1H, enabling the user to favor or avoid the following road types: limited access roads; toll roads; national highways, primary state or provincial roads; lesser state and provincial roads; major connectors; forest roads;and ferries. The Global Speed Setting dialog box in FIG. 11 enables users to adjust the estimated or expected speed of travel on each the foregoing road types in response to user preferences or expectations with regard to a leisurely pace or need for haste, weather, traffic, construction or vehicle problems which the user might anticipate.

In FIG. 4, steps 440, 447, 449, 450, 452, and associated paths relate to the menus or dialog boxes which enable users to choose various routing computation options such as Quickest or Preferred routes as illustrated in FIGS. 1H and 1I. Whenever the user elects to alter such routing computation variables, the CARS system loops or returns the user to the connector H in FIG. 4 thereafter, giving the user a chance to modify the waypoint list content or not. Then, the user can go to step 433 to implement the altered routing computation. When the user chooses a new routing computation option, for example to avoid one or more types of road in step 443, then step 447 determines whether there is any current route display needing to be cleared away or removed in step 452 before returning the user to H. Steps 449 and 450 administer similar display housekeeping chores in the cases where the user opts to adjust the speed on certain road types in step 441 or to favor selected road types in step 445. In other words, if the user modifies parameters for routing computation in step 440, after any necessary clearing of old displays in 452, the user is returned to step 433 through H for execution of the new form of routing computation, with its new criteria for routing e.g. Quickest instead of Shortest route. The system defaults to computation of the Quickest route through step 433 in the absence of the user picking another parameter. Steps 438 and 439 reflect routing computation options or variables elected by the user through step 440.

Other embodiments of the system provide further parameters or options for optimal routing computations. Scenic routes can be identified in the database of highways, roads and other modes of transport such that a minor routine modification of the overall routing algorithm program then enables the user to prefer roads and transport which afford natural vistas and ample opportunities for sightseeing. Similarly, enhancements to the route database can address highway width, clearance and load factors such that the routing algorithm, with minor alterations, can output travel plans suited to the specialized requirements of truckers and heavy transport. Using programming techniques well known in the field of geographic information systems and digital cartography for managing located statistical data expressed in the form of map overlays, routing computations can be integrated with databases relating geographic locations with a broad range of situated conditions. Thus, users of the present invention can choose an optimal route computation which prefers or avoids high crime areas, particular environmental or weather conditions, residential versus industrial or rural as opposed to urban areas, even geocoded demographic or economic factors, provided the embodiment is linked to the appropriate databases.

Steps 453, 455, 457, 459 and 461 in FIG. 4 constitute the module for routing output and display including pertinent user options and adjustments, Insofar as no multimedia is combined with routing, step 453 corresponds with step 259 in FIG. 2 i.e. routing output only. But, to the extent that prior multimedia operations and outputs are mixed or combined with a specific routing operation through path 403, steps 465 and 467, then step 453 in FIG. 4 parallels step 265 in FIG. 2. In such cases, step 453 produces output from combined multimedia and routing, mediated by user responses and interaction, involving at least one preceding multimedia operation integrated with at least one ensuing substantial routing operation. For example, a prior multimedia output can get attached to otherwise pure routing output through step 465. Such attached multimedia selections typically include a marginal annotation or digital image with an arrow symbol or graphic pointer indicating a pertinent location on the map display as illustrated in FIG. 1N.

For another example of combined operation output at step 453, path 403 facilitates the user transferring POI data from the multimedia subsystem 209 through the interaction subsystem 207 to become new waypoint input, either expanding or shortening the current list of waypoint inputs. Any resulting routing computation and its ensuing output at step 453, which are based on this new list of waypoints, therefore incorporate the user's responses to and interaction with the preceding multimedia transferred to the routing subsystem 205 via path 403.

Figure 5:
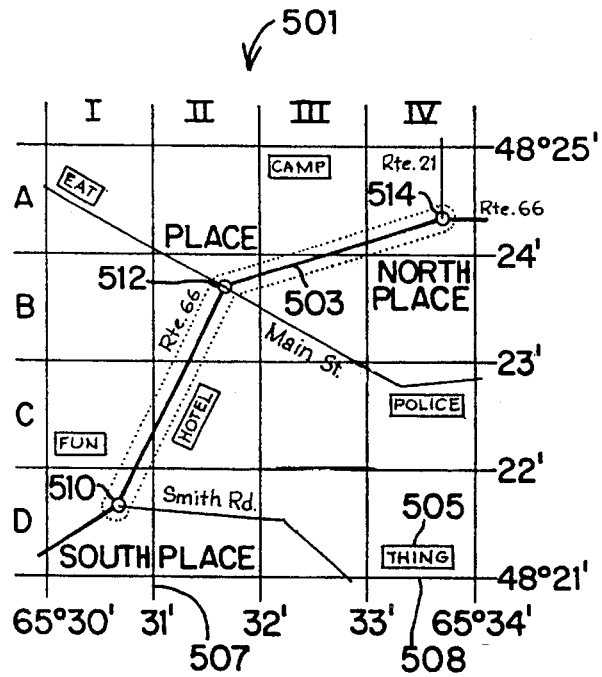
FIG. 5 is an example of a map display presented to the user on a monitor display by the CARS system.
Figure 6A:
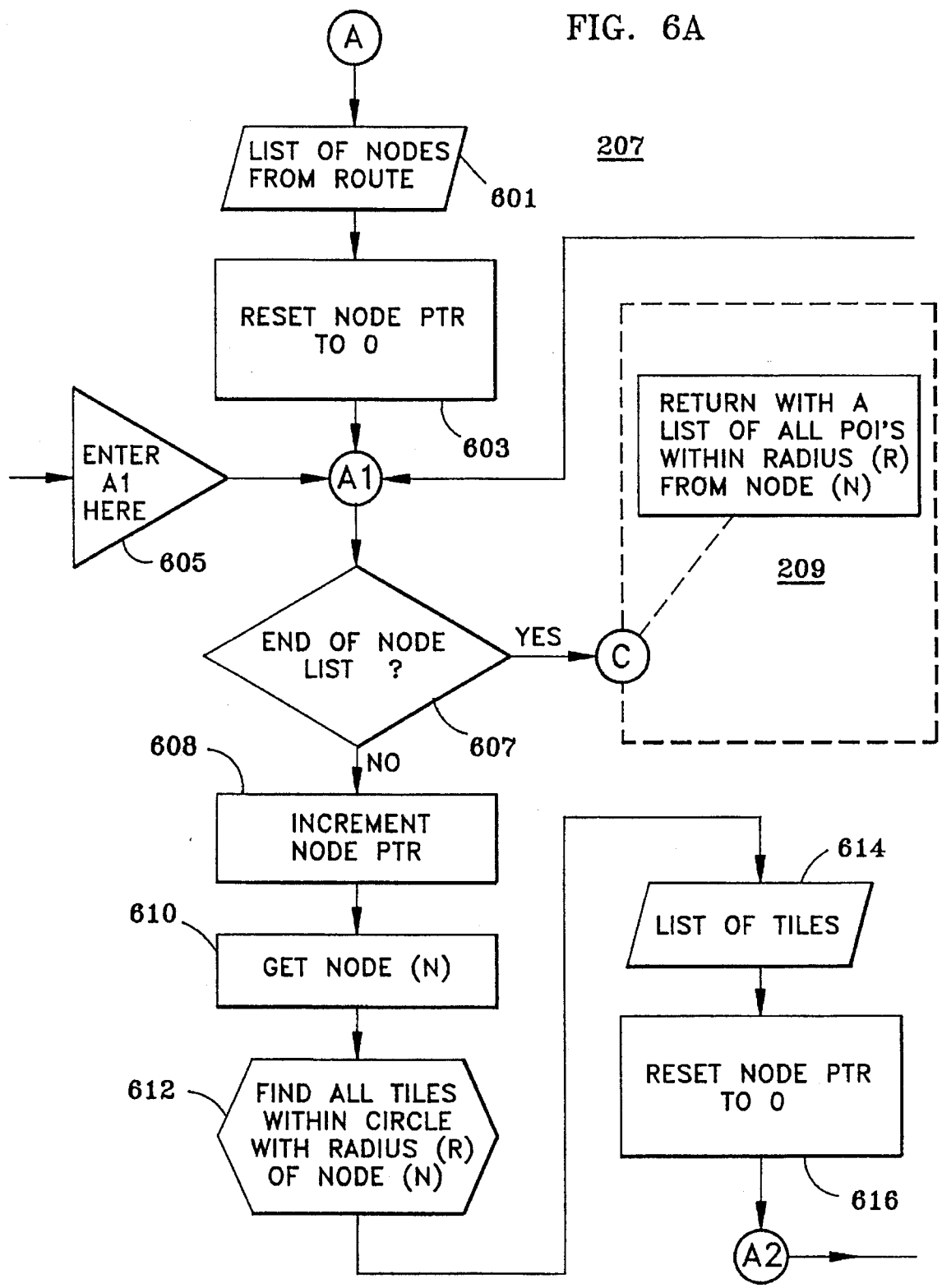
FIGS. 6A and 6B are assembled to form a flow chart showing the operational steps of the CARS system for transforming a routing waypoint list or list of nodes of a selected route into a list of points of interest within defined areas along the selected route.
Figure 6B:
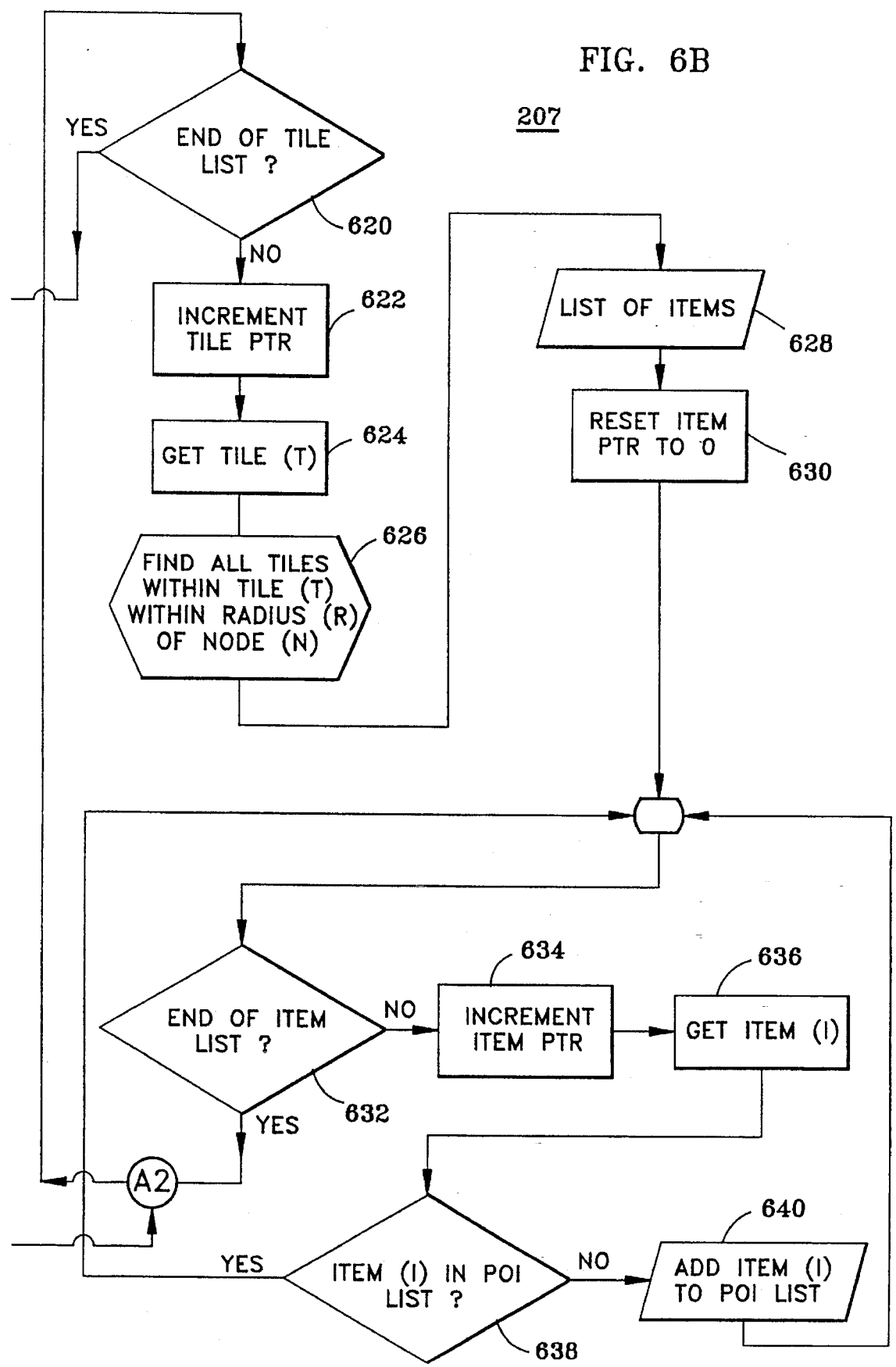

As described hereafter in relation to FIGS. 5, 6A and 6B, step 467 in FIG. 4 readjusts the radius or, more generally, the size of the area around intersections or nodes along a computed route within which the travel planning utility looks for POIs as topics for multimedia presentations. This technical process of resetting the geographic area to be searched for multimedia POIs comprises a substantial multimedia operation for combination with routing insofar as readjustment of the radius or POI search area impacts on a map display also exhibiting route output. Resetting the radius or the size of the region searched for PC)Is impacts on route display/output substantially whenever it causes POIs to be added or deleted from the map display and the related POI list as detailed in relation to FIGS. 5, 6A and 6B.

Steps 455, 457, 459 and 461 enable the user to choose among formats for the routing display/output at 453 in FIG. 4. These steps correspond with the more general options for mixed or pure routing output available to the user in steps 215 and 211 in FIG. 2. As shown in FIG. 4, the user options selected through step 455 are controlled through dialog boxes, menus, text commands and other routine user interface technologies. Step 457 enables the user to prompt route output in the form of a voice or text list of waypoints presented in planned order of travel with or without verbal or literal travel directions and other located information associated with items on the waypoint list. Step 457 also allows the user to opt for such audio or text output either in conjunction with or in lieu of the map display or visual route output.

For example, while driving, the user of an in-vehicle embodiment can turn off the map display as an unnecessary visual distraction, using step 457 to retain spoken output about waypoints, route directions as well as other located audio information pertaining to places along the way. Step 457 also permits simultaneous audio-visual output, for example, so that the driver can listen to audio output about his or her travel plans while a passenger is also looking at the highlighted route and other information on the map display as illustrated in FIG. 1P. Step 457 further permits turning off the audio output so the driver and passenger can listen to music or converse while the passenger keeps an eye on the visual map/route display. Further details on audio/visual options for multimedia output, which can be combined with routing output at 453, are disclosed in relation to FIGS. 7, 8A–8E.

Accessed through step 455 in FIG. 4, step 459 offers user options and controls related to combining multimedia selections with routing output by attaching text, numbers, visual images or sounds or voice. In the command lexicon, attaching multimedia refers to processes whereby selected information about locations gets included with map output, but without changing the waypoint input list. For example, the system attaches annotations in the margins of standard strip map travel plan output, as shown in FIG. 1N, with graphic arrows indicating related locations on the background map. A typical text annotation includes the name, address and phone number of a cultural event or attraction: e.g. "Pole-O-Moonshine State Park U.S. Route 9 (518) 834-9045" An arrow stretches from the box containing the text in the margin of the map, pointing out this park's location in Keeseville, N.Y. over on the map portion of the travel plan in FIG. 1N.

Such text annotations can attach a broad variety of data and information to map locations including historic facts, environmental data, personal commentary, demographic, economic or political intelligence, news, even ads, jokes, folklore or fictional accounts relevant to the particular location and potentially of interest to the user. By its nature, however, attached information provides supplemental information about places or objects located on or near some pre-existing route display/output. In the example above, the state park is not made a new waypoint i.e. it is not treated as a new waypoint input. Rather, the location of the park is pointed out near or along the route display with supplemental information about the park presented in a marginal text annotation. Attach "buttons" are shown for Hotels and Restaurants in the 154 and 156 dialog boxes in FIG. 1L, also for campgrounds in the 158 dialog box in FIG. 1M.

The present invention facilitates other forms and methods to attach information about locations. For example, to enhance a hardcopy travel plan for making sales calls on the road, step 459 facilitates attaching digital photos of sales prospects beside marginal notes detailing their name, personal interests and past purchasing history. This located information aids the user not only to find sales prospects' locations but also to recognize the prospects' faces, remember names and create a more effective and personable impression. Similar attached photographic imagery proves useful with various travel plans: (1) photos of landmarks as navigation aids; (2) digital pictures of drop-off sites, loading docks and other shipping terminal facilities to aid truckers and other delivery personnel; (3) images of industrial facilities, homes, buildings and land as seen from the road to enhance travel plans for real estate surveys, private security, public safety, etc.; and (4) attached digital photos enhance scenic or sightseeing travel plans. FIG. 1N illustrates attached digital photos of people and property. Attached images of faces, places or other located content are not limited to still digital photo imagery except in hardcopy output. The system enables attachment of videos, extensive alphanumerical text or voice information about places or POIs, or situated music or natural sounds to map/route displays.

Along with the marginal note or image box format, attached material can be accessed by clicking the cursor on an appropriate symbol located upon the map/route display. Attached visual and audio material related to the place picked by the user can then be played selectively on the full screen, interrupting the map display for a brief or lengthy time period, at the user's option. In the alternative, the user can attach multimedia selections about locations appearing in windows superimposed upon map/route displays as illustrated at 162 and 165 in FIG. 1-0. These can also be printed out in hardcopy covering portions of the underlying map, as well as in marginal notes or accessible alternative screens.

Contrasting with attached multimedia, step 461 in FIG. 4 facilitates combined map/route displays and output whereby the locations or POIs selected by the multimedia user do become new waypoint or routing inputs. In effect, step 461 enables the user to choose a routing display/output format which adds, deletes or inserts POIs selected by the user in multimedia using the module for waypoint input. Instead of just attaching multimedia information about places along a pre-computed route, step 461 causes entry of locations picked by the user in response to multimedia as new waypoint input. Step 461 reformulates the current waypoint list by recycling operations through H. Unless the user chooses otherwise, new waypoints are inserted after or before the closest old waypoint in accord with the user's old order and direction of travel. This new waypoint input in turn prompts a new route computation through step 433 resulting in a corresponding new route output at step 453. Step 461 provides a preferred means for combining routing and multimedia output in cases where the user desires or requires computation/output of a new optimal route based on a new revised waypoint input list including or eliminating locations according to selections by the user made in response to his or her experience of multimedia concerning those locations.

The quick menu box at 161 in FIG. 1-0, for example, enables the user to add, delete or insert waypoints in response to multimedia information about locations.

Steps 457, 459 and 461 implement concurrent or overlapping map/route display/output options. In other words, for example, the user can elect to have step 459 attachments as well as a new waypoint list as provided in step 461. In the alternative, attachments without any new or revised routing or waypoint input, or a new route based upon altered waypoint input but without attached multimedia, are also valid options. In sum, the display/output adjustments provided in steps 457, 459 and 461 can be toggled on/off independently.

Whatever the format and content of a step 453 route output/display, step 471 enables the user to transfer to the multimedia mode from said routing output/display. Thus, any route output or display can be combined with subsequent multimedia, typically in order for the user to gather more information about an emerging travel plan and the places on his or her itinerary. Consistent with the objective of facilitating flexible sequences and combinations of routing and multimedia operations, the user can eventually return from playing multimedia selections after such a transfer from step 453 through step 471 in order to work on further routing operations, returning via path 403, step 465 or step 467. Transfers through step 471 entail transformation of routing data into a multimedia format, as detailed in relation to FIGS. 5, 6A and 6B.

FIGS. 5–5C

FIG. 5 illustrates cartographic data structures as seen on typical map/route display output in 501 in the upper left drawing. Underlying cartographic data arrangements, typically not seen by the user are shown at 526 (upper right), 551 (lower left) and 576 (lower right) of FIGS. 5A,5B, and 5C. They are used in alternative embodiments of the present invention to interrelate nodes or routes with POIs found in one or more user-defined regions around an ordinal series of entered waypoints or along a previously computed route. FIG. 5, 5A, 5B, & 5C help to explain how the present invention enables the user to transfer from substantial routing operations over into the multimedia mode to experience multimedia presentations about POIs or points of interest located within a certain distance of a previously computed route or input waypoint list. These figures reveal general geographical data formats whereby prior route output or substantial waypoint input is transformed into a list of POIs, situated around or along the previous routing output or waypoint list. Data transformations in this manner are done in anticipation of the user selectively playing multimedia information concerning the POIs on the resulting POI list.

Relative to other parts of this invention disclosure, FIGS. 5, 5A, 5B and 5C sketches a framework for comprehending the data transformation involved in transferring operations from the routing subsystem 205 through the interaction subsystem 207 for added processing within the multimedia subsystem 209 as shown in FIG. 2. The result of such data transformations is a list of POIs, potential multimedia input, shown at step 303 in FIG. 3. Such data transformations are prompted by the user transferring from substantial operations in the routing mode through steps 431 or 471, as shown in FIG. 4. FIGS. 6A and 6B illustrate the data transformation process whereby ordinal waypoint input or routing output becomes a list of POIs found around or along the previously computed route or previously entered waypoints. FIGS. 7, 8A, 8B and 8C go on to show how the user can select and play multimedia about POIs or lists of POIs. With regard to the object of the invention to integrate multimedia and routing, FIG. 5 outlines the specific cartographic data structures and overall processes for the data transformation which facilitates prior routing operations being combined with ensuing multimedia operations.

FIG. 5 comprises one illustration of a map display at 501 as presented on screen to the user in almost all embodiments and typical utilizations of the CARS system. 501 is a simplified version of a typical electronic map with a computed route displayed by graphic accentuation, as illustrated in FIG. 1G. While such a map display might not be presented to users in some applications or episodes of use e.g. audio output only embodiments or full screen presentations of graphic images or alphanumeric documents about locations, multimedia and routing functions generally are accomplished by means of the cartographic and geographical information structures illustrated as typically displayed to the user at 501.

Figure 5A:
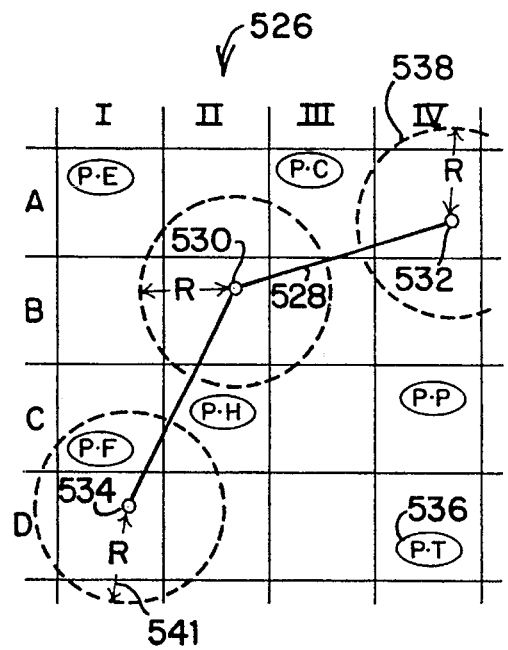
FIGS. 5A, 5B and 5C are simplified screen displays showing alternative strategies and methodologies for circumscribing points of interest within respective defined areas of a selected travel route.
Figure 5B:
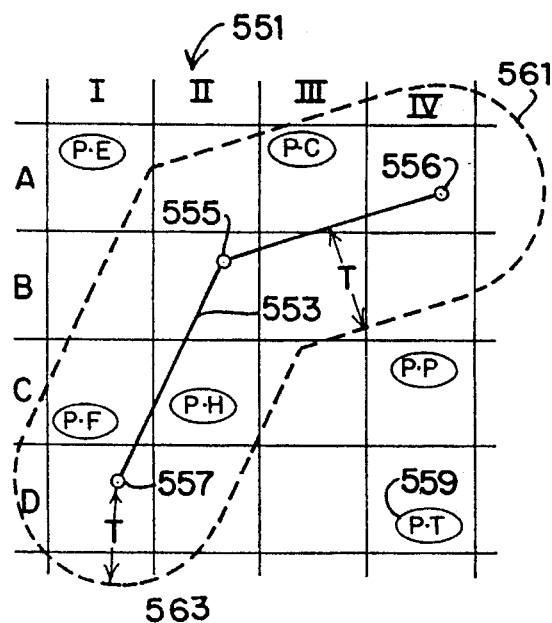
Figure 5C:
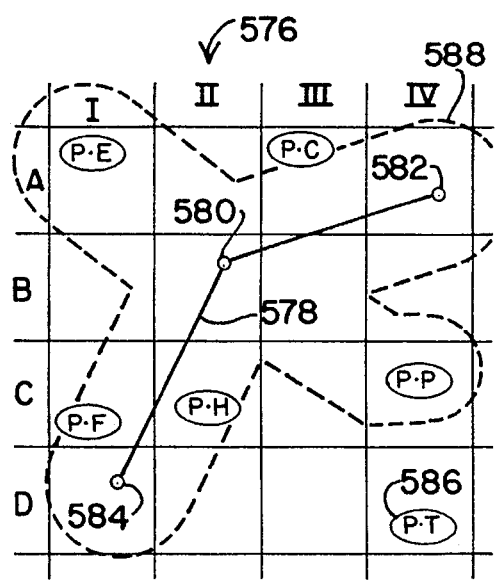

The illustrations at 526, 551 and 576 of FIGS. 5A, 5B, and 5C represent alternative transparent arrangements of the basic data formats embodied in 501, demonstrating three variant methodologies for circumscribing POIs. At 526 in FIG. 5A, POIs are listed as retrieved within circles of a specified radius e.g. 538 centered on geographic points termed nodes, which are essentially road or highway intersections. At 551, a line buffer graphic data structure i.e. an equidistant enclosure around a line segment at 561 encompasses POIs found along the route as represented by the line segment. At 576 and 588, one or more irregular polygons drawn manually by the user, or computed by another algorithm, serve to capture a particular set of POIs related to the antecedent routing data.

More specifically, 501 in the upper left of FIG. 5 shows a simplified map display. Such map displays appear on the computer screen serving as a graphic interface in practically all modes of operation and various embodiments of the present invention. The map display in 501 is centered upon a location named PLACE, for purposes of this illustration, situated in between SOUTH PLACE and NORTH PLACE, representing municipalities or parts thereof. As is routine in conventional map making and digital cartography, these entities are represented on maps by their names written on the map with the place name situated on the map in relation to its actual geographic location. Sometimes, place name labels on maps are visually associated with a located symbol, such as a dot or political subdivision boundaries or colored area on the map. No such graphic symbols are associated with the underlined place names in the 501 illustration, however, in the interest of a simpler drawing. Generally, place names comprise a particular cartographic data type. In the underlying geographic information system or database, specific geographic coordinates are linked to each place name. Storage, retrieval, manipulation and linkage of place names are done by means of well known list based, spatial, relational, and other database methodologies which are routinely used for management of geographic point types of data.

The present invention further employs such routine database methodologies in order to manage another geographic point type of data namely, the POI or point of interest. POIs appear on the 501 map display as boxed labels e.g. THING at 505. Each POI is placed upon the map display in relation to a certain latitude and longitude, or other set of geographic coordinates, related to a specific location on or near the surface of the earth. CAMP, EAT, POLICE and FUN also comprise POI names or labels upon the 501 map display. In consumer travel planning embodiments of the present invention, POIs typically represent accommodations and recreational attractions. For example, the July 1994 release of MAP'N'GO ™ by DeLorme Mapping Company, Freeport Me. 04032, included the following predefined types or subtypes of POIs represented on the map display by various colored symbols: (1) Points of Interest i.e. tourist, recreational and cultural attractions essentially symbolized by red arrows; (2) Hotels also, motels, inns, etc. symbolized by yellow diamonds; (3) Campgrounds symbolized by green triangles; and (4) Restaurants by blue circle symbols. Such symbols indicating the availability of multimedia information on certain types of POIs are illustrated at 157 in FIG. 1M, for example. For purposes of a simplified drawing, in FIG. 5, no such POI symbols appear on the map display shown at 501. On the 501 map display, EAT represents a Restaurant POI; FUN is a particular example of a Point of Interest type of POI; CAMP is a certain Campground POI; and HOTEL exemplifies a Hotel type or subtype of POI.

But, POIs are not confined to tourist attractions and travel accommodations. Alternative embodiments of the present invention handle a great variety of public facilities or infrastructures as geographic point type POI data e.g. POLICE as shown on the 501 map display. Located or locatable objects in geographical space can also qualify as POIs e.g. THING at 505 on the map display shown at 501. THING might comprise a fixed landmark of human or natural origin. THING might also comprise a moveable object such as a vehicle, another item of personal property, a migratory animal or species, a person on foot, or other non-stationary phenomena as currently known, estimated, or predicted to be at a particular location. POIs can also include intended locations such as the proposed location of a building, a place to meet, or the site of a planned event. The term POI or point of interest lower case encompasses extensive types of geographical point data identified with or related to located or locatable objects which can be input, described, depicted and accounted for in a multimedia database.

At 510, 512 and 514 in FIG. 5, waypoints comprise a third major type of geographic point data, in addition to place names and POIs. Waypoints is a term utilized in this disclosure for the starting place, ultimate destination and intermediate locations to stop or pass through on an intended trip. Such a waypoint list is a user selection and ordinal arrangement of the routable nodes or geographic point components of the transportation routes or modes of travel subject to routing computations in a given embodiment. To plan automobile travel on national highways and state roads, waypoints are typically defined in terms of road intersections or turning points in line segments or vector data representing routes customarily traveled by ordinary automobiles. For example, waypoints are defined in terms of road intersections and joints between the straight line segments used to represent normal automobile roads and highways in the routing and multimedia software travel planning utility included with the MAP'N'GO ™ digital atlas of North America on CD-ROM, released by DeLorme Mapping, Freeport Me., 04032 in July 1994. Any place name is linked for purposes of system functions to the nearest node i.e. road intersection or other juncture between line segments representing roads.

For various alternate embodiments, in order to address marine, air flights, off-road, pedestrian or other forms of transport and travel, waypoints are structured according to the physical and mappable characteristics of those other ways of going places. For example, travel by air involves available airports, private planes and commercial lines, safe and customary flight paths, terrain obstacles, etc., which become factors or building blocks for appropriate air waypoint data structures. Travel on foot is also constrained by legal and safety issues exemplified by sidewalks and crosswalks as well as issues of customary paths or trails and natural terrain limitations plus artificial obstacles, etc. Subways, buses and other public ground transportation systems and public or private marine travel also require waypoint data structures appropriate to the mode of transportation, taking into account factors such as available stops, stations, terminals or docks, regular routes, connections and schedules, human or natural obstacles, safe navigation practices, etc. Ordinary cars and railroad travel are plainly confined to certain routes and tracks. Travel by air, foot and boat takes place in a more open spatial context still constrained, however, by customary or legal paths or channels and physical obstacles. In the FIG. 5 map display at 501, waypoints 510, 512 and 514 are structured as nodes coinciding with various intersections of ordinary automobile roads and highways.

In the 501 map display illustration of FIG. 5, nodes 510, 512 and 514 have been entered in that order as waypoints for a planned trip from SOUTH PLACE, through PLACE to NORTH PLACE. The resulting optimal route computation is being displayed or output by graphical accentuation or highlighting of the recommended route as shown by the fine dotted lines around the optimal route 503 on the 501 map display. This highlighted route is identical with the two-part line segment, representing the route, illustrated at 528, 553 and 578 in the 526, 551 and 576 drawings of FIGS. 5A, 5B, and 5C.

The 501 map display illustration further discloses a typical latitude/longitude grid system of horizontal latitude lines e.g. 507 and vertical longitude lines e.g. 508 visibly superimposed as a locational aid over the map display. Such grid systems also are composed in terms of alternate geographic coordinate systems, such as UTM, State Plane as well as proprietary or arbitrary grid systems used for particular map publications. Capital letters on the right side in conjunction with roman numerals that run across the top of the map display form a typical system for identifying or naming individual grids, as a visual user aid for a variety of common map interpretation, cross-referencing and indexing chores. For example, the POLICE POI is found in the C-IV grid.

Such grid systems may comprise more than just a visual user aid. The present invention is typically, though not necessarily, implemented in conjunction with a geographic information system, or GIS, which manages spatial data with reference to interrelated matrices of quadrangular grids or tiles constructed substantially parallel to lines of latitude or longitude. Map database systems of this kind are detailed and disclosed, for example, in the David M. DeLorme U.S. Pat. Nos. 4,972,319 and 5,030,117 also, in the now pending U.S. patent application Ser. No. 08/265,327 David M. DeLorme and Keith Gray inventors, titled COMPUTER AIDED MAP LOCATION SYSTEM.

Map database systems or GIS organizing geographic data in terms of tiles, quads, grids or frames present several advantages disclosed in the background art just cited. These advantages generally derive from breaking down the massive amounts of data typically involved in a state of the art GIS into discrete, identifiable, adjacent and related map tiles, quads, grids and frames to store, retrieve, manipulate and integrate geographic information. Rapid generation or redrawing of map displays, recentering or panning across seamless maps, zooming to closer or more outlying map scales, as well as the correlation of located data and the management of cartographic computations are all enhanced by such GIS which manage masses of geographic data in small quadrangular units.

Such mapping database systems do not necessarily display the underlying system of map tiles, quads, grids or frames which are used behind the screen by the software. For example, the user can typically turn grid displays or longitude/latitude lines off or on, off to de-clutter the display, or on for better map location and orientation.

In FIGS. 5A, 5B, & 5C, the drawings at 526, 551 and 576 illustrate three different cartographic data structures, used behind the screen, for the transformation from routing output or lists of waypoints into POI lists which function as input for subsequent multimedia operations. The 526, 551 and 576 drawings illustrate alternative methodologies, used in conjunction with the present invention, to capture POIs situated within some specified distance along or around previous routing output or waypoints listed in order of intended travel. The preferred embodiments of the system manage transformations from routing to multimedia data structures utilizing GIS or map databases that organize geographic data into tiles, grids, quads or frames. Illustrations 526, 551 and 576 each reveal the same behind the screen or underlying system of grids or tiles for efficient geographic databasing. To simplify these drawings, FIGS. 5A, 5B, and 5C show a behind the screen database system of map quads or frames which correspond exactly with longitude/latitude lines and the grid or tile naming system superimposed as a visual aid on the 501 map display of FIG. 5.

FIGS. 5A, 5B, & 5C also show POI data corresponding to the 501 map display. For example, the FUN POI in grid C-I upon the 501 map display appears circled as P-F in grid C-I in 526, 551 and 576. Similarly, THING at 505 corresponds to P-T at 536, 559 and 586. Other geographic point data are reproduced exactly from the visible 501 map display over into the underlying behind the screen data representation in 526, 551 and 576. Thus, starting point node 510 in SOUTH PLACE is the same as 534, 557 and 584 in the other three data representations. 512, 530, 555 and 580 all represent the same mid-journey waypoint near PLACE. Likewise the end of the trip is shown at 514, 532, 556 and 582. Moreover, the two-part line segment, which is the highlighted route from SOUTH PLACE through PLACE to NORTH PLACE at 503, is reproduced exactly at 528, 553 and 578.

Reference numeral 526 illustrates the preferred technique of drawing a circle e.g. 538 around each node 534, 530 and 532 along a line segment or ordinal set of waypoints representing a planned route. These circles of a specified radius R at 541 define the tiles or quads within which the data transformation subprogram begins to search for POIs, as detailed hereafter in relation to FIG. 6A. For example, the circle drawn around node 530 prompts an initial search for POIs in the following grids: A-I, A-II, A-III, BI, B-II, B-III, C-II and C-III. This preliminary search turns up three POIs found within the intersecting tiles or quads: P-E=EAT; P-C=CAMP; and P-H=HOTEL.

As detailed hereafter relative to FIG. 6B, the next step within the routing to multimedia data transformation subprogram is to identify all the POIs, just found in intersecting tiles or grids, that are also found inside of the circle of radius R around node 530. In this case, this second step eliminates all three POIs just listed. But, POI P-F in grid C-I does fall within the circle of radius R drawn around node 534. In fact, using the 526 circle methodology, P-F is the only POI which gets on the POI list presented as potential multimedia input at step 303 in FIG. 3. To check for POIs in each of the three circles, the 526 methodology concatenates such searches of all the circles and sets of intersecting grids or tiles around a succession of nodes, as detailed in relation to FIG. 6A.

The 526 circle methodology is preferable for ordinal series of waypoint inputs transferred through step 431 in FIG. 4. Such waypoint input is transferred before the computation of an optimal route. Therefore, the optimal route between the entered waypoints is yet an unknown. For software simplicity, and particularly for conventional on-road automobile travel, the 526 circle technique is also preferred. On ordinary rural or urban automobile trips, the car and driver cannot turn off the road between nodes or road intersections and proceed cross-country or through city buildings and blocks to adjacent POIs. But note that the 526 circle method misses P-H or HOTEL in grid C-II adjacent to Rt. 66, which is likely accessible from the optimal route that it adjoins.

Other embodiments additionally or alternatively use the methodology pictured at 551 of a line buffer i.e. a polygon enclosure which is drawn equidistantly at a specified tangential T distance all around a line segment. The line segment at 553 represents the optimal route between the nodes computed for the journey to NORTH PLACE, from SOUTH PLACE, through PLACE. Such line segments derive from routing computations, as detailed in relation to FIG. 4, expressed at step 453 as output from pure or combined operations performed in the routing mode. This 453 output then gets transferred via step 471 for ensuing multimedia operations.

The user defined region outlined by the line buffer at 561 serves a similar function to the circles shown at 526. In other words, the 551 method begins searching for all POIs located in tiles or grids which intersect the line buffer region. Next, searching is narrowed to produce a list of POIs found inside the line buffer itself. Thus the line buffer methodology works with the steps detailed in relation to FIGS. 6A and 6B hereafter except for substituting the tangent T for the radius R. The line buffer technique does require extra code and algorithms for handling routing output from step 471 in FIG. 4, at least when implemented in addition to the 526 circle technique.

In FIG. 5B, note that the line buffer methodology did capture POIs at P-H in grid C-II, and at P-C in grid A-III, where the 526 circle technique missed these same POIs. The 551 method of the line buffer is therefore preferable in cases of POIs found between circles adjacent to and accessible to computed routes. The line buffer data structure is also preferable for ground vehicles capable of off-road travel as well as travel by air, boat or on foot i.e. transport which can handle detours and side trips off-route between nodes. On the other hand, the method of circles shown at 526 is better for trips by rail or other transport which stops only as scheduled at predetermined waypoints, without possibility of detouring or side trips off the beaten track.

FIG. 5C at 576 shows a third behind the screen data configuration for the transformation of routing output and waypoint input in lists of nearby POIs for subsequent multimedia presentations controlled by the user. Instead of a circle or line buffer, the 576 method employs a custom or irregular polygon 588. Such odd polygons can be manually drawn by the user, employing known technologies for graphic input, or derived from alternate algorithms for relating computed routes or specified waypoints to surrounding POIs. For example, in the 576 drawing in the lower right of FIG. 5, there is an irregular polygon at 588, shown by dotted lines, that results from an algorithm which combines a line buffer along a computed route as done in drawing 551 with a line buffer drawn along major intersecting routes out to a certain distance from the intended route. But, note this more intricate algorithm can capture both EAT=P-E and POLICE=P-P, which are some distance from the user's planned route, but readily accessible on Main Street. Such complex algorithms require more code and slow the routing to multimedia data transformation process. This more complex algorithm is, nonetheless, a preferable methodology for applications where a more refined model of accessibility to POIs beside a planned route is desired.

FIGURES 6A–6B

FIGS. 6A and 6B illustrate the steps whereby the CARS system transforms routing output or a waypoint list into a list of POIs. In relation to FIG. 2, such transformations take place in the interaction subsystem 207. Waypoint lists are transferred via path 233, Pure routing output is conveyed through path 261. Routing output combined with prior multimedia becomes involved in the processes depicted in FIGS. 6A and 6B by way of path 267 in FIG. 2. In relation to FIG. 4, these same transfers pass through connector A as also revealed in FIG. 6A. In FIG. 4, waypoint input approaches A by means of step 431. Pure or combined routing output is delivered to A via step 471. FIG. 5, particularly the drawing of the circle methodology at 526, provides background on the cartographic data structures involved in FIGS. 6A and 6B.

FIG. 6A shows the bounds of the interaction 207 and multimedia 209 subsystems with dotted lines and reference numbers corresponding to FIG. 2. The processes shown in FIGS. 6A and 6B transpire more generally within the FIG. 2 interaction subsystem 207. FIGS. 6A and 6B work together via connectors A1 and A2. The FIG. 6A and 6B data transformations culminate at C as seen in FIG. 6A, corresponding with step 303 and C in FIG. 3.

A typical episode of usage of the processes depicted in FIGS. 6A and 6B commences at A. Step 601 comprises a node list from the routing mode. The 601 node list consists of waypoints ordinally arranged in order of travel along the route coming either from the waypoint input module through step 431, or through step 471 from the routing output module at 453 in FIG. 4. For a new list of nodes fresh from routing, step 603 initializes the overall transformation process.

As detailed hereafter, further processes explained relative to FIG. 6B loop back through A1. Moreover, in an alternative embodiment, the user can enter A1 at 605 in order to process canned or prepackaged node lists offered as data accessories. A1 at 605 also provides access for the user to recall lists of nodes representative of ordinal waypoint input or routing output from memory or from a database process. Unless processing of a list of nodes for a route between an origin and a destination is complete, step 607 leads to the processing of the next node. After processing of a list of nodes for the route is complete, it passes through 607 and C to the multimedia mode. Steps 608 and 610 get the current node ready for the subsequent search for POIs.

FIGS. 6A and 6B search for POIs utilizing data structures depicted in FIG. 5 particularly the circle methodology sketched in FIG. 5A at 526. As depicted at 201 in the FIG. 2 block diagram, the present invention preferably works in relation to a geographic information system (GIS) or a mapping database system which manages massive amounts of cartographic or located information through use of tiles, quads, frames or grids. The grids comprise quadrangular units of geographic data stored, retrieved and processed relative to particular geographic coordinates. At step 612, a circle of radius R is drawn around the current node as a first step. Step 325 in FIG. 3, connector N and step 467 in FIG. 4 show procedures whereby the user adjusts or resizes the radius R. The parameter 563 in FIG. 5B indicates an analogous, adjustable parameter or criteria, namely the line buffer tangent T, which is also variable at the user's option in order to modify the size of the user defined region searched for POIs. Next, in step 612 in FIG. 6A, all tiles touched by the circle are identified and listed in 614 for further processing in FIG. 6B. Step 616 does the housekeeping chore of setting up for further sessions of tile gathering around subsequent nodes.

FIGS. 6A and 6B connect through A2. In FIG. 6B, by way of step 620, the determination is made whether the subprogram now at work has processed all the tiles from the list at step 614 in FIG. 6A. If finished with processing a given set of tiles, as touched by a specific circle, then the train of software steps is looped back up through A1. If still more tiles around a node and on a list do need processing, then step 620 directs functioning to steps 622 and 624 in order to get the current tile. Items is the term used in FIG. 6B for individual POIs as found within first within tiles and then within circles. In effect, step 626 sorts the larger list of POIs found within intersecting tiles and extracts a short list of POIs found within the relevant circle of radius R centered on the current node. Said short list of items or POIs is then produced in step 628. Step 630 initializes this short list process. Step 632 determines whether work on the 628 item list is complete, in which case operations look back up through A2 to 620. Steps 634, 636, 638 and 640 function to place new items on the POI list and to avoid any duplication of items on POI lists such as can result from overlapping circles around close nodes.

OVERVIEW: FIGS. 7, 8A–8E

Figure 7C:
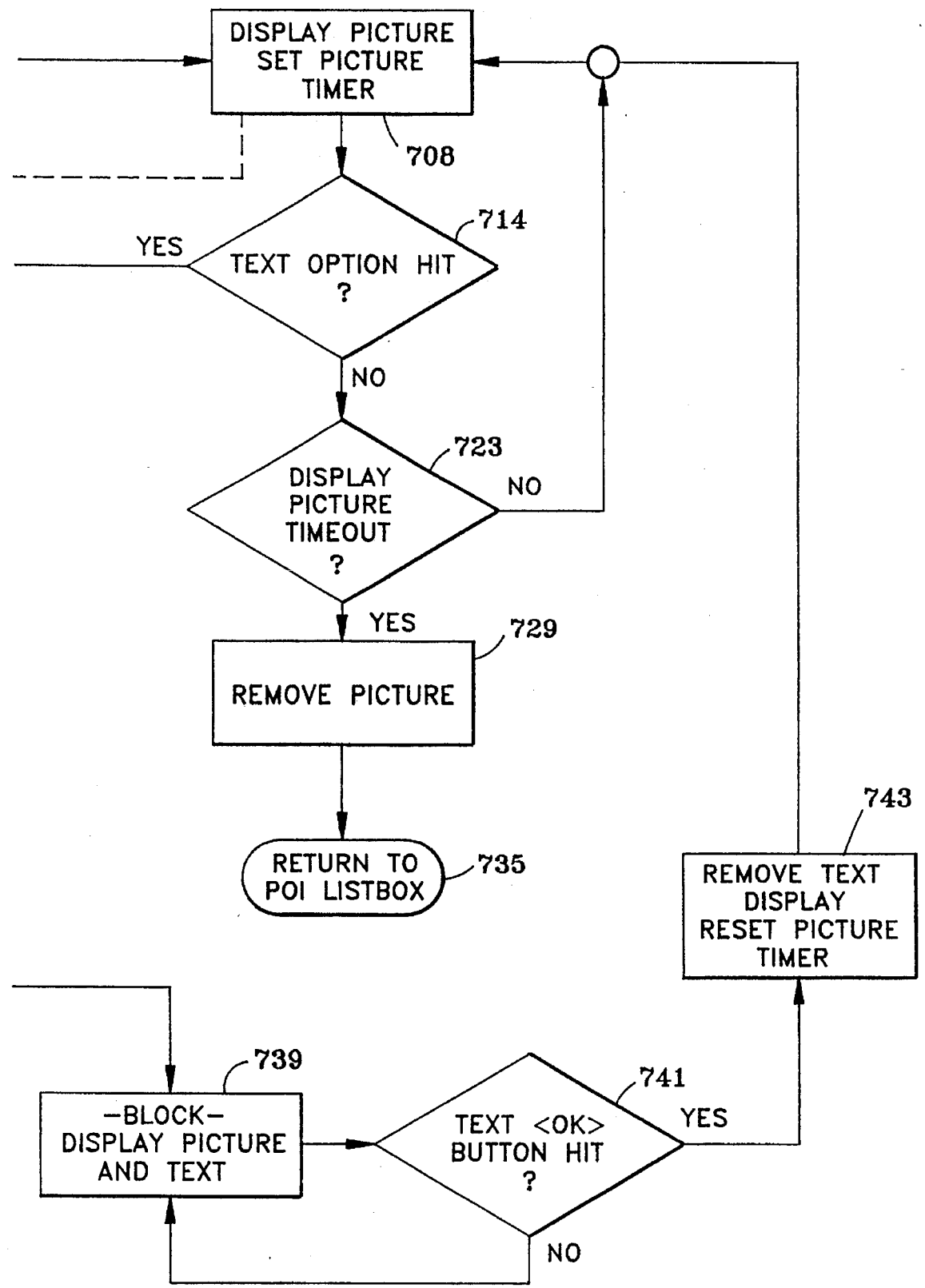

FIG. 7 assembled from FIGS. 7A–7C and FIGS. 8A–8E illustrate the flexibly organized suites of user controls and commands as procedurally structured and made available on the multimedia side of the CARS system. Consistent with the object of facilitating user friendly capabilities for combining routing computations and multimedia about locations, the multimedia mode of the present invention offers the user many selections and ways to interact with the overall technology. In relation to FIGS. 7, 8B, 8C and 8D the specification details how users are enabled to selectively play available information about locations and situated objects picking among available audio modes e.g. voice, music, natural, or created sounds, graphic and pictorial images or alphanumerical text. The user can shape his or her multimedia experience by isolating these various media and topics of interest. Users are also able to mix and integrate multimedia contents and formats.

This flexibility and selectivity within the multimedia mode facilitates and enhances two major groupings of user interactions with the inventive technology, combining multimedia and routing. The first relates to user responses to the multimedia, choosing or deleting places or waypoints for ensuing routing operations. The second group relates to responses to the multimedia wherein the user picks, composes, edits or removes information related to geographic locations in various media and formats which then is attached to travel plan output. These responses are implemented through steps 309 and 315 in FIG. 3, which transfer both data and operations from the multimedia mode to the routing mode. In turn, these responses are combined with routing through pathway 403 and step 465 in FIG. 4. Relative to FIGS. 3 and 4, more details are furnished elsewhere in this specification on how user interactivity with located multimedia gets combined with routing computations and travel plan output by waypoint input list modification or the attachment process.

Figure 8A:
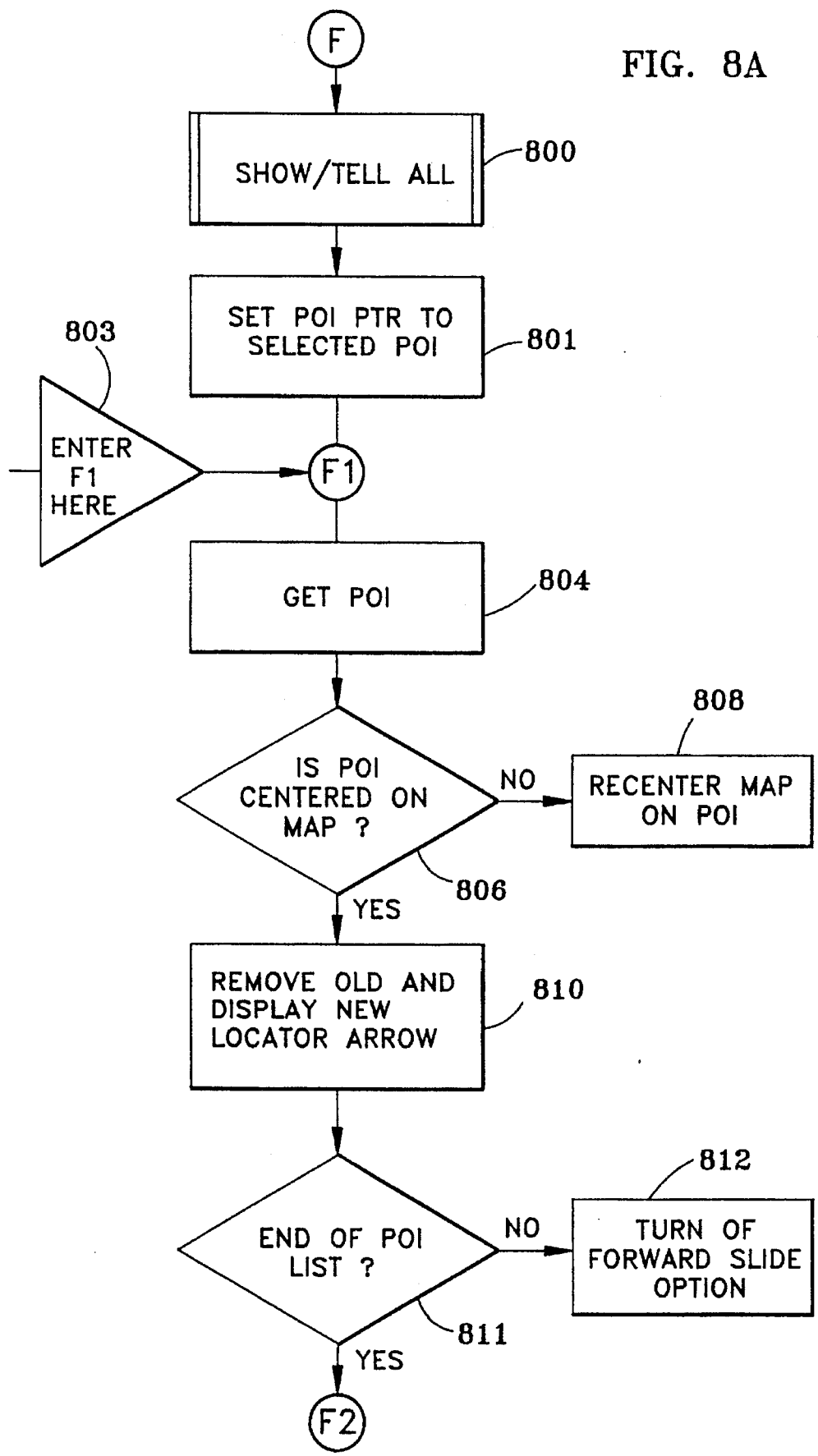
FIGS. 8A–8E further illustrate the flexible user controls and commands for multimedia related operations of the CARS system.

In relation to the more general FIG. 2 block diagram, the software structures and operations detailed hereafter referring to FIGS. 7 and 8A–BE are concentrated in the multimedia subsystem at 209. FIGS. 7 and 8A–8E and 8C detail processes as accounted for more generally in relation to steps 219, 255, 265 and 273 in FIG. 2. Moreover, FIGS. 7 and 8A–8E depict procedures which deal both with pure multimedia i.e. with no prior routing and combined multimedia operations i.e. which follow and incorporate data from prior routing operations. As detailed in relation to FIG. 3, the user can start playing multimedia about locations using the structures and operations shown in FIGS. 7 and 8A–8E and then go to the routing mode in order to compute an optimal itinerary for a trip to selected locations.

But, the structures and operations depicted in FIGS. 7 and 8A–8E and detailed hereafter are equally suited to play multimedia place information after and in relation to locations or POIs found along an optimal route or set of waypoints as derived from a prior substantial routing operation. The data transformation process, for deriving POIs for potential multimedia presentation from prior routing outputs or waypoint input lists, is described in relation to FIGS. 5, 6A and 6B elsewhere in this specification. As disclosed in relation to FIGS. 2 and 3, multimedia presentations are often combined with both prior and ensuing routing operations in typical usages of the technology. The system is designed to facilitate more or less complicated mixed sequences of routing and multimedia in which the user engages in order to develop and refine custom or individualized travel plans.

FIG. 7

The operations illustrated in FIG. 7 commence through E at step 702. The connector E is also shown in FIG. 3, after step 305, which more generally represents the interface engaged by the user to prompt and manage Show/Tell One multimedia information about a single selected POI or location. In the initial release of MAP'N'GO ™ 1.0 by DeLorme Mapping Company, Freeport, Me., this interface is accessed by pushing a button called Show/Tell One in the Points of Interest system dialog box a.k.a. the POI Listbox illustrated at 148 in FIG. 1J and at 162 in FIG. 1-0. For an example, typically the user points and clicks on one of the POIs as listed in this dialog box and then pushes the Show/Tell One button in order to prompt multimedia about that particular POI. Relative to FIGS. 2 and 3, other methods are detailed for users to locate and pick multimedia POI input.

In FIG. 7, operations proceed from step 702 to both steps 704 and 706, which are implemented concurrently. The system defaults to available audio or pictures through steps 704 and 706. Audio output is played at 710, with volume and other variables controlled at 716. As delineated in FIG. 7, for the July 1994 release of the CARS system, each POI in the database of multimedia is associated with no more than one audio output. This is typically a 'short travelog narration with background music. Likewise, no more than one picture is associated with any given POI typically a digital photo of a museum, a unique natural site, an hotel or a restaurant found at the POI location, Other embodiments of the system include multiple still or moving pictures and additional, selectable audio outputs. Thus, if it is all that is available in a Show/Tell One episode, then a sound recording plays to its end whereupon, the user returns at 725 to the POI Listbox. But, if a picture is available, then step 708 shows it for a preset adjustable period of time. Alternate embodiments of the present invention include multiple audio or visual images related to individual POIs. The user can browse, edit and arrange flexible multimedia presentations about a single POI through routine manipulation of such multiple audio or visual materials.

At minimum, in the July 1994 release of the CARS system, every POI, for which there is information in the database of located multimedia, has one related text message. Typically, such a POI text message literally transcribes the optional audio travelogue narration. Variant embodiments include multiple textual documents linked to individual POIs communicating a broad range of information about the POI location in diverse alphanumerical formats. Examples include comprehensive demographic, historical, or environmental information about locations, commercial or personal data about parties located at residential or business addresses, running inventories or data tabulations pertaining to particular sites, and references to or excerpts from works of fact or fiction citing the location. The first release of the system software does provide detailed text information about rooms, amenities, prices, phone numbers, nearby attractions, etc. for an extensive selection of hotels, campgrounds and other overnight accommodations as illustrated in FIGS. 1L and 1M, As released in July 1994, the system software provides the Show/Tell One multimedia user access to such text displays as an elective option at 714 in FIG. 7. Alternate embodiments default to text output and extend the user options to focus upon specific topics or textual content by means of routine state of the art software text search technologies. Audio and visual images are "played" to accompany or substitute for text in alternate embodiments. The CARS system displays such text at the user's option 714 in step 712 in FIG. 7.

In FIG. 7, steps 718 and 720 illustrate user options and controls which enhance flexibility and selectivity of play in the multimedia mode. Dotted line boxes and connecting lines, as in 718 and 720 and between 708 and 718, represent user commands, options, and controls made available throughout a series of steps. Thus, for example, step 718 options are available all during any sound 710 or picture 708 show and any text 712 display as well as any combinations thereof. As shown at 748, 749 and 750, the slide control options at step 718 are essentially buttons of the familiar rewind, stop and fast forward types which let the user replay, halt or advance any presentation in any medium. More detail is provided on these slide control options relative to FIG. 8D.

The CARS system displays pictures or optional text for a preset, adjustable time period. Steps 723 and 727 measure whether this time period has expired and maintain the display of pictures or text until expiration of said time period. Step 720 extends this time period whenever the user elects to call up a dialog box in order to change display settings on the fly or otherwise adjust format or output options for ongoing multimedia. Consistent with overall invention objectives, these features let the user browse or sample multimedia information about a certain location with flexibility to dwell upon or review information of particular interest, or fastforward through less interesting parts of a presentation. Moreover, a presentation gets extended or prolonged while the user is adjusting the presentation format or proceeding to attach selected POI information to his or her travel plan, or to select or deselect a POI as a waypoint, for purposes of subsequent routing operations. These flexibility features not only enhance the user playing the multimedia in the first instance. Selectivity in the multimedia mode further enables the user to focus upon particular multimedia in order to pick POI locations for transformation into waypoints, or to edit pictorial, text or audio travel information for attachment to travel plans.

Steps 729 and 731 remove or end display of pictures or text when the preset time period for display has expired. In the Show/Tell One module, steps 737 and 735 return the user to the POI Listbox i.e. to connector C in FIG. 3. The user is also returned to the POI Listbox or main multimedia menu at the end of available recorded audio, or if the user employs the 718 slide control in order to stop an ongoing multimedia presentation on a single POI, at step 725. Step 739 presents a modal dialog box routine, in effect, asking the user "Are you done?" whenever a text and picture presentation are complete. At this point, the user can opt to select or delete the pertinent POI or the nearest node as a waypoint or to edit and/or attach multimedia information about the POI to an emerging travel plan. The user hits an OK button in step 741 in order to return through step 743 to step 708 where the picture display clock is restarted. Unless the user opts for a replay of the text option at 714, steps 723, 729 and 735 time out the picture and return the user to the POI list box as shown in FIG. 3 and FIG. 1J at 148.

As released in July 1994, the CARS system enables the user to choose between Show/Tell One, as detailed relative to FIG. 7, and Show/Tell All, as detailed relative to FIGS.

8A–8E. Alternate embodiments facilitate filtering a short list of POIs from a larger list of POIs, according to a wide range of criteria and methodologies available in the art of computerized management of lists. In other words, given an array of 50 or 500 POIs found along a route or from a coarse multimedia database search or from a canned or prepackaged list of POIs, alternative embodiments of the present invention facilitate automated sorting of the long list by obvious state of the art software techniques. The user can then concentrate the subsequent multimedia presentations on POIs of particular interest with specific characteristics. Users of alternative embodiments can distill, condense and refine long POI lists for more efficient multimedia presentation, using well known obvious technologies.

FIGS. 8A–8E

Figure 8B:
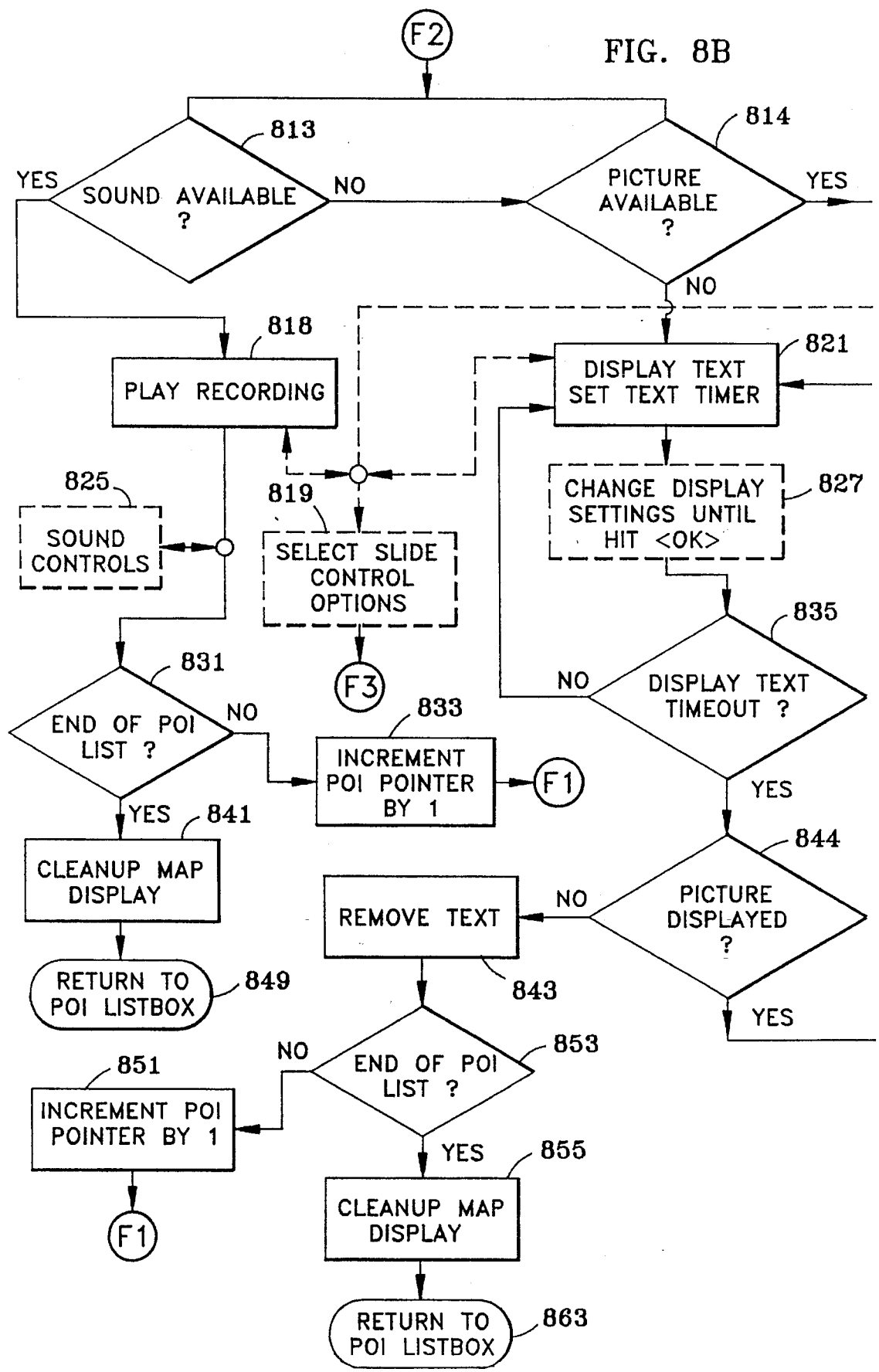
Figure 8C:
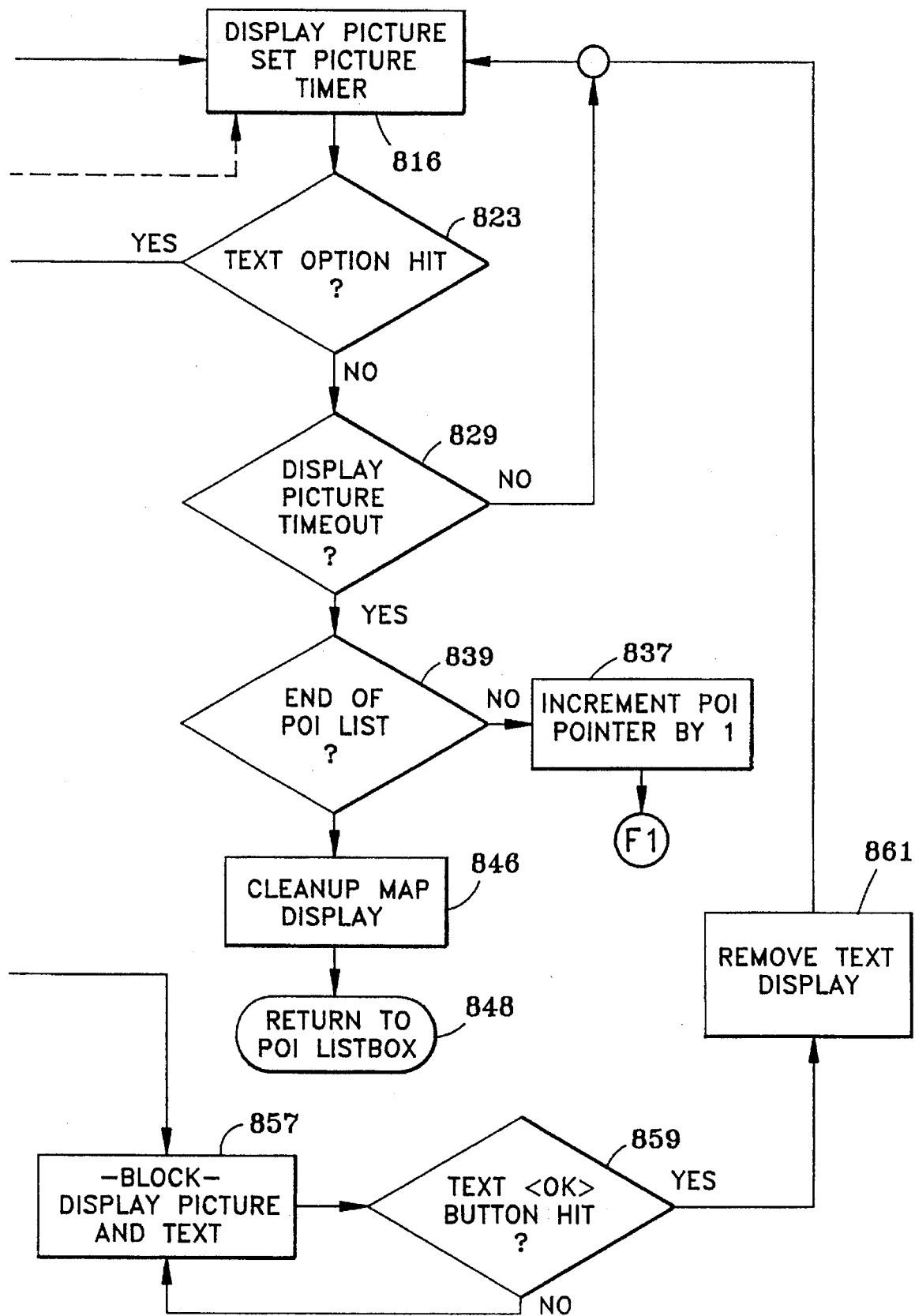

The Show/Tell All module illustrated in FIGS. 8A,8B and 8C typically processes entire lists of POIs derived from substantial routing operations as detailed in relation to FIGS. 5, 6A & 6B. Alternatively, the Show/Tell All module processes POI lists as entered manually by the user or derived from a database search within the multimedia subsystem as detailed relative to FIG. 2. Show/Tell All handles entire lists of POIs from various sources such as: (1) lists of route related POIs transferred from the routing subsystem at 205; (2) lists of pure multimedia POI input generated within the multimedia subsystem at 209; plus (3) lists of POIs derived from more or less complex prior sequences of combined routing and multimedia operations, as described with reference to FIG. 2.

FIG. 7 presumes the underlying map display encompasses or is centered upon the single pertinent POI. But, shown generally at step 307 in FIG. 3 and detailed in FIGS. 8B and 8C the Show/Tell All command prompts multimedia presentations about each item on an entire list of POIs. Depending on map scale and the distance between POIs, not all POIs on a given list necessarily appear on the map display serving as background and cartographic interface on the computer screen for practically all embodiments and usages of the present invention. FIG. 8A illustrates the process that automatically shifts or pans the map display, as required, to center upon the geographic coordinates of the POI currently the focal point of a Show\Tell All multimedia presentation.

The processes shown in FIG. 8A commence at connector F as also shown following step 307 in FIG. 3. Step 307 corresponds to step 800 in FIG. 8A. Step 800 presumes a current POI list of two or more POIs. Step 801 initializes the process depicted in FIG. 8A, setting a pointer on the first POI on the current list. This pointer is incremented in various contexts revealed in FIGS. 8B and 8C hereafter. In the CARS system embodiment, step 803 in FIG. 8A facilitates Show/Tell All operations looping back up and reentering at F1 for a new cycle of map centering operations each time the Show/Tell All module is ready to focus on the next POI on the current list. Step 803 serves further as entry point for series of multimedia presentations that commence at some user selected point along a previously computed route or part way down a POI list in alternate embodiments of the present invention.

Step 804 fetches the next POI on the current list i.e. the next POI which is about to become the focus or locus of a multimedia information presentation done in the Show/Tell All module. If the map display is not already centered upon or does not cover this next POI as determined in step 806, then at 808 the map display shifts or pans to recenter approximately on the geographic coordinates of said POI. For example, consider a POI list consisting of two items, namely offices located in Los Angeles and New York City. Assuming that Los Angeles is first on the list, step 808 redraws the map display to center on the New York City office just as the multimedia about the New York office is about to begin and right after multimedia about the Los Angeles site is completed or terminated by the user.

Even when the map display easily encompasses successive POIs on a given list, so there is no need to shift or recenter the map display, the CARS system indicates the current POI utilizing a characteristic graphic Locator Arrow on screen. Step 810 takes care of drawing such an arrow to the next or newly current POI. Step 810 further removes the Locator Arrow which pointed to the preceding or old POI.

Step 811 determines whether the current POI is the last item on the current POI list subject to a Show/Tell All command. If the process revealed in FIG. 8A has reached the last item on the current POI list, then the forward slide option or button is dimmed or turned off in step 812. Step 812 is a housekeeping matter. It makes no sense for the user to try and call for the next item on the POI list when the last item on the POI list has already been reached.

The process illustrated in FIG. 8A concludes at connector F2 where the Show\Tell All multimedia processes start as shown in FIG. 8B. With certain differences to accommodate processing of entire lists of POIs rather than singular POIs, the processes illustrated in FIG. 8B roughly parallel the software functions and structures revealed in FIG. 7. FIG. 8B depicts flexible user options and protocols for managing multimedia presentations about the current POI in an entire list of POIs.

From F2, the operations illustrated in FIGS. 8B and 8C proceed to steps 813 and 814 which are implemented concurrently. Although alternate embodiments of the invention might default to a text display of information about the current POI, the Show/Tell All command of the system prefers available sound or audio output and pictures or visual/graphic images. Available sounds, such as travelog narrations, are played at 818 from beginning to end subject to user control of audio volume, tone, etc. in step 825. In alternate embodiments, audio output calls for user interaction or responses. The audio output pauses and waits for an appropriate user response, proceeding apace if the user does not answer for a predetermined interval. The CARS system displays available pictures for a preset, adjustable time in step 816.

The MAP'N'GO ™ July 1994 release automatically displays literal nonvocalized text as words printed typically in a window over the map display on screen only in the event that no sound or pictures are available relating to the current POI location. The interplay between steps 813, 814 and 821 demonstrate this logic. However, step 823 enables the user to opt for display of silent alphanumeric text information on screen, supplementing available pictures. This feature addresses the practical reality that, while audio-visual output is preferred for many consumer travel information embodiments, many users and installed systems lack sound cards and speakers. Moreover, though audio output is preferred as a rule for vehicle drivers alone who must keep their eyes on the road and instrument panel, under some circumstances, in vehicle users opt for having a passenger monitor literal text and pictures in windows on the map display, electing to turn the sound off to facilitate conversation or for enjoyment of silence or listening to music tapes or news on the car radio for example.

More important, like FIG. 7, FIGS. 8B,8C illustrate interactive and articulated options and structures for multimedia output that are organized so the user can play, review, select, edit or merge location information in diverse media. Thus, the user can focus on informational content in accord with individual personal interests and preferences. In other words, unlike the background art, the CARS system is not limited to silent information in text format only. Nor is the system restricted to canned still digitized photos, related text or audio concerning sites in a general region, played from beginning to end without user interaction. The present invention facilitates the flexible play, selection, and manipulation of multimedia information focused upon individual POIs or specific user selected lists of POIs.

Moreover, as depicted in FIGS. 7 and 8B,8C within a multimedia presentation concerning a particular POI, the system embodiment enables the user to select, review and segregate portions of the available multimedia information with regard to both media and content. Thus, the user can concentrate on the available informational content that is of the most immediate interest, using the medium or media most convenient or useful under the circumstances. Otherwise stated, this capability for user-controlled, flexible and focused play of multimedia information about specified locations facilitates individualized, interactive user responses. For example, users can make individual choices about what POIs to add to, or remove from, their list of waypoints along a planned itinerary based on their own selection among available multimedia information about those POI locations. The first release of the CARS system further facilitates selective attachment of text information about POIs, picked by the user, to travel plan output generated by combined or sequenced routing and multimedia processes.

Alternate embodiments of the present invention additionally facilitate editing and amendment of text attachments, attachment of selected visual images or audio output, and the insertion or input of new or supplemental multimedia located information through obvious, routine state of the art programming techniques for storage, retrieval and modification of multimedia data. For example, as detailed in relation to FIG. 4 and illustrated in FIG. 1N, embodiments for sales, real estate or security agents attach digital photo images, or even video clips, of particular properties or people at the appropriate locations on specialized travel plan outputs. Available technology further permits attachment of audio messages to travel plan output at relevant locations. Emergency or delivery personnel can recall and hear crucial client messages or instructions in relation to the known or estimated location of an emergency or delivery event. Relative to specific geographic locations, personal snapshots or video, voice/audio experiences recorded on tape or text recollections can be input, stored and recalled, utilizing the present invention as a digital travel album. Such diverse contents and media can be modified, revised and composed selectively together employing obvious, state of the art techniques for the computerized manipulation of interrelated text, graphic imagery or audio data.

Particularly for the preferred embodiments of the present invention distributed on read only CD ROMs, a Replace function facilitates or enhances usage as a digital travel album and the flexible manipulation of multimedia, as well as updating of the GIS database. The Replace function stores and manages added or updated information on the hard drive or other equivalent memory devices. By routine means for coordinating various databases or memory devices, taking into account the geographic coordinates or other prominent information attributes such as the time and date of data input, the Replace function further overwrites or amends fixed information on the CD-ROM with added, updated or corrected data, or deletions thereof, including cartography, text, audio or pictures. This facilitates for example correction of highway data reflecting new road construction, other updating and amendments of mapping, multimedia and routing data, addition of personalized annotations or images in the manner of a diary or photo album as well as the selective editing and recomposing of the multimedia substance and forms for presentations and attachments. In summary, the Replace function offers the advantages of cheap massive permanent CD-ROM storage in conjunction with the flexibility and modifiability of read/write storage devices such as hard drives and flash memory.

In FIG. 8B,8C the flexibility and selectivity of information content and media are enhanced by steps 819 and 827. These steps correspond respectively to steps 718 and 720 in FIG. 7. In the FIG. 2 block diagram, the user can similarly access and adjust user options at steps 215 and 219 from the more generalized steps for combined and pure multimedia output at 265 and 273. Steps 819 and 827 facilitate interaction with and choice of information in relation to the temporal structure whereby audio, text or visual information are played as illustrated in FIG. 8B,8C.

While step 818 plays prerecorded audio to its conclusion, steps 816 and 829 work together to display available pictures for a preset, user adjustable period of time. Any text information displays are similarly clocked by means of steps 821 and 835. Unless the user intervenes, located information is heard for its duration, read and seen for a period of time. Once such information plays are over without the user taking action, Show/Tell All proceeds to present multimedia on the next POI. Available at any point in any Show/Tell All output operation, step 819,866 provides the user with slide controls of the rewind, stop and fast-forward type, revealed in more detail in FIG. 8D. Step 819,866 lets users discretely replay, extend or advance audio, visual and text outputs together or as individual media. The user can concentrate on, repeat or skip over particular information at will, electing a certain medium or combination of media as well.

This capability aids the user to interact with or respond to the multimedia information, for example: (1) to make decisions about which POIs or locations to include or delete as waypoint inputs; or (2) to pick, edit and compose location-related information for attachment to combined travel plan output. Likewise, step 827 stops the clock or blocks expiration of text information outputs or displays whenever the user opts to engage in manipulation or adjustment of the multimedia output/display. This means that the map display and related text information window remain in place focusing on the current POI while the user engages in activities such as resetting the time period for text or visual displays, or resizing or repositioning text or picture windows covering part or all of the map display, or modification of waypoint lists or the attachment of information to travel plans.

In FIG. 8B,8C steps 831 and 833, 837 and 839, 851 and 853 do essentially the same job for audio, text and visual presentations. These steps increment the POI pointer to the next POI left on the current POI list once a specific presentation is finished or terminated by the user. The user then returns to F1 in FIG. 8A to get the next POI, and recenter the map display if needed.

Presentations about the final POI on the current list are complete as determined in steps 831,853 and 839 respectively for audio, text and pictures. Then the locator arrows for current POIs, see step 810, and other symbols or legends placed on the map display as part of any multimedia presentation, are erased or cleaned up in steps 841,855 and 846. Then, steps 849, 848 and 863 return the user to the POI Listbox or main multimedia menu, as detailed relative to FIG. 3.

In the manner of a modal dialog box, at the end of a text and picture display, step 857 holds text and pictures on screen while asking the user "Are you done?" in effect. The user then can opt to select or delete the pertinent POI or the nearest node as a waypoint, or to edit and attach multimedia information about the POI to an emerging travel plan. Or if the user hits the 859 OK button, then the text display is removed in step 861, and the process returns to restart the picture display clock at step 816. Unless the user opts for a replay of the text option at 823, steps 829 times out the picture. If there still are more POIs on a Show/Tell All list, steps 839 and 837 return the user to connector F1 in FIG. 8A to get the next POI on the current list. At the end of the current POI list, as detected in step 839, step 846 cleans up the map display. At 848, operations are returned to the POI listbox that is detailed further relative to FIG. 3 and FIG. 1J at 148.

Figure 8D:
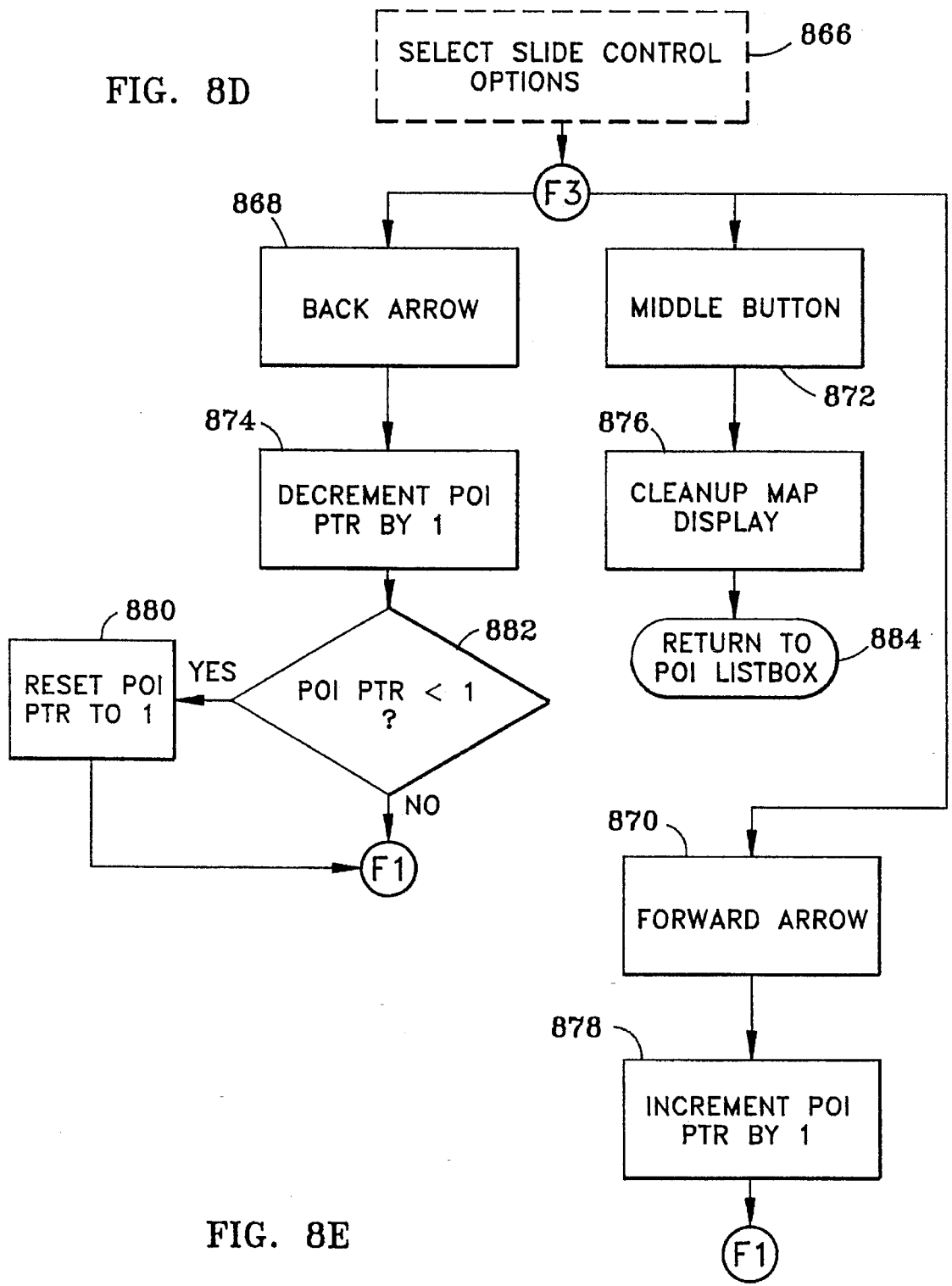
Figure 8E:
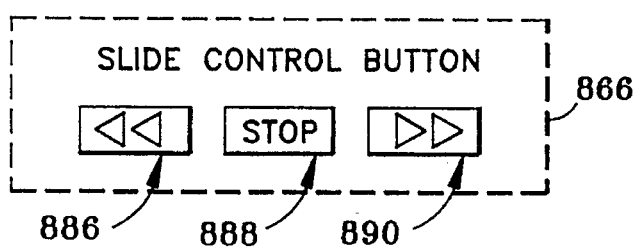

FIG. 8D details the working of the "stop", "rewind", and "fastforward" style Slide Control shown at 718 in FIG. 7 and 819 and 866 in FIG. 8. At connector F3, the user is presented on the system interface with optional buttons to replay, halt or advance multimedia presentations. At 874 and 878, the forward and back arrow buttons effectively increment or decrement the POI pointer. Steps 880 and 882 reset the presentation on the beginning of the current list whenever the user backs up past the first item on a given POI list. Thus, full back and forward operations move the user to F2, which is the beginning of Show/Tell operations shown also in FIG. 8B. The Stop button brings multimedia operations to a halt at 872, cleaning up any text or pictures presented in windows on top of the map display in 876. The Stop button takes the user back to the POI listbox which is the startup multimedia mode described in relation to FIG. 3.

While the invention has been described with reference to particular example embodiments it is intended to cover all modifications and equivalents within the scope of the following claims.

We claim:

1. A computer aided routing system (CARS) comprising:

a digital computer having a computer display;

a map database providing a set of electronic maps for presentation on the computer display;

said electronic maps depicting transportation routes having identified waypoints including route intersections at geographical locations along the transportation routes, said identified waypoints depicted on the electronic maps being identified in the computer by coordinate locations of a selected geographical coordinate system;

a CARS database of geographically locatable points of interest (POIs) identified by coordinate locations in said geographical coordinate system, said POIs being organized into a plurality of types for user selection of POIs by type, said POI types comprising overlays of the CARS database for display over the electronic maps on the computer display;

CARS software constructed for user travel planning using said electronic maps presented on the computer display, said CARS software permitting user selection of a travel origin, travel destination, and desired waypoints between the travel origin and travel destination, said CARS software calculating, delineating, and displaying a travel route between the travel origin and travel destination via the selected waypoints according to user choice of the shortest travel route, quickest travel route, or user selected preferred travel route;

said CARS software permitting user selection of a region of interest along the user defined travel route, said region of interest having user specified dimensions and permitting user selection of specified POI types within said region of interest and user selection of particular POIs from the selected types within the region of interest, said region of interest being identified in the computer by coordinate locations of said geographical coordinate system;

said CARS database comprising travel information selected from the group consisting of graphics, photos, videos, animations, audio information, and text information about POIs of the CARS database and about selected transportation routes and waypoints of the electronic maps;

said CARS software being constructed to present a user customized travelog for preview on the computer display of the user defined travel route including said travel information in the CARS database on the transportation routes and waypoints of the electronic maps and the selected POIs of the CARS database in the user defined region of interest along the travel route.

2. The CARS of claim 1 wherein the CARS software is constructed to display a user customized strip map of the user defined travel route.

3. The CARS of claim 2 wherein the CARS software is constructed to display a user customized strip map of the user defined travel route along the center of the computer display, user selected POIs in the user defined region of interest being listed along one side of the strip map with pointers to respective POI locations in the region, and travel directions for the travel route being listed along the other side of the strip map with pointers to respective intersections corresponding to directions along the travel route.

4. The CARS of claim 3 wherein the user customized strip map is vertically oriented with the travel origin at the bottom of the strip map and travel destination toward the top of the strip map.

5. The CARS of claim 2 wherein the digital computer comprises a printer and wherein the CARS software is constructed for printing hardcopy maps of the user customized strip maps.

6. The CARS of claim 3 wherein the digital computer comprises a printer and wherein the CARS software is constructed for printing hardcopy maps of the user customized strip maps showing the travel route, list of POIs and pointers along one side of the strip map, and list of directions and pointers along the other side of the strip map.

7. The CARS of claim 1 wherein the electronic maps, CARS database, and CARS software are stored on a CDROM and the digital computer comprises a CDROM drive.

8. The CARS of claim 7 wherein the CARS software comprises a replace function for updating the electronic maps and CARS database on the CDROM with replacement or supplemental information from another memory device.

9. The CARS of claim 1 wherein the transportation routes depicted on the electronic maps are selected from the group consisting of vehicle routes, ferry routes, air travel routes, bicycle routes, and hiking trails.

10. The CARS of claim 1 wherein the selected geographical coordinate system is the standard latitude/longitude (lat/long) geographical coordinate system and coordinate locations are stored in the digital computer as lat/long coordinates.

11. The CARS of claim 1 wherein said CARS software is constructed to permit initial user browsing of the CARS database travel information to assist user selection of an initial travel route.

12. The CARS of claim 1 wherein the CARS software is constructed for incorporating POIs selected by the user in the region of interest as waypoints in the user defined travel route, said CARS software also being constructed for recalculating, delineating, and displaying a new user defined travel route via the selected POIs as waypoints.

13. The CARS of claim 12 wherein the waypoints of the electronic maps comprise information including the transportation routes entering and leaving the respective nodes.

14. The CARS of claim 1 wherein the POI types are selected from the group consisting of restaurants, hotels/motels, cities, municipalities, settlements, routes, transportation services such as airports, ferries, and railroads, parks, recreation areas, campgrounds, hospitals, zoos, museums, tourist and sightseeing attractions, and other geographical landmarks.

15. The CARS of claim 1 wherein the travelog for preview on the computer display of the user defined travel route is a multimedia travelog.

16. The CARS of claim 1 wherein the waypoints are named locations on the electronic maps.

17. The CARS of claim 2 wherein the CARS software is constructed so that POI types and particular POIs of the first database selected by the user are displayed as overlays on the electronic maps and the user customized strip maps.

18. The CARS of claim 1 comprising a set of printed maps substantially coinciding with the set of electronic maps for user cross reference, correlation, and coordination between the computer display presented electronic maps and said printed maps.

19. The CARS of claim 3 comprising a set of printed maps substantially coinciding with the set of electronic maps for user cross reference, correlation, and coordination between the computer display presentation of user defined strip maps and said printed maps.

20. The CARS of claim 18 comprising a grid system of grid lines overlaying the electronic maps and the printed maps, said grid lines defining uniquely named grid quadrangles, said uniquely named grid quadrangles of the electronic maps and printed maps substantially coinciding in geographic areas depicted by the grid quadrangles to facilitate cross reference, correlation and coordination between the computer display map presentations and the corresponding printed maps.

21. The CARS of claim 20 wherein the electronic maps and printed maps comprise substantially constant scale maps.

22. The CARS of claim 21 comprising electronic maps at a plurality of scales, said maps at each scale being substantially constant scale maps, said grid system comprising a plurality of sets of grid lines corresponding to the respective scales and defining uniquely named grid quadrangles at each scale.

23. The CARS of claim 22 wherein the CARS software is constructed to permit user scrolling across grid quadrangles at the same scale and to permit zooming between grid quadrangles at different scales, and for displaying said scrolling and zooming steps on the computer display.

24. The CARS of claim 1 wherein the CARS software is constructed for incorporating POIs selected by the user in a corridor of specified width along the travel route as waypoints in the user defined travel route, said CARS software also being constructed for recalculating, delineating, and displaying a new user defined travel route via the selected POIs as waypoints.

25. The CARS of claim 1 wherein the digital computer is selected from the group consisting of PDA's, notebooks, portable computers, desktop computers, workstations, and mainframes.

26. The CARS of claim 1 wherein the CARS software is constructed so that the user can browse through the CARS database of travel information and can change the user selected travel origin, travel destination, transportation routes, and intermediate waypoints, said CARS software recalculating, delineating, and displaying on the computer display a revised travel route.

27. The CARS of claim 26 wherein the CARS software is constructed for reassembling a revised user customized travelog for previewing the user defined revised travel route.

28. The CARS of claim 1 wherein the CARS software comprises a routing subsystem, a multimedia subsystem, and an interactive mode for interaction between the two subsystems.

29. The CARS of claim 28 wherein the routing subsystem performs travel planning and routing functions, calculating and displaying a route according to user choices and constraints, and wherein the multimedia subsystem performs multimedia functions, retrieving and displaying multimedia information about selected POI's, and wherein during the interactive mode, the multimedia subsystem constructs a travelog following the user defined route calculated by the routing subsystem.

30. A computer aided routing system (CARS) comprising:

a digital computer having a computer display;

a map database providing a set of electronic maps for presentation on the computer display;

said electronic maps depicting transportation routes having identified waypoints including route intersections at geographical locations along the transportation routes, said identified waypoints depicted on the electronic maps being identified in the computer by coordinate locations of a selected geographical coordinate system;

a CARS database of geographically locatable points of interest (POIs) identified by coordinate locations in said geographical coordinate system, said POIs being organized into a plurality of types for user selection of POIs by type, said POI types comprising overlays of the CARS database for display over the electronic maps on the computer display;

CARS software constructed for user travel planning using said electronic maps presented on the computer display, said CARS software permitting user selection of a travel origin, travel destination, and desired waypoints between the travel origin and travel destination, said CARS software calculating, delineating, and displaying a travel route between the travel origin and travel destination via the selected waypoints according to user choice of the shortest travel route, quickest travel route, or user selected preferred travel route;

said CARS software permitting user selection of a region of interest along the user defined travel route, said region of interest having user specified dimensions and permitting user selection of specified POI types within said region and user selection of particular POIs from a selected type within the region of interest, said region of interest being identified in the computer by coordinate locations of said geographical coordinate system;

said CARS database comprising travel information selected from the group consisting of graphics, photos, videos, animations, audio information, and text information about POIs of the CARS database and about waypoints of the electronic maps;

said CARS software being constructed to present a user customized travelog for preview on the computer display of the user defined travel route including said travel information in the CARS database on the waypoints of the electronic maps and the selected POIs of the CARS database in the user defined region of interest along the travel route;

said CARS software being constructed to display a user customized strip map of the user defined travel route along the center of the screen, user selected POIs in the user defined region of interest being listed along one side of the strip map with pointers to respective POI locations in a corridor of specified width along the travel route, and travel directions along the travel route being listed along the other side of the strip map with pointers to respective intersections corresponding to directions along the travel route;

said user customized strip map being vertically oriented with the travel origin at the bottom of the strip map and travel destination toward the top of the strip map.

31. The CARS of claim 30 wherein the CARS software is constructed to permit initial user browsing of the CARS database travel information to assist user selection of an initial travel route.

32. The CARS of claim 30 comprising a set of printed maps substantially coinciding with the set of electronic maps for user cross reference, correlation, and coordination between the computer display presented electronic maps and said printed maps and between the computer display presentation of user defined strip maps and said printed maps;

a grid system of grid lines overlaying the electronic maps and the printed maps, said grid lines defining uniquely named grid quadrangles, said uniquely named grid quadrangles of the electronic maps and printed maps substantially coinciding in geographic areas depicted by the grid quadrangles to facilitate cross reference, correlation and coordination between the computer display map presentations and the corresponding printed maps;

said electronic maps and printed maps comprising substantially constant scale maps.

33. The CARS of claim 32 comprising electronic maps at a plurality of scales, said maps at each scale being substantially constant scale maps, said grid system comprising a plurality of sets of grid lines corresponding to the respective scales and defining uniquely named grid quadrangles at each scale.

34. The CARS of claim 30 wherein said CARS software comprises a replace function for updating the electronic maps and first database with replacement or supplemental information from another memory device.

35. The CARS of claim 31 wherein the CARS software is constructed for incorporating POIs selected by the user in the region of interest as waypoints in the user defined travel route, said CARS software also being constructed for recalculating, delineating, and displaying a new user defined travel route via the selected POIs as waypoints.

36. The CARS of claim 30 wherein the CARS software comprises a routing subsystem, a multimedia subsystem, and an interactive mode for interaction between the two subsystems.

37. The CARS of claim 30 wherein the routing subsystem performs travel planning and routing functions, calculating and displaying a route according to user choices and constraints, and wherein the multimedia subsystem performs multimedia functions, retrieving and displaying multimedia information about selected POI's, and wherein during the interactive mode, the multimedia subsystem constructs a travelog following the user defined route calculated by the routing subsystem.

38. A computer aided routing method (CARM) using a digital computer with computer display, a map database providing electronic maps having transportation routes, route intersections and identified waypoints along the transportation routes for presentation on the computer display, and a computer aided routing system (CARS) software constructed for user travel planning, comprising:

presenting the electronic maps on the computer display;

selecting on the electronic maps a user travel origin, travel destination, and intermediate waypoints at geographical locations between the travel origin and travel destination;

calculating, delineating, and displaying on the computer display a travel route between the user travel origin and travel destination via the user selected waypoints according to user choice of the shortest travel route, quickest travel route, or user selected preferred travel route;

selecting a region of interest to the user along the user defined travel route, said region having user defined dimensions limiting excursions on either side of the user defined travel route;

providing a CARS database of geographically locatable points of interest (POIs) in the geographical areas of the electronic maps, said POIs being organized into a plurality of type for user selection of POIs by type, said POI types comprising overlays of the CARS database for display over the electronic maps on the computer display, said CARS database also comprising travel information selected from the group consisting of graphics, photos, videos, animations, audio information and text information about transportation routes and waypoints of the electronic maps and POIs of the CARS database;

identifying in the digital computer the transportation routes, route intersections, and waypoints of the electronic maps, region of interest selected by the user, and the selected POIs of the CARS database, by coordinate locations in a common geographical coordinate system;

selecting specified POI types in the user defined region of interest along the user defined travel route and selecting particular POIs from the selected types in the region;

assembling and displaying on the computer display a user customized travelog for preview of the user defined travel route, said travelog including travel information in the CARS database on the transportation routes and waypoints of the electronic maps and selected POIs in the user defined region of interest along the user defined travel route.

39. The CARM of claim 38 comprising the step of assembling and displaying on the computer display a user customized strip map of the user defined travel route.

40. The CARM of 39 comprising the step of displaying the user customized strip map along the center of the computer display, displaying a list of user selected POIs in the user defined region of interest along one side of the user customized strip map with pointers pointing to respective POI locations in the corridor, and displaying travel directions along the travel route along the other side of the strip map with pointers pointing to respective intersections corresponding to directions along the travel route.

41. The CARM of claim 40 comprising the step of displaying the user customized strip map in a vertical orientation with the travel origin at the bottom of the strip map and travel destination toward the top of the strip map.

42. The CARM of claim 41 comprising the step of printing a hardcopy map of the user customized strip map showing the user defined travel route, list of user selected POIs in the region of interest and respective pointers along one side of the strip map, and the list of directions and respective pointers on the other side of the strip map.

43. The CARM of claim 38 wherein the electronic maps, CARS database, and CARS software are stored on a CDROM and the digital computer comprises a CDROM drive and further comprising the step of updating the electronic maps and CARS database with replacement or supplemental information from another memory device using a replace function of the routing software.

44. The CARM of claim 38 wherein the transportation routes depicted on the electronic maps are selected from the group consisting of vehicle routes, ferry routes, air travel routes, bicycle routes and hiking trails.

45. The CARM of claim 38 wherein the selected geographical coordinate system is the standard latitude/longitude (lat/long) geographical coordinate system and comprising the step of storing geographical coordinates in the digital computer as lat/long coordinates.

46. The CARM of claim 38 comprising the step of initial user browsing of the CARS database travel information for assistance in selecting an initial route.

47. The CARM of claim 38 comprising the steps of incorporating POIs selected by the user in the region of interest as waypoints in the user defined travel route, and recalculating, delineating, and displaying a new user defined travel route via the selected POIs as waypoints.

48. The CARM of claim 38 wherein the POI types of the first database comprise restaurants, hotels/motels, cities, municipalities, settlements, routes, transportation services such as airports, ferries, and railroads, parks, recreation areas, campgrounds, hospitals, zoos, museums, tourist and sightseeing attractions, and other geographical landmarks.

49. The CARM of claim 38 wherein the step of assembling and displaying a user customized travelog comprises assembling and displaying a multimedia travelog.

50. The CARM of claim 38 comprising the step of displaying the user selected POIs of the CARS database as at least one overlay on the electronic maps.

51. The CARM of claim 38 comprising the steps of providing a set of printed maps substantially coinciding with the set of electronic maps for user cross reference, correlation, and coordination between the computer display presented electronic maps and said printed maps; and providing a grid system of grid lines overlaying the electronic maps and the printed maps, said grid lines defining uniquely named grid quadrangles, said uniquely named grid quadrangles of the electronic maps and printed maps substantially coinciding in geographic areas depicted by the grid quadrangles to facilitate cross reference, correlation and coordination between the computer display map presentations and the corresponding printed maps.

52. The CARM of claim 51 comprising the steps of providing electronic maps at a plurality of scales, said maps at each scale being substantially constant scale maps, said grid system comprising a plurality of sets of grid lines corresponding to the respective scales and defining uniquely named grid quadrangles at each scale; and scrolling across grid quadrangles at the same scale and zooming between quadrangles at different scales, and displaying the scrolling and zooming steps on the computer display.

53. The CARM of claim 38 comprising the steps of incorporating POIs selected by the user in the corridor as waypoints in the user defined travel route, and recalculating, delineating, and displaying a new user defined travel route via the selected POIs as waypoints.

54. The CARM of claim 53 comprising the steps of assembling and displaying on the computer display a new user customized travelog for previewing the new user defined travel route via the selected POIs.

55. The CARM of claim 38 comprising the steps of changing the user selected travel origin, travel destination, transportation routes, or intermediate waypoints, recalculating, delineating, and displaying on the computer display a revised travel route, and assembling and displaying on the computer display a revised user customized travelog for previewing the revised travel route.

56. The CARM of claim 55 comprising repeating the steps of claim 55 in an iterative process until the user arrives at a satisfactory user defined travel route.

57. A user customized multimedia travelog constructed according to the method of claim 38.

58. A user customized travelog assembled by the method of claim 53.

59. A program storage device readable by a machine, tangibly embodying a program of instruction executable by the machine to perform method steps for computer aided routing comprising:

presenting electronic maps on a computer display;

selecting on the electronic maps a user travel origin, travel destination, and intermediate waypoints at geographical locations between the travel origin and travel destination;

calculating, delineating, and displaying on the computer display a travel route between the user travel origin and travel destination via the user selected waypoints according to user choice of the shortest travel route, quickest travel route, or user selected preferred travel route;

selecting a region of interest to the user along the user defined travel route, said region having user defined dimensions limiting excursions on either side of the user defined travel route;

providing a computer aided routing system (CARS) database of geographically locatable points of interest (POIs) in the geographical areas of the electronic maps, said POIs being organized into a plurality of type for user selection of POIs by type, said POI types comprising overlays of the CARS database for display over the electronic maps on the computer display, said CARS database also comprising travel information selected from the group consisting of graphics, photos, videos, animations, audio information and text information about transportation routes and waypoints of the electronic maps and POIs of the CARS database;

identifying in the digital computer the transportation routes, route intersections, and waypoints of the electronic maps, region of interest selected by the user, and the selected POIs of the CARS database, by coordinate locations in a common geographical coordinate system;

selecting specified POI types in the user defined region of interest along the user defined travel route and selecting particular POIs from the selected types in the region;

assembling and displaying on the computer display a user customized travelog for preview of the user defined travel route, said travelog including travel information in the CARS database on the transportation routes and waypoints of the electronic maps and selected POIs in the user defined region of interest along the user defined travel route.

\* \* \* \* \*